United States Patent [19]

More et al.

[11] Patent Number: 5,194,852
[45] Date of Patent: Mar. 16, 1993

[54] ELECTRO-OPTIC SLATE FOR DIRECT ENTRY AND DISPLAY AND/OR STORAGE OF HAND-ENTERED TEXTUAL AND GRAPHIC INFORMATION

[76] Inventors: Edward S. More, 201 Ocean Ave., #PH16P, Santa Monica, Calif. 90402; John C. Aiken, 1389 E. 11400 S., Sandy, Utah 84092

[21] Appl. No.: 368,241

[22] Filed: Jun. 16, 1989

Related U.S. Application Data

[63] Continuation-in-part of Ser. No. 936,567, Dec. 1, 1986, Pat. No. 4,839,634.

[51] Int. Cl.$^5$ ............................................. G09G 3/00
[52] U.S. Cl. .................................. 340/712; 340/707; 178/19; 341/5; 341/33
[58] Field of Search .................... 340/706, 707, 712; 178/18, 19; 341/5, 33

[56] References Cited

U.S. PATENT DOCUMENTS

| | | | |
|---|---|---|---|
| 3,761,877 | 9/1973 | Fernald | 178/18 |
| 3,772,685 | 11/1973 | Masi | 341/31 |
| 3,832,693 | 8/1974 | Ishizaki et al. | 178/19 |
| 3,990,070 | 11/1976 | Spence | 340/711 |
| 4,058,849 | 11/1977 | Fitzgerald et al. | 341/5 |
| 4,125,873 | 11/1978 | Chesarek | 340/747 |
| 4,190,833 | 2/1980 | Bejting et al. | 340/712 |
| 4,363,029 | 12/1982 | Piliavin et al. | 341/33 |
| 4,639,720 | 1/1987 | Rympalski et al. | 340/707 |
| 4,814,760 | 3/1989 | Johnson et al. | 340/784 |
| 4,839,634 | 6/1989 | More et al. | 340/712 |
| 4,841,290 | 6/1989 | Nakano et al. | 340/707 |

OTHER PUBLICATIONS

IBM Technical Disclosure Bulletin, Liquid Crystal Display and Touch Panel Keyboard Input, Sep. 1981, pp. 1888-1890.

Primary Examiner—Jeffery A. Brier
Assistant Examiner—Jick Chin

[57] ABSTRACT

A portable interactive electro-optic data input/output, processing, storage, and display device responsive to hand printed text and hand drawn graphics. The device preferably comprises a combined flat panel display and input pen sensing surface constructed from non-mechanical, non-emissive display elements, such as liquid crystal display elements. The device also comprises an input pen for manual entry of hand printed text and hand drawn graphics, as well as commands, directly onto the display surface for providing an electronic writing and drawing slate. The display elements themselves are preferably utilized as input pen sense locations. The flat panel display and input pen sensing surface is constructed so that there is no display distortion when the input pen is in contact with the surface. Rapid input pen sensing is provided for accommodating natural pen movement on a high resolution, large area display. A character recognition method is also associated with the device for automatic and computationally efficient on-line recognition of hand printed text characters, while accommodating a natural printing style. Hand printed text characters are recognized and preferably stored in a compact and standardized format, such as ASCII, for later display, processing, or output to external equipment, such as a printer, plotter, or computer. Graphics can also be entered and stored for later display, processing, or output to an external device, and graphics can be interspersed with text, if desired. Also, text and graphics can preferably be input to the device from external information processing equipment for display and/or processing.

20 Claims, 43 Drawing Sheets

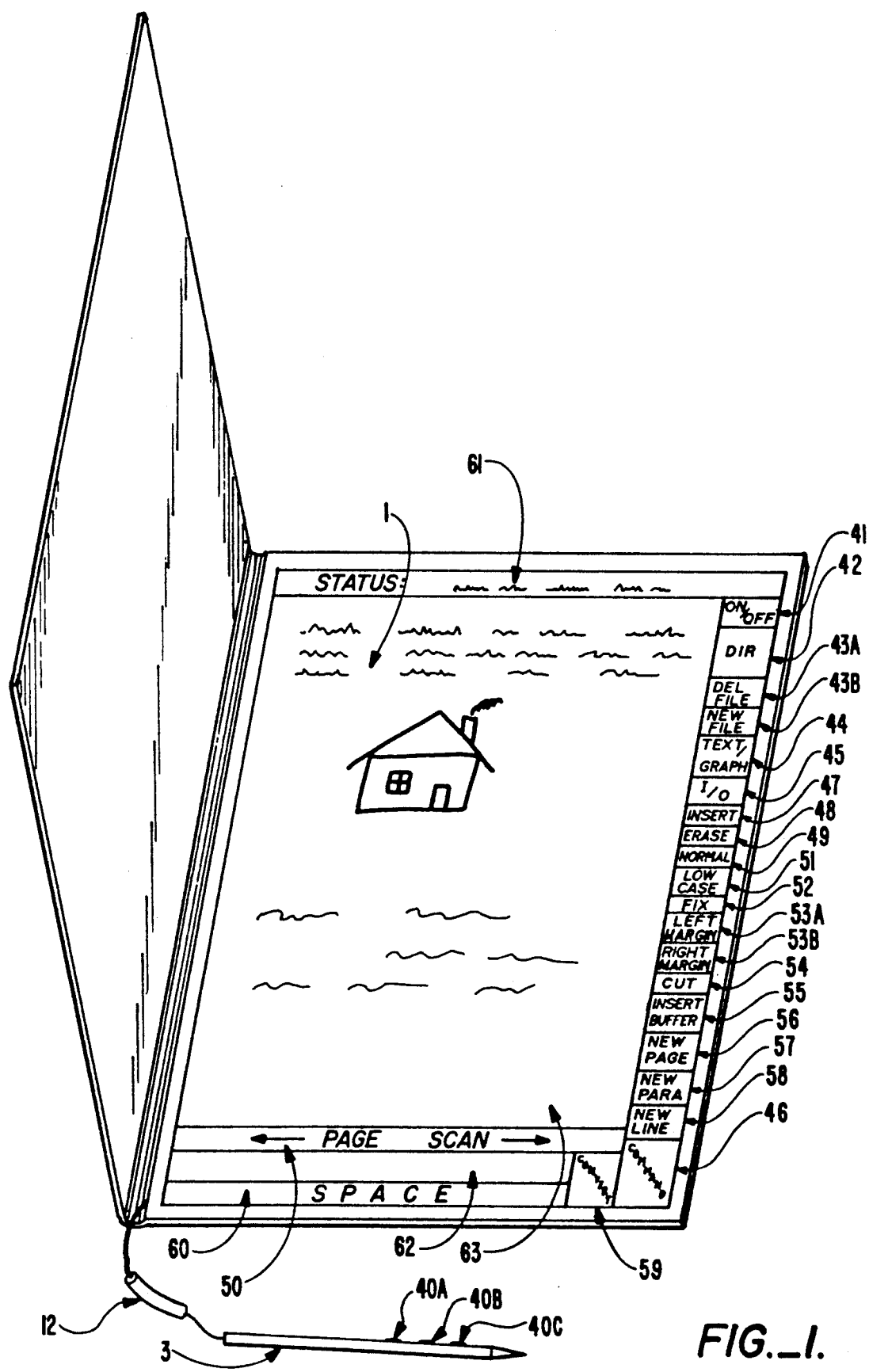
FIG._1.

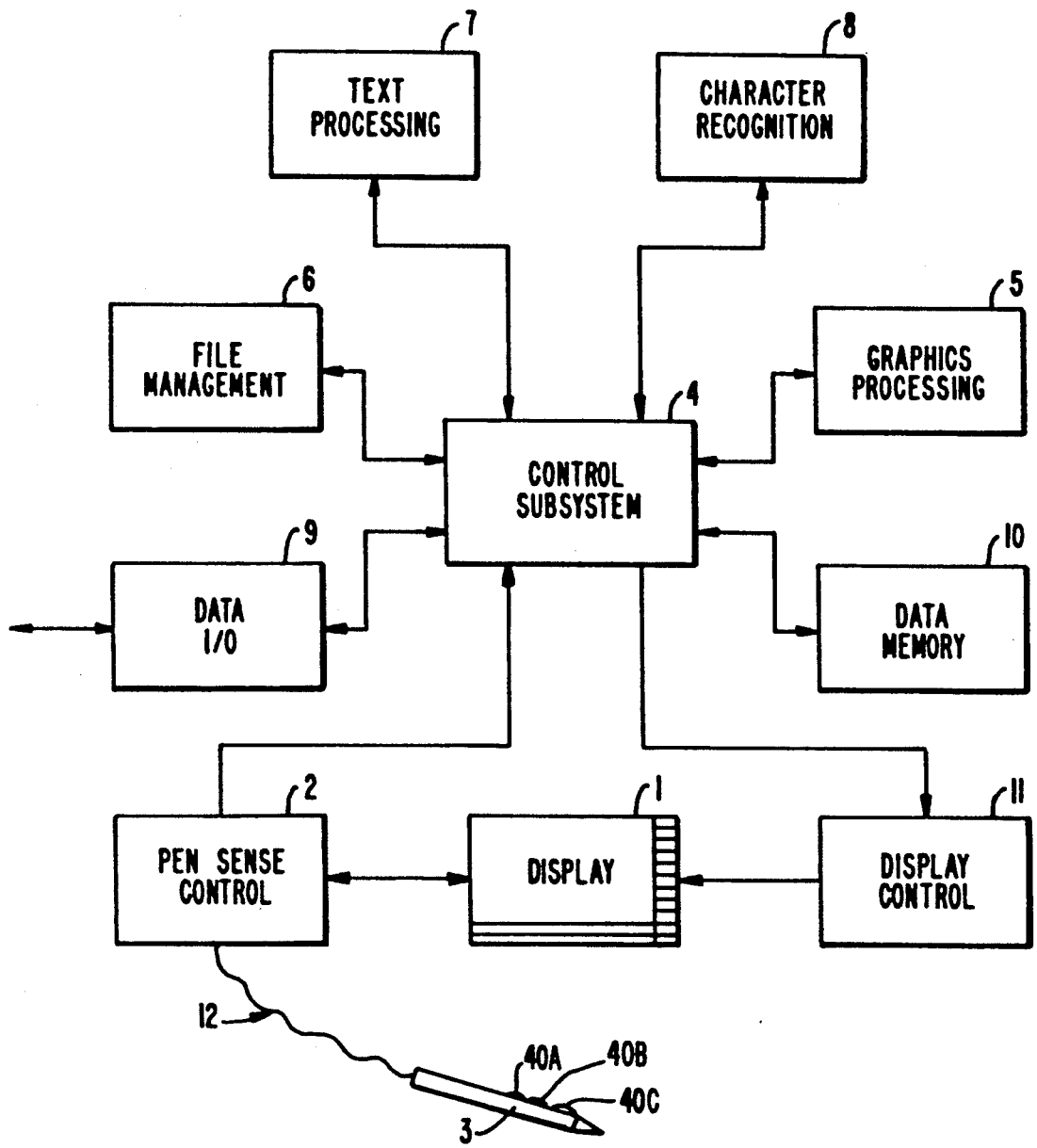
FIG._2.

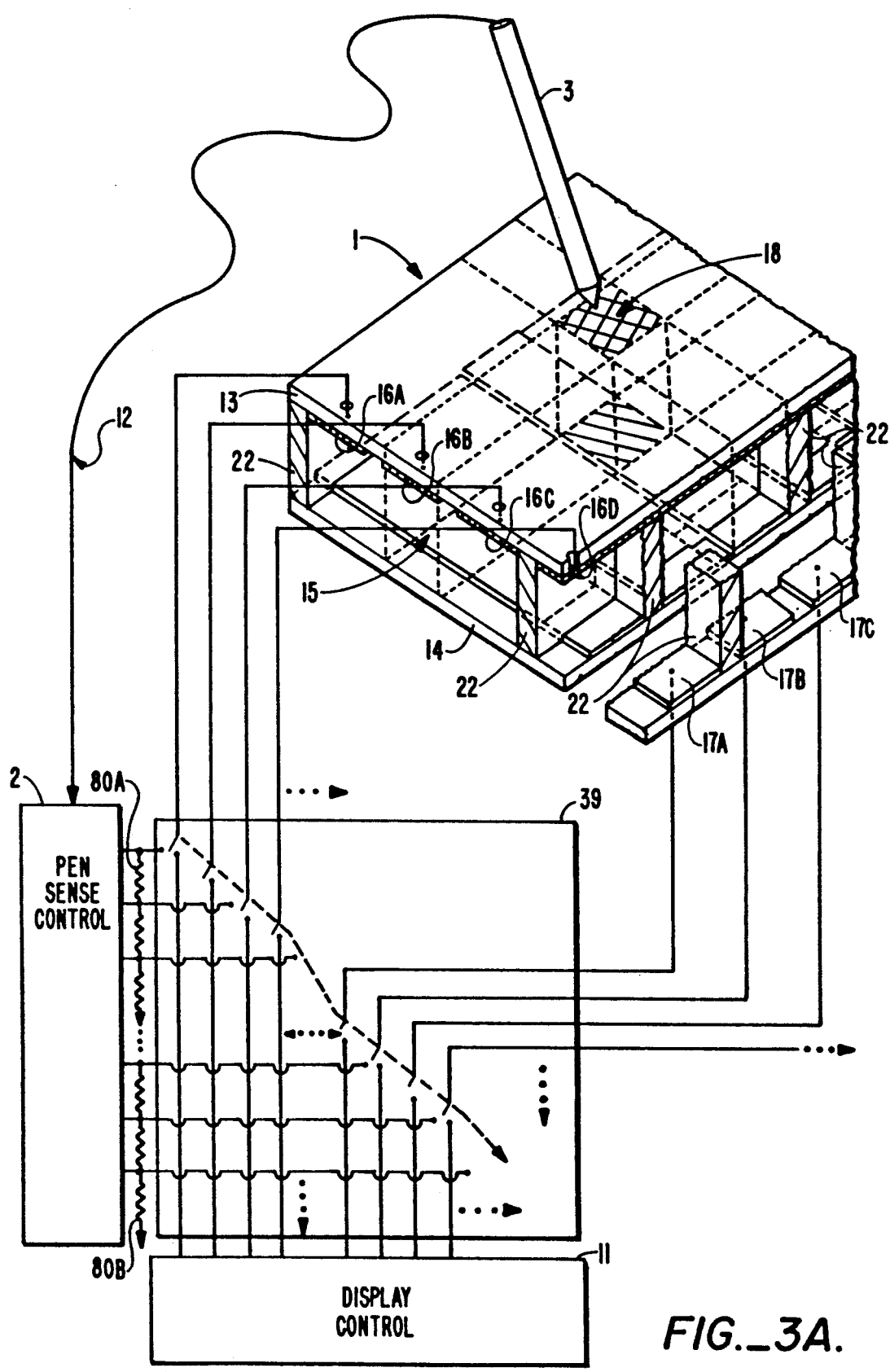
FIG._3A.

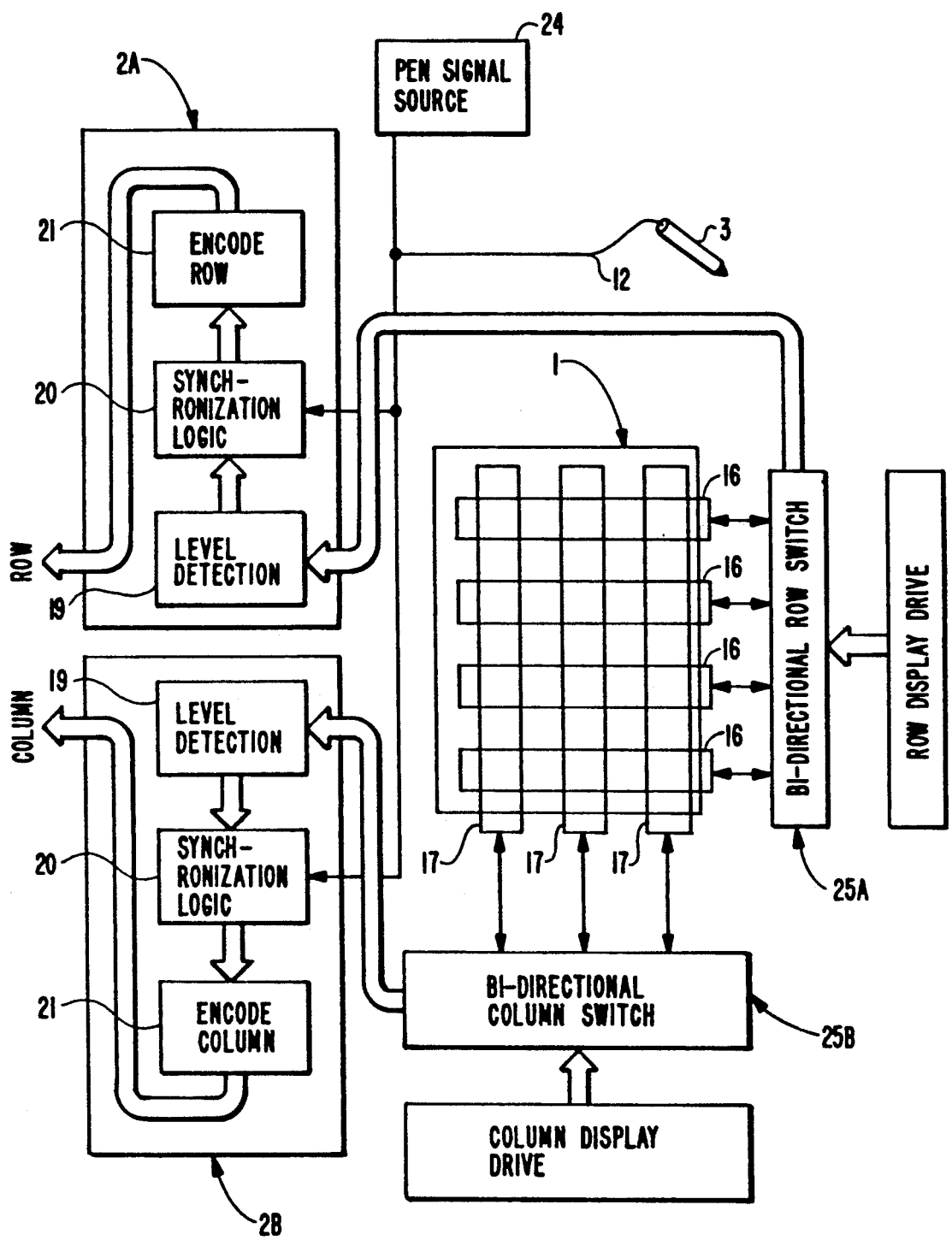
FIG._3B.

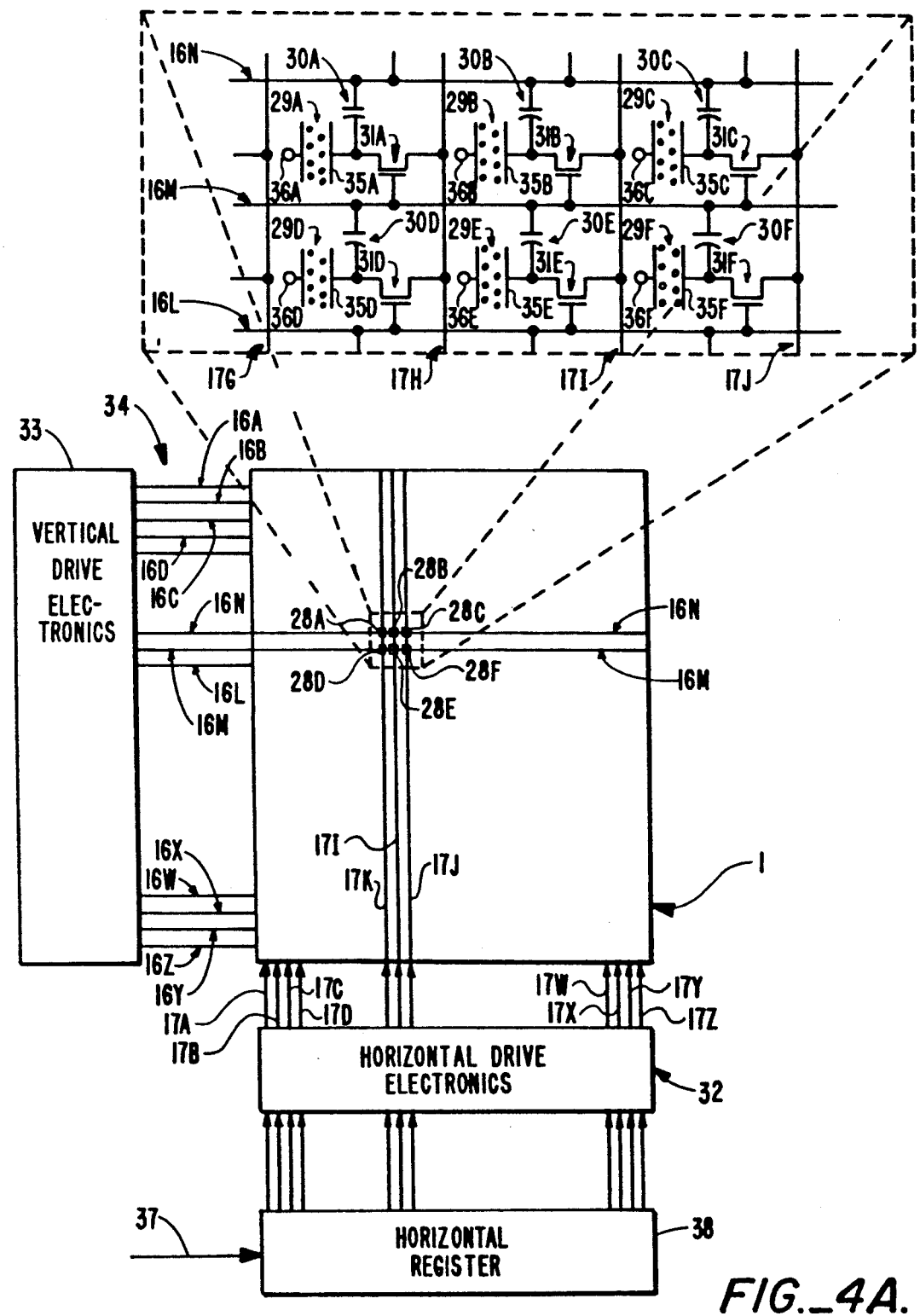
FIG._4A.

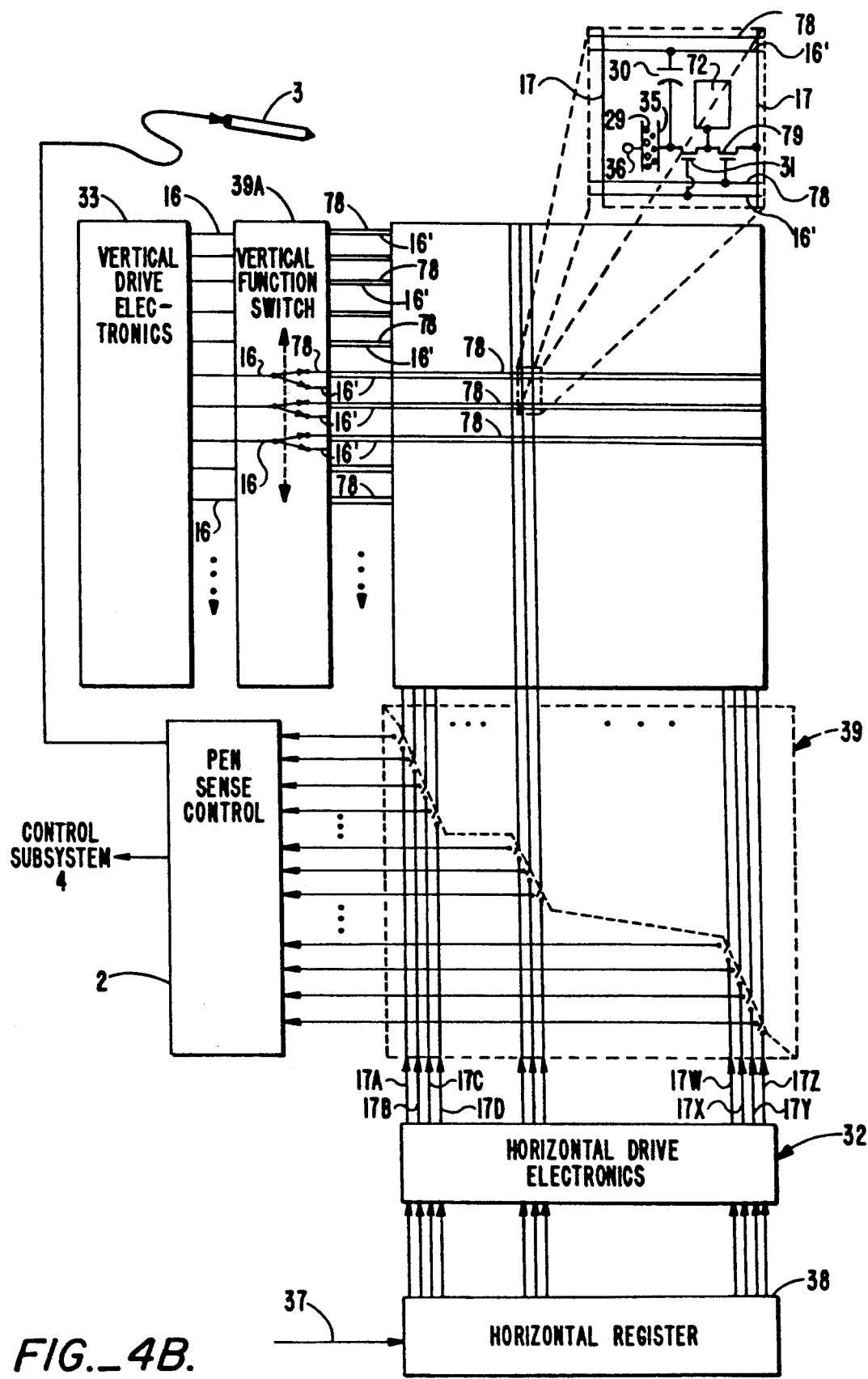
FIG._4B.

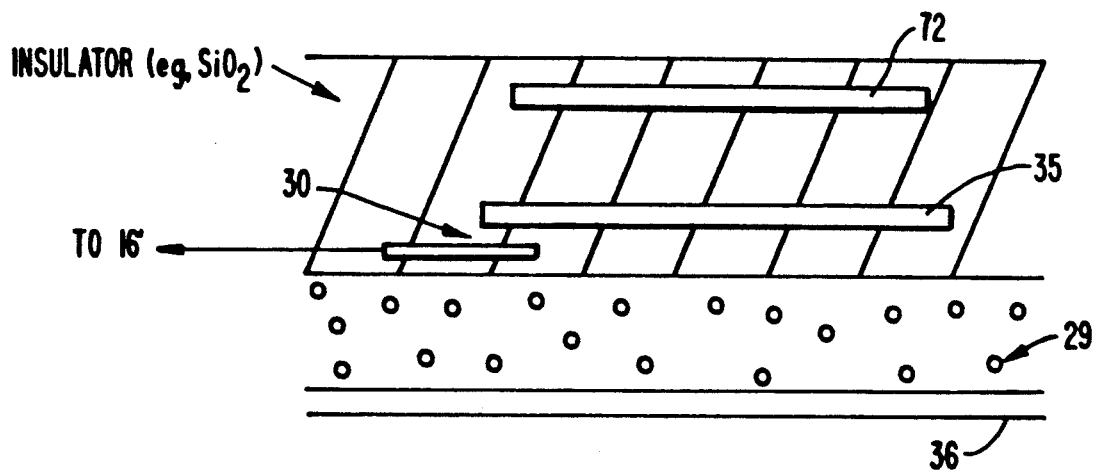
FIG._4C.
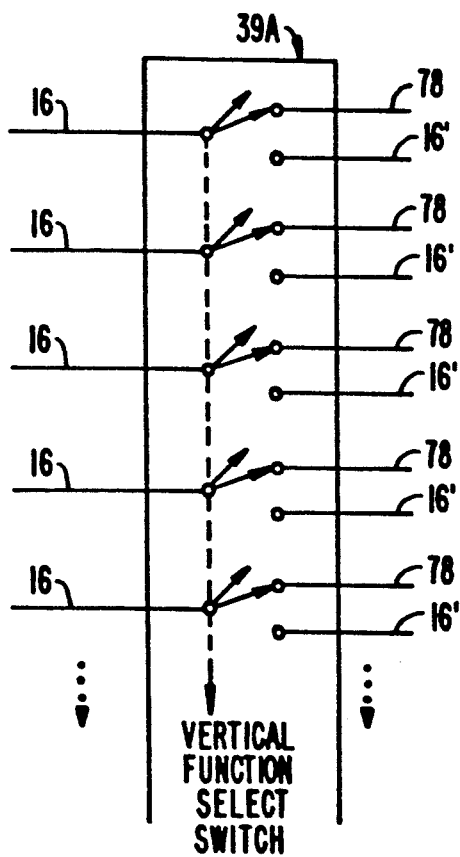
FIG._4D.

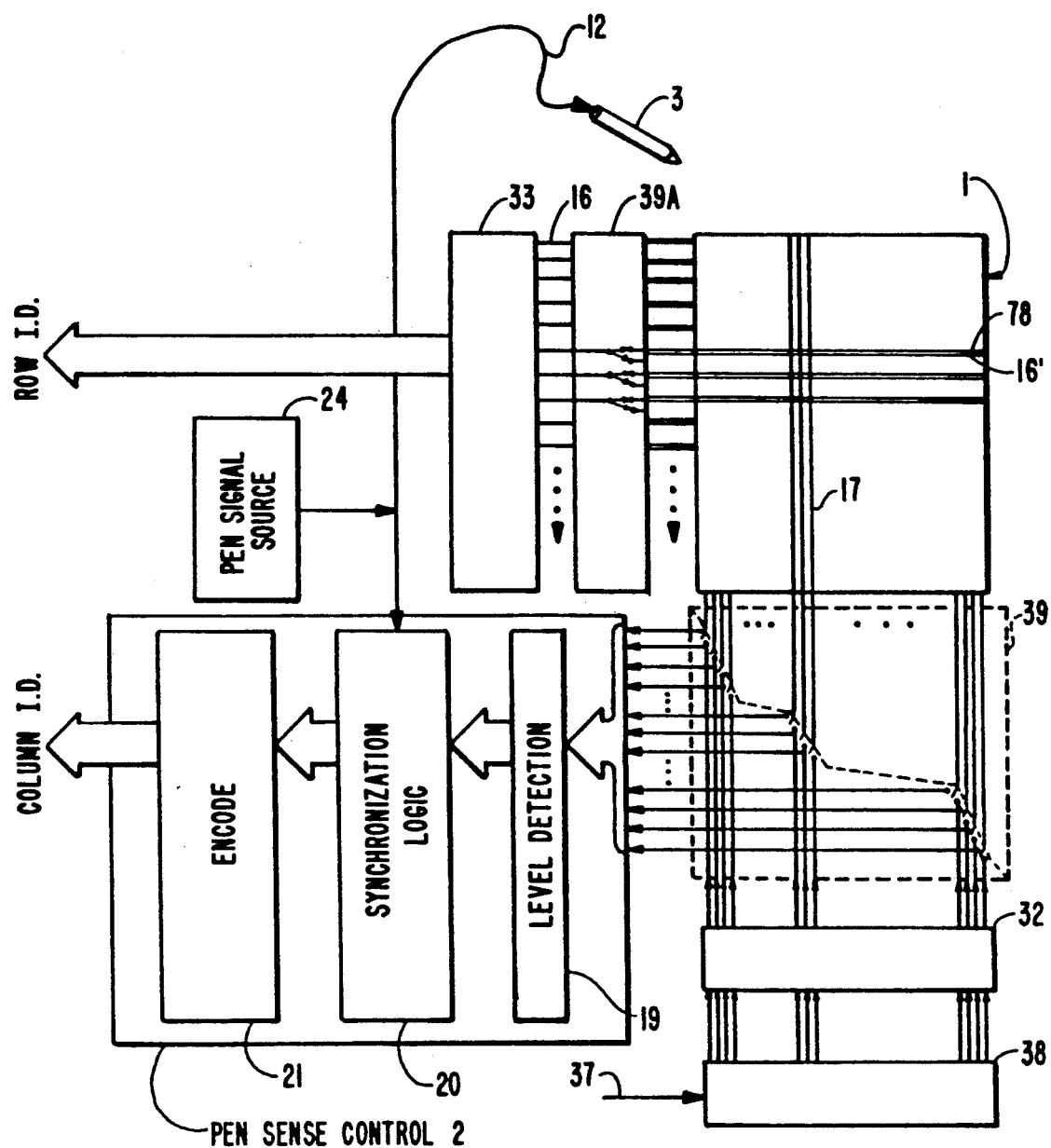
FIG._5A.

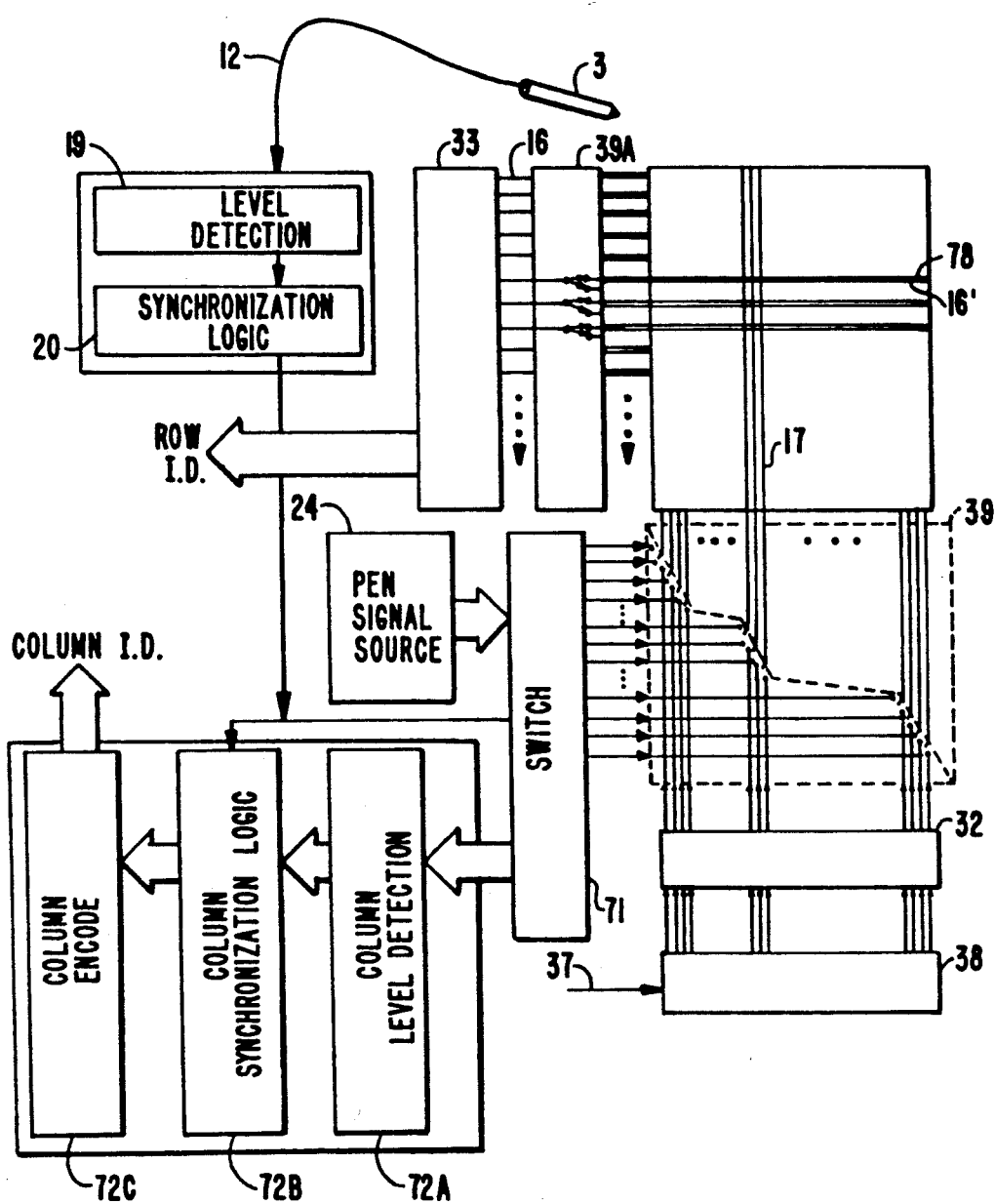
FIG._5B.

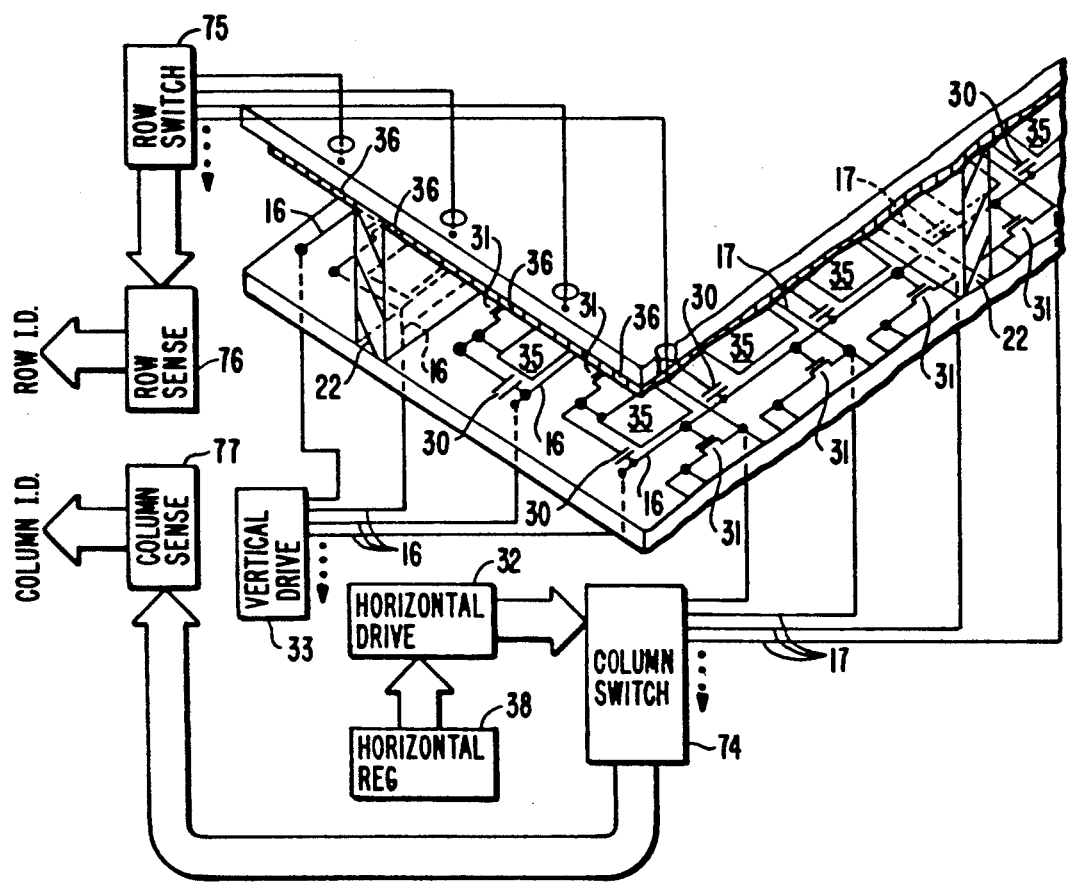
FIG._5C.

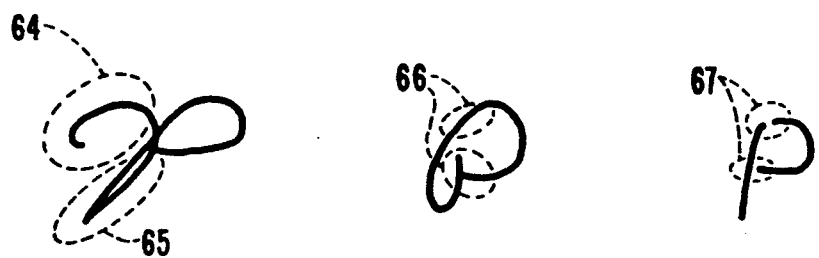
FIG._6A.
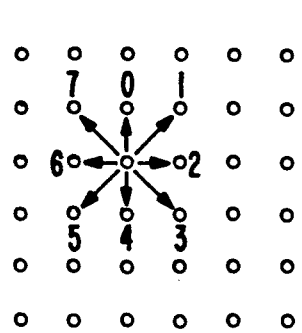   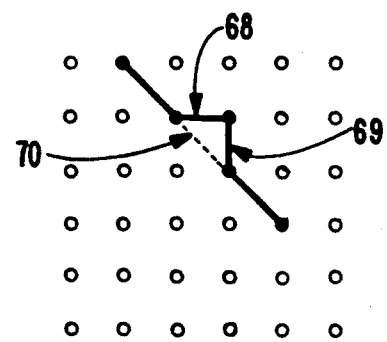
FIG._6B.   FIG._6C.
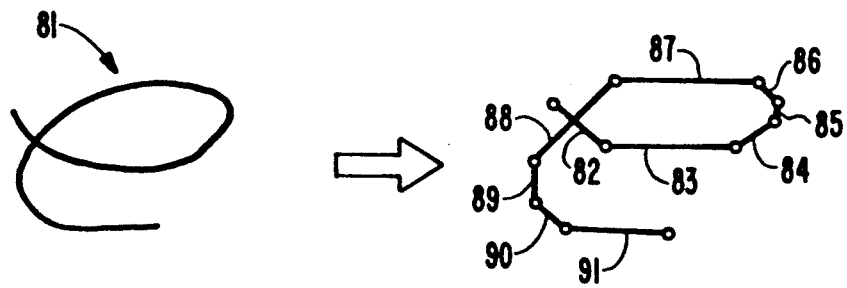
FIG._6D.

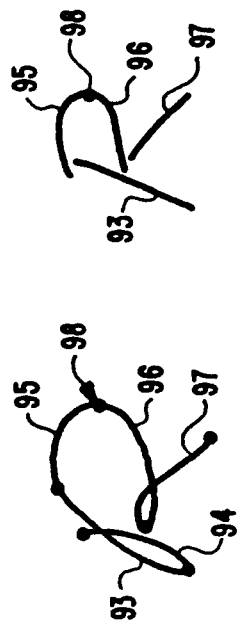
FIG._6E.
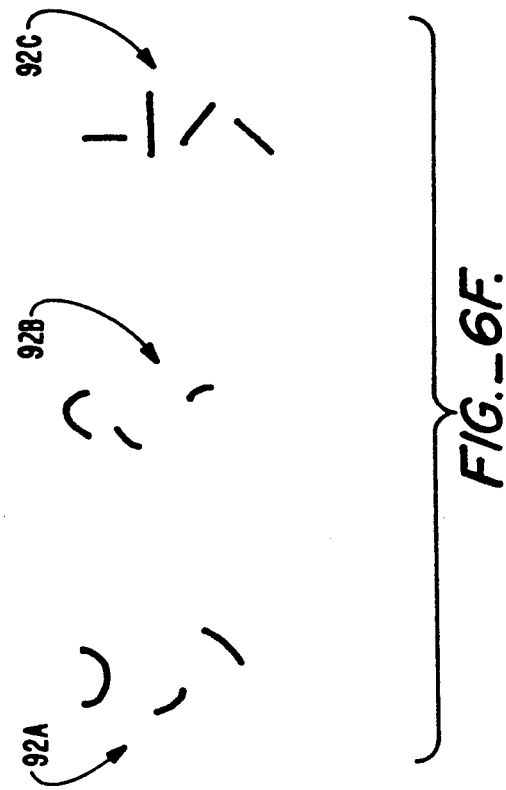
FIG._6H.
FIG._6G.
FIG._6F.

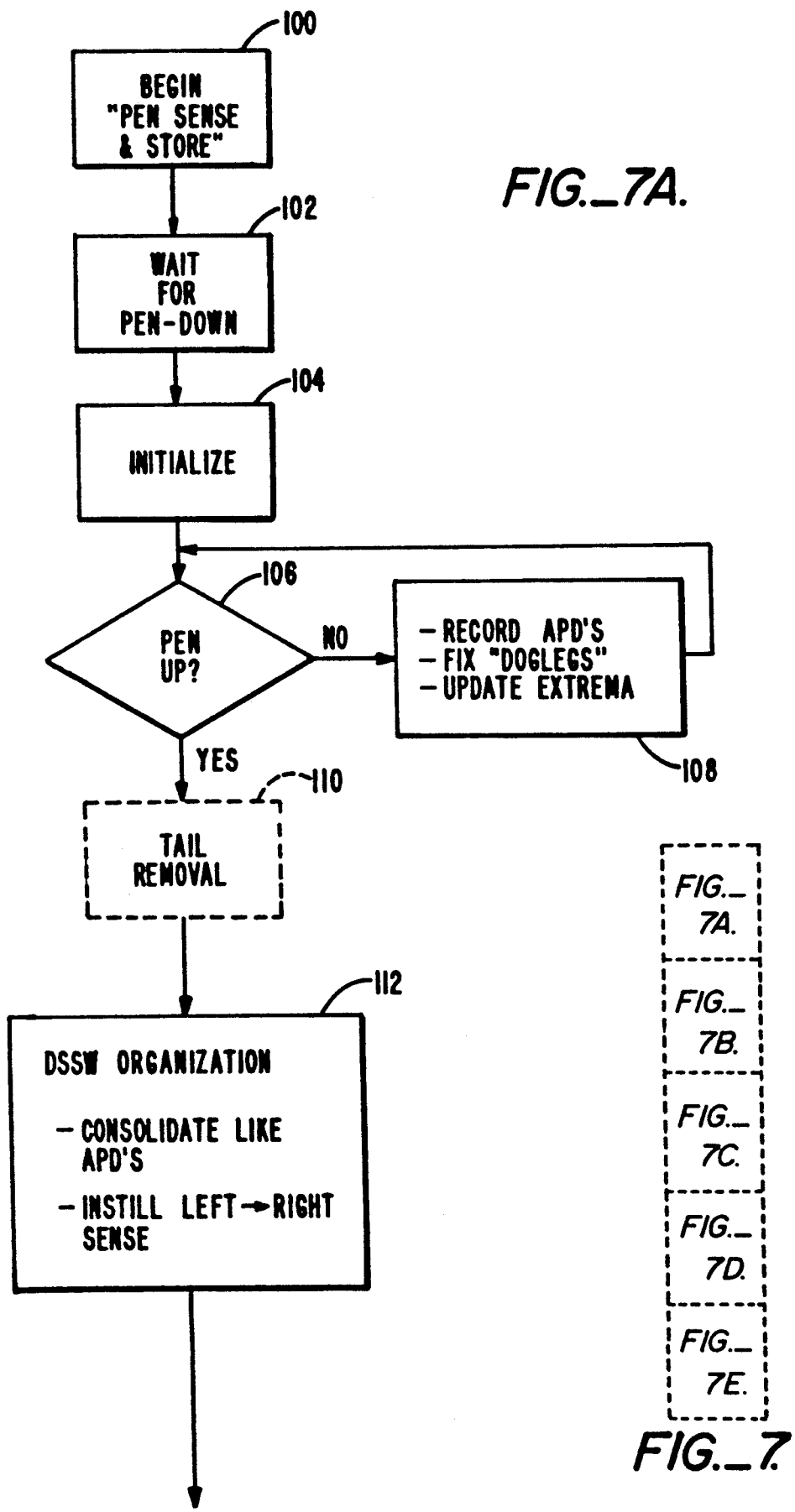

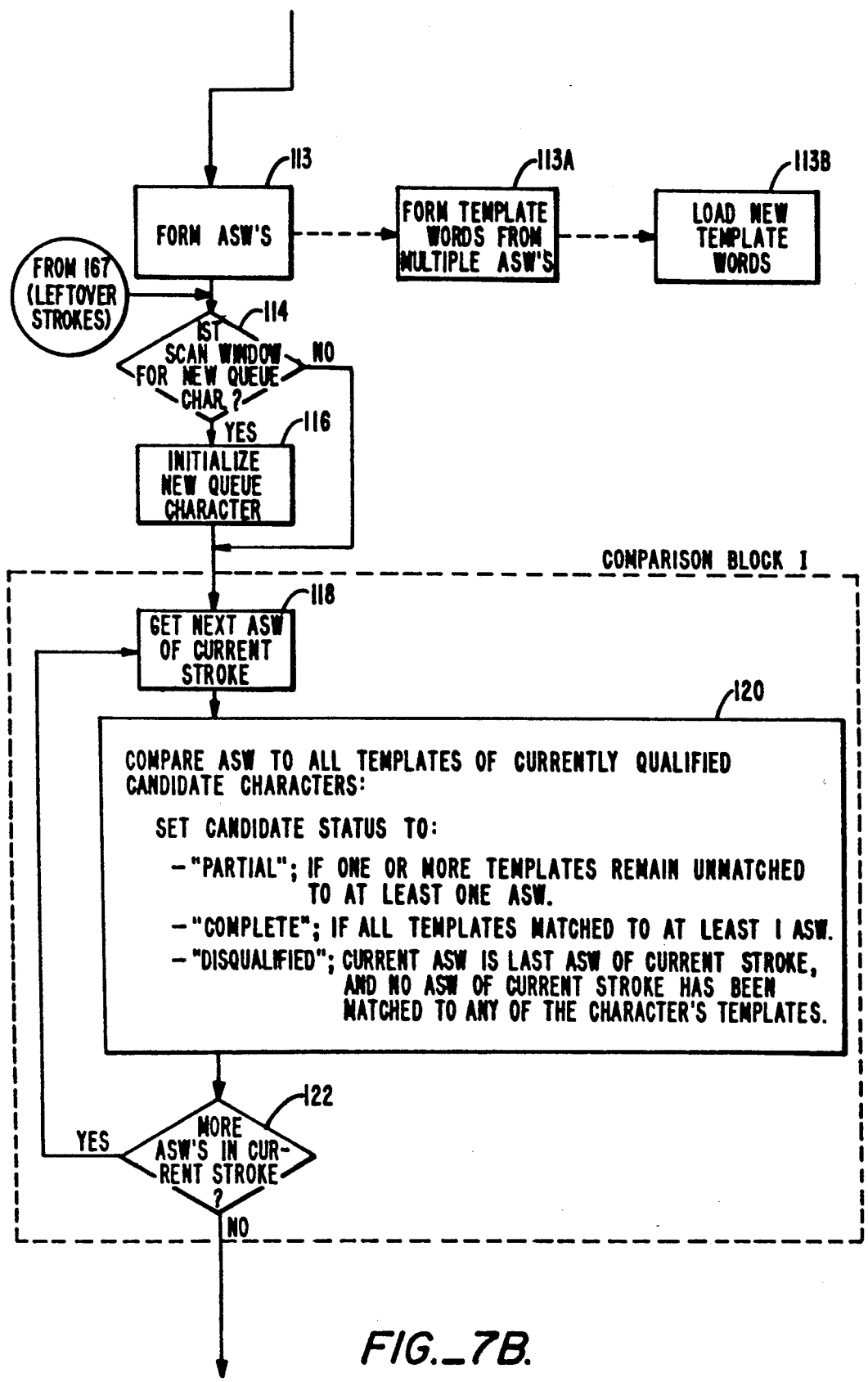
FIG._7B.

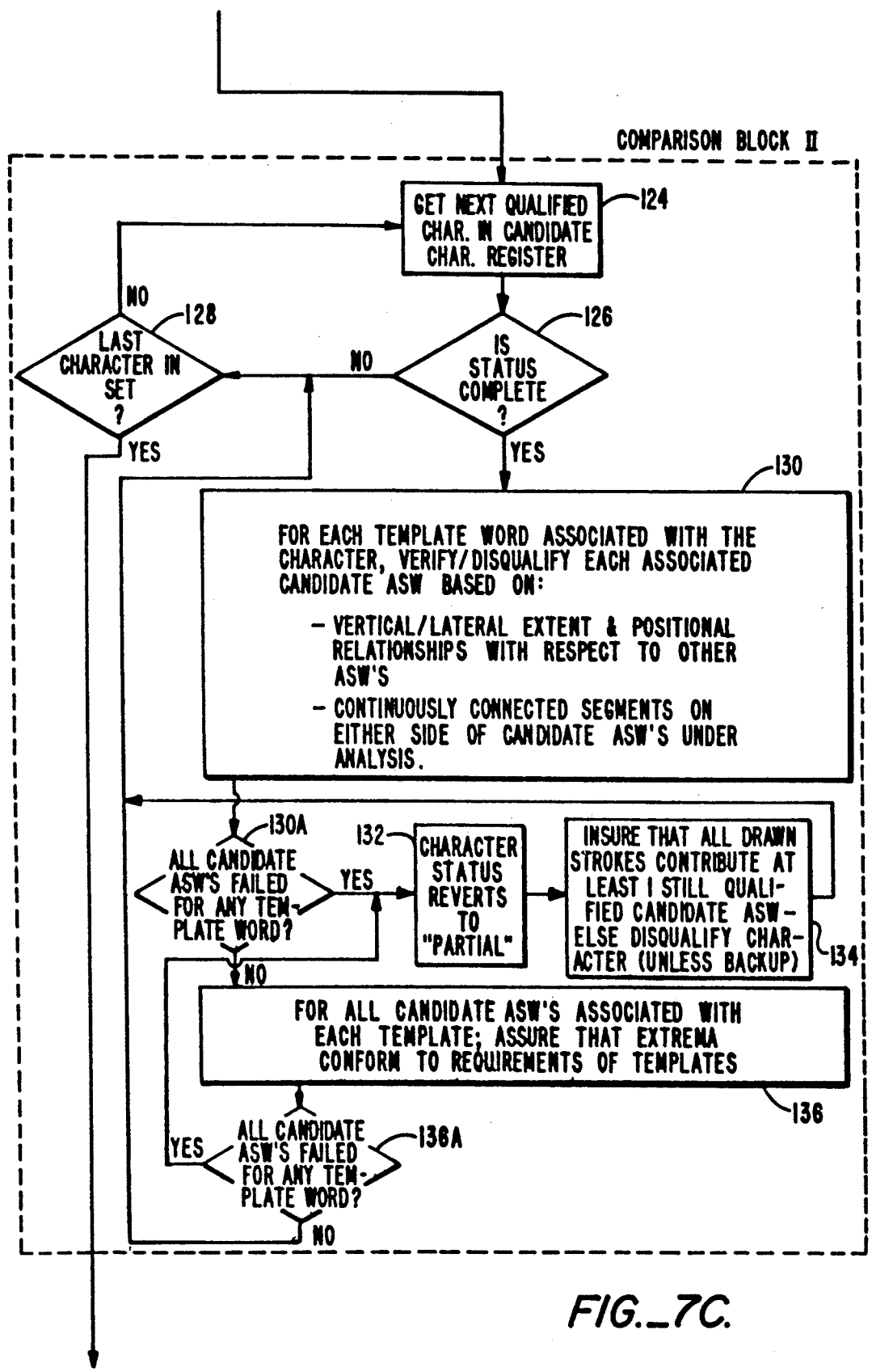
FIG._7C.

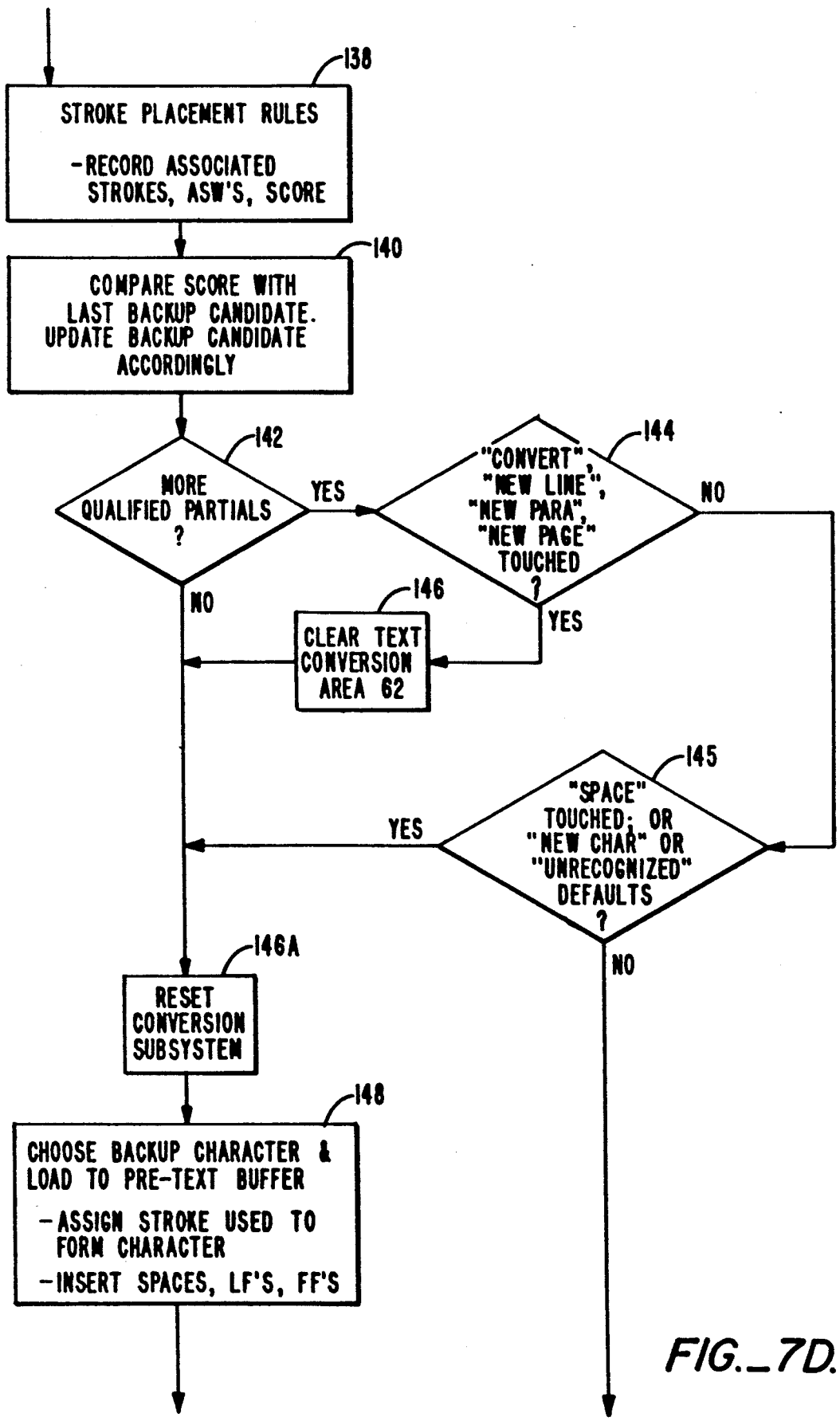
FIG._7D.

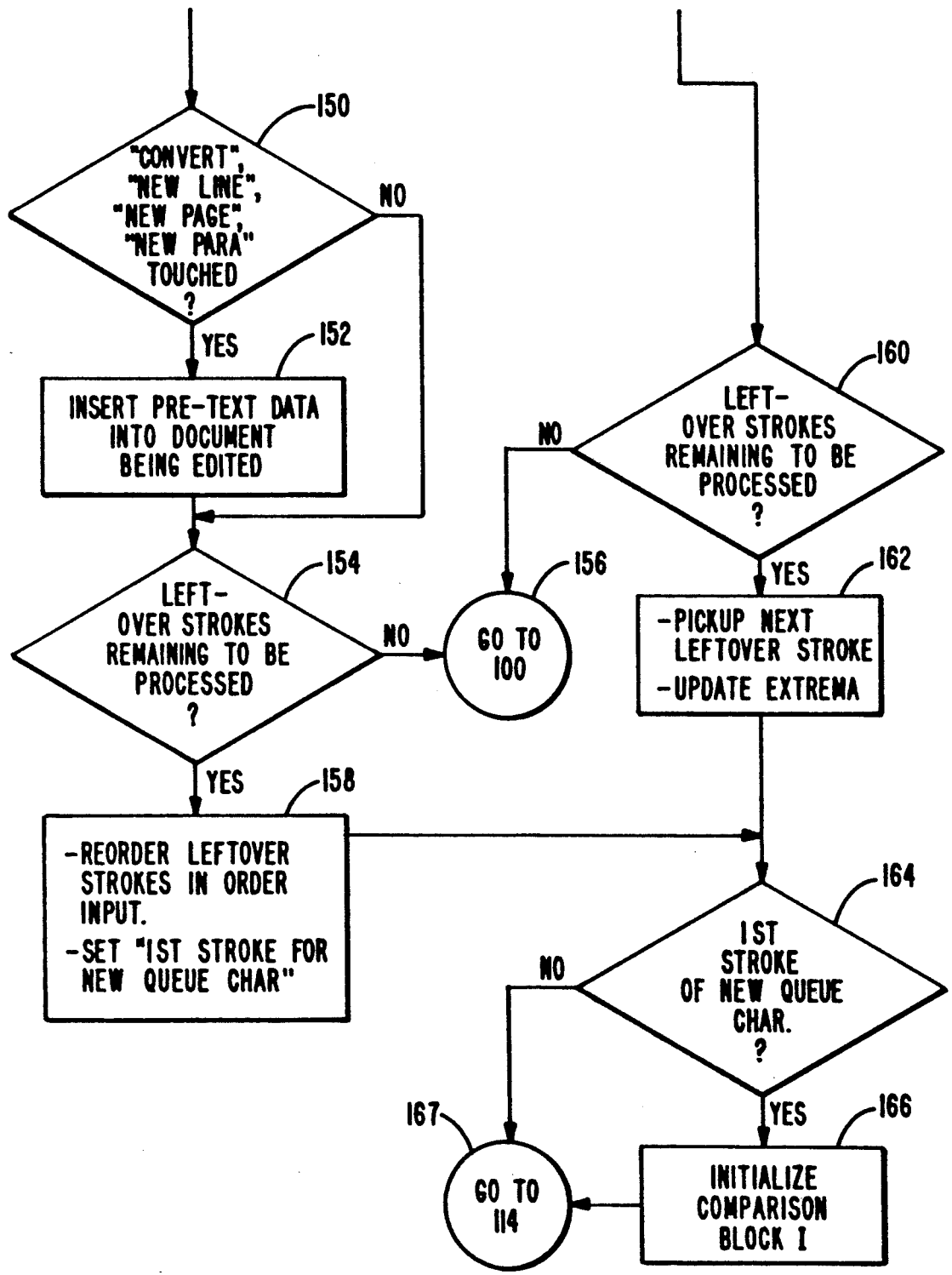
FIG._7E.

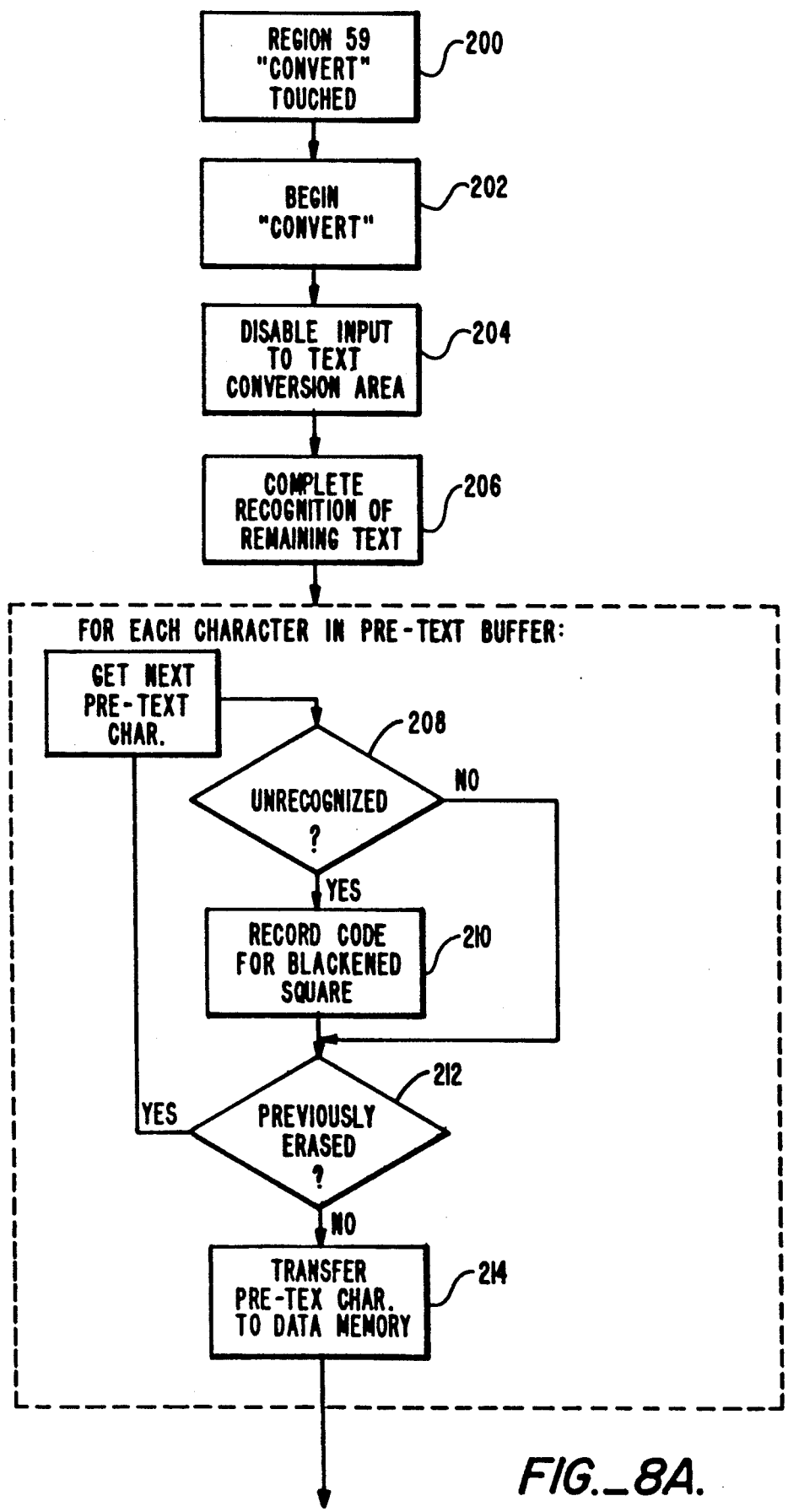
FIG._8A.

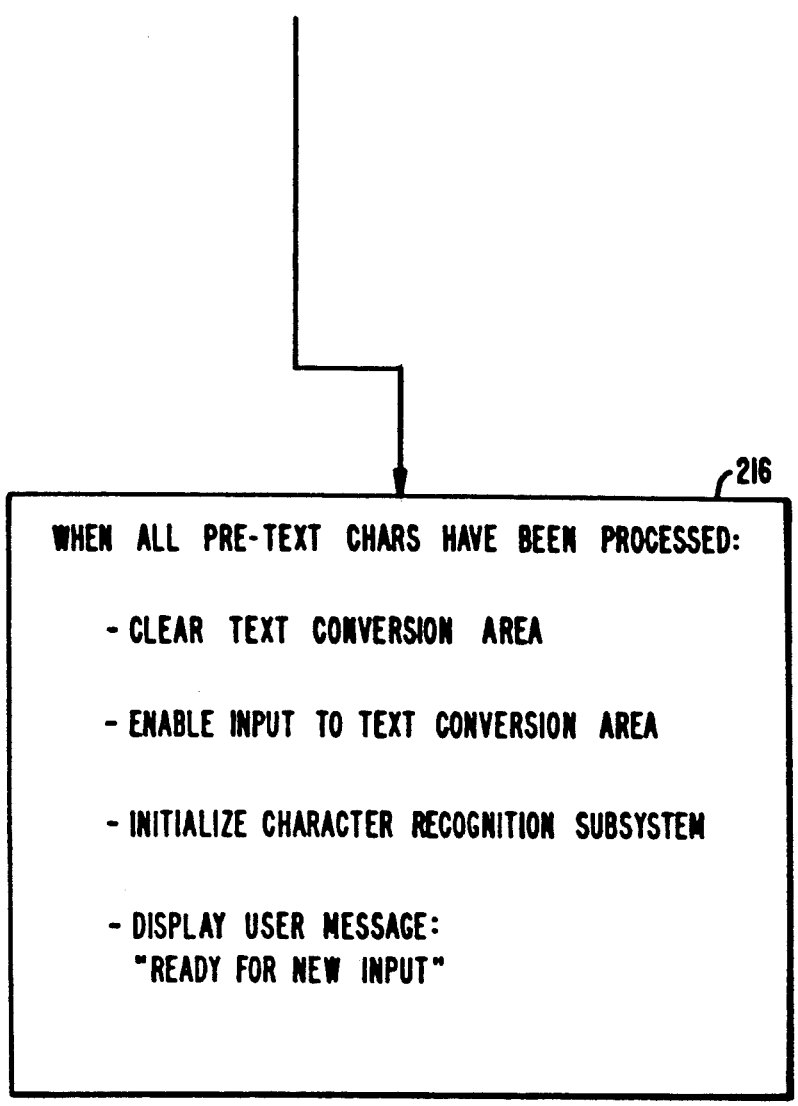
FIG._8B.
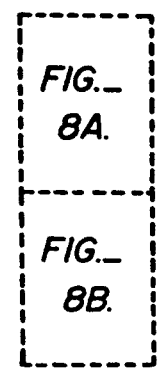
FIG._8.

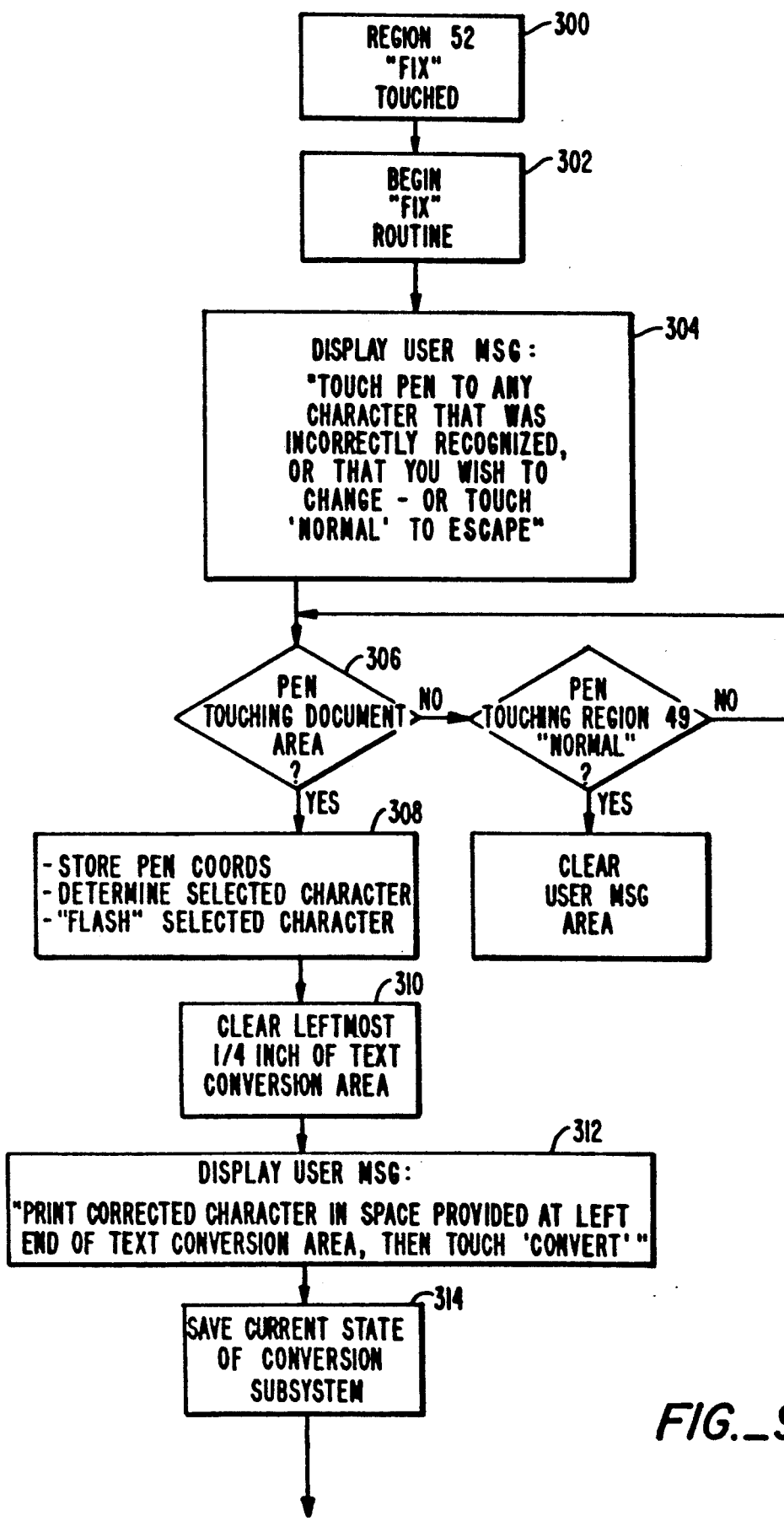
FIG._9A.

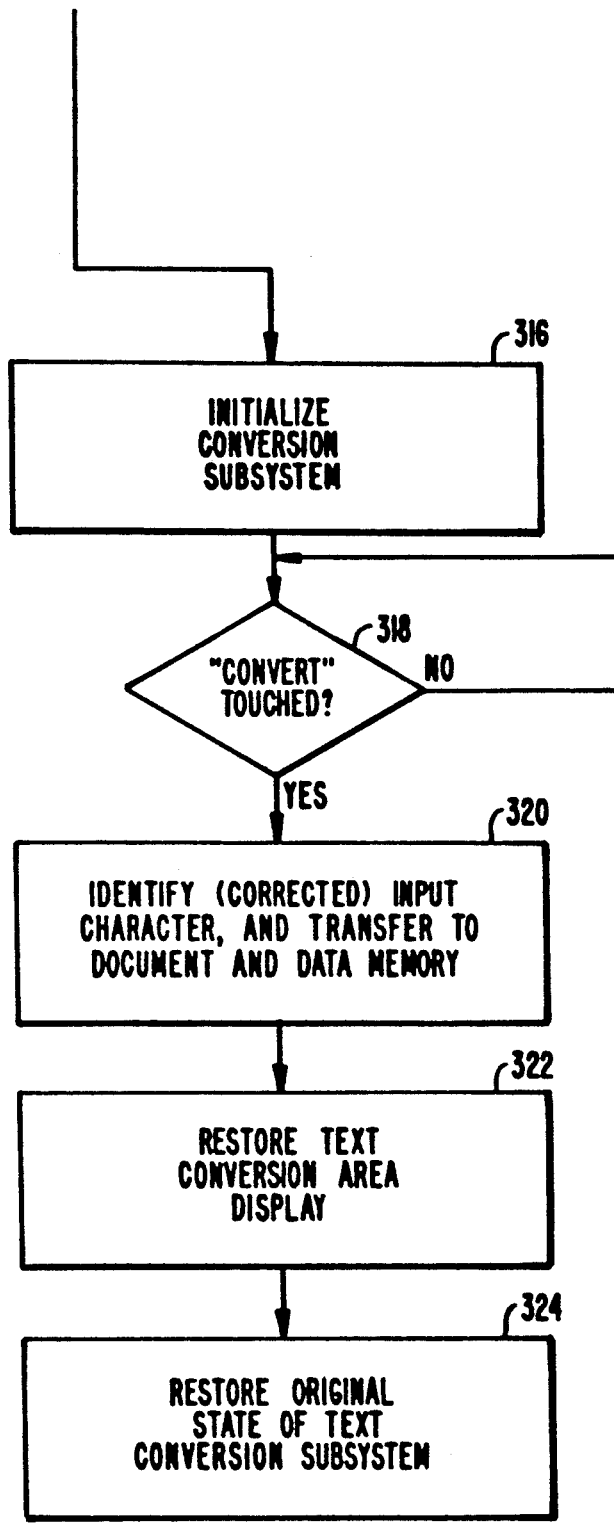
FIG._9B.
FIG._9A.
FIG._9B.
FIG._9.

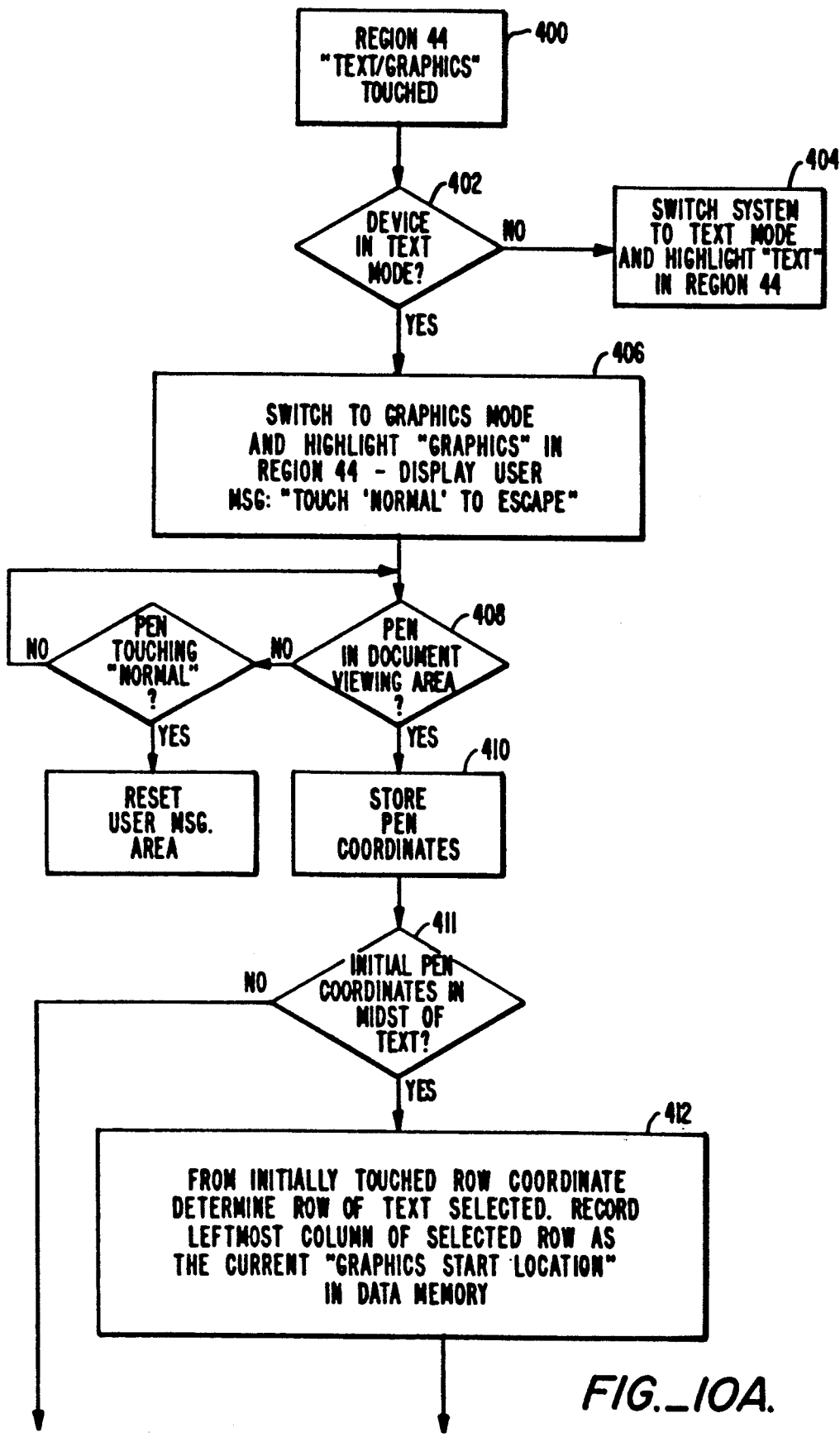
FIG._10A.

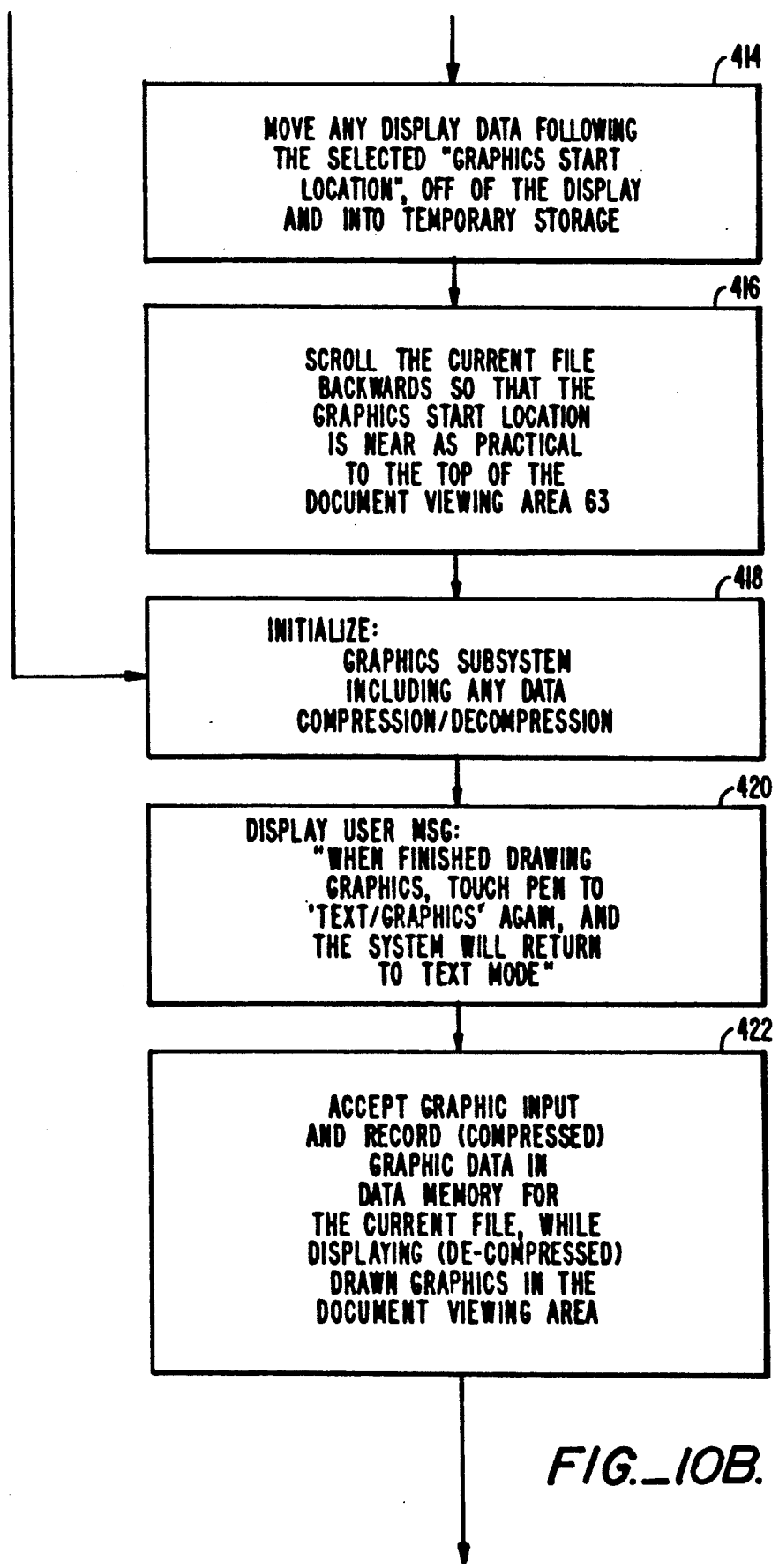
FIG._10B.

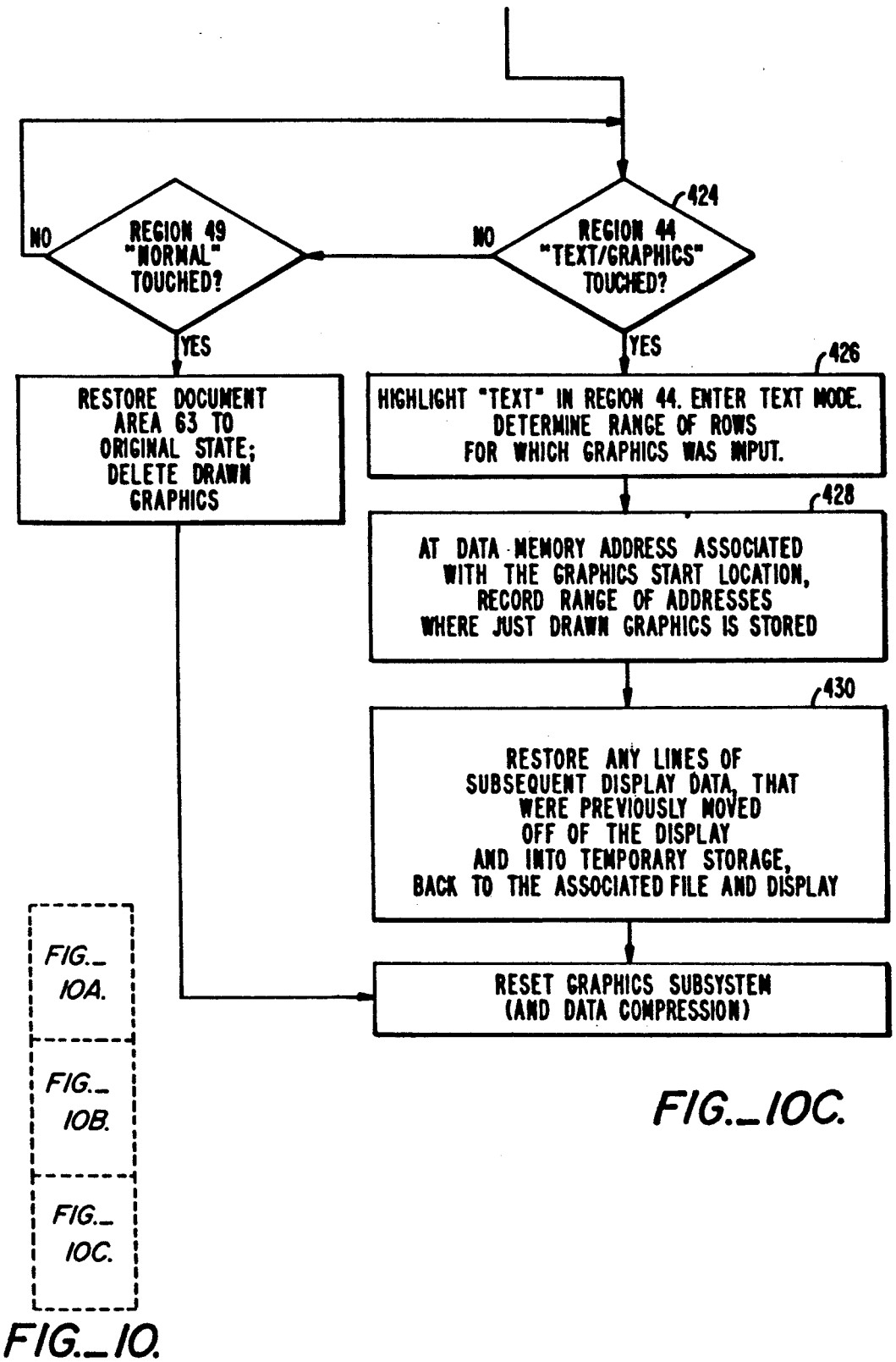

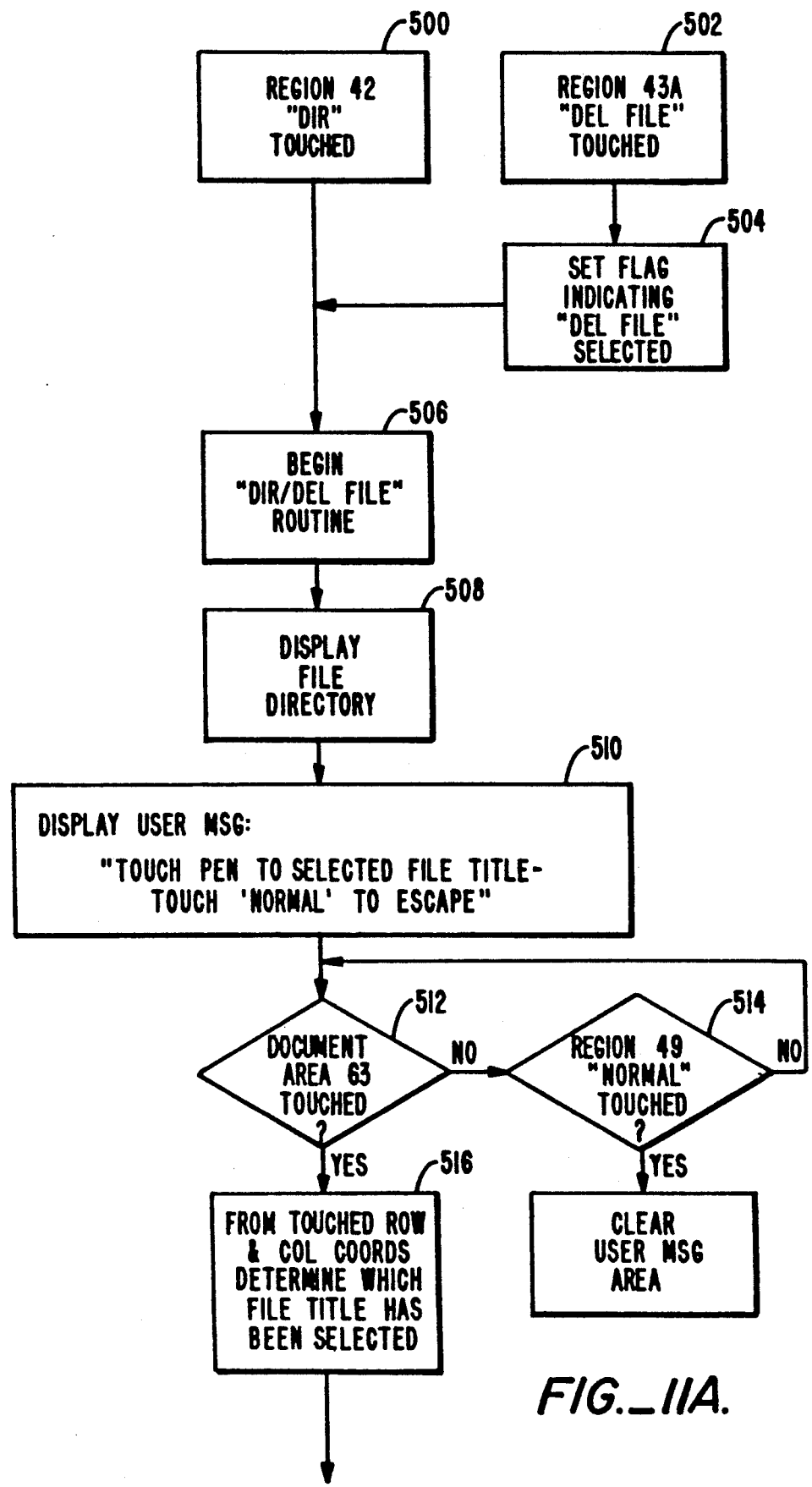
FIG._11A.

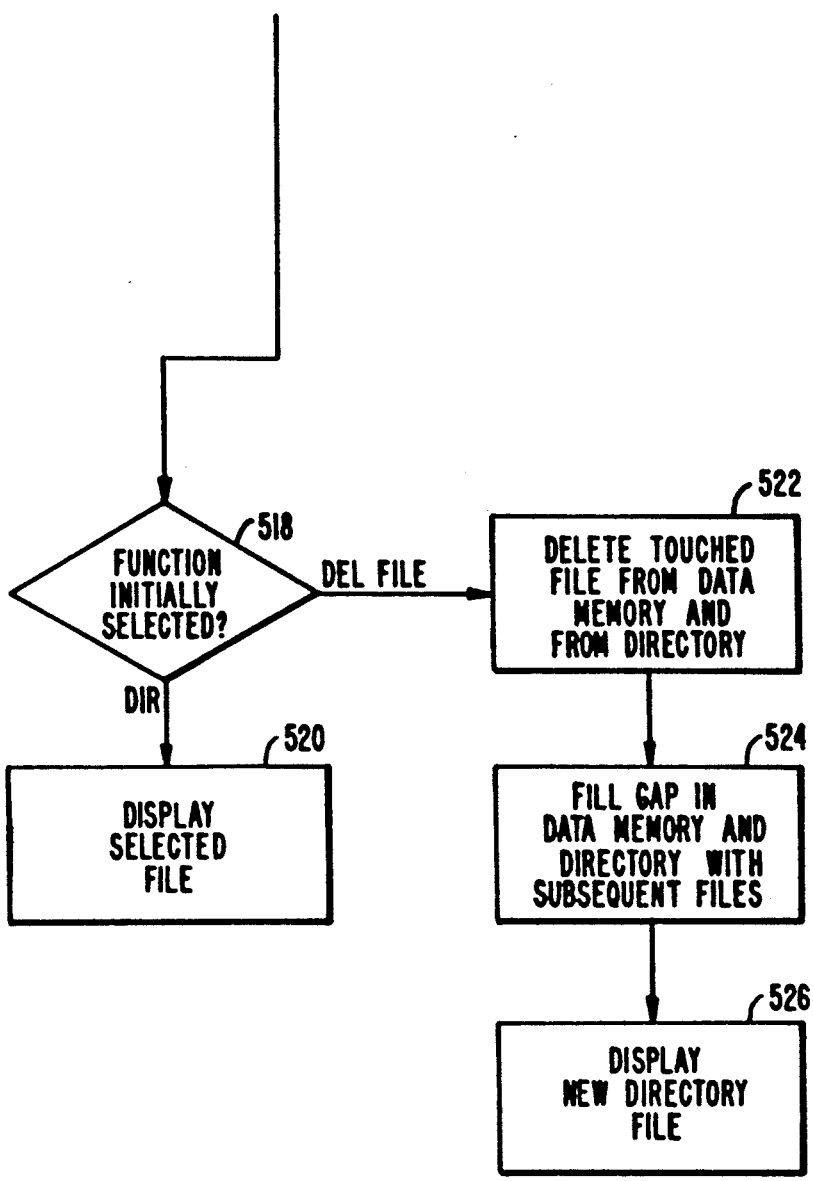
FIG.__IIB.

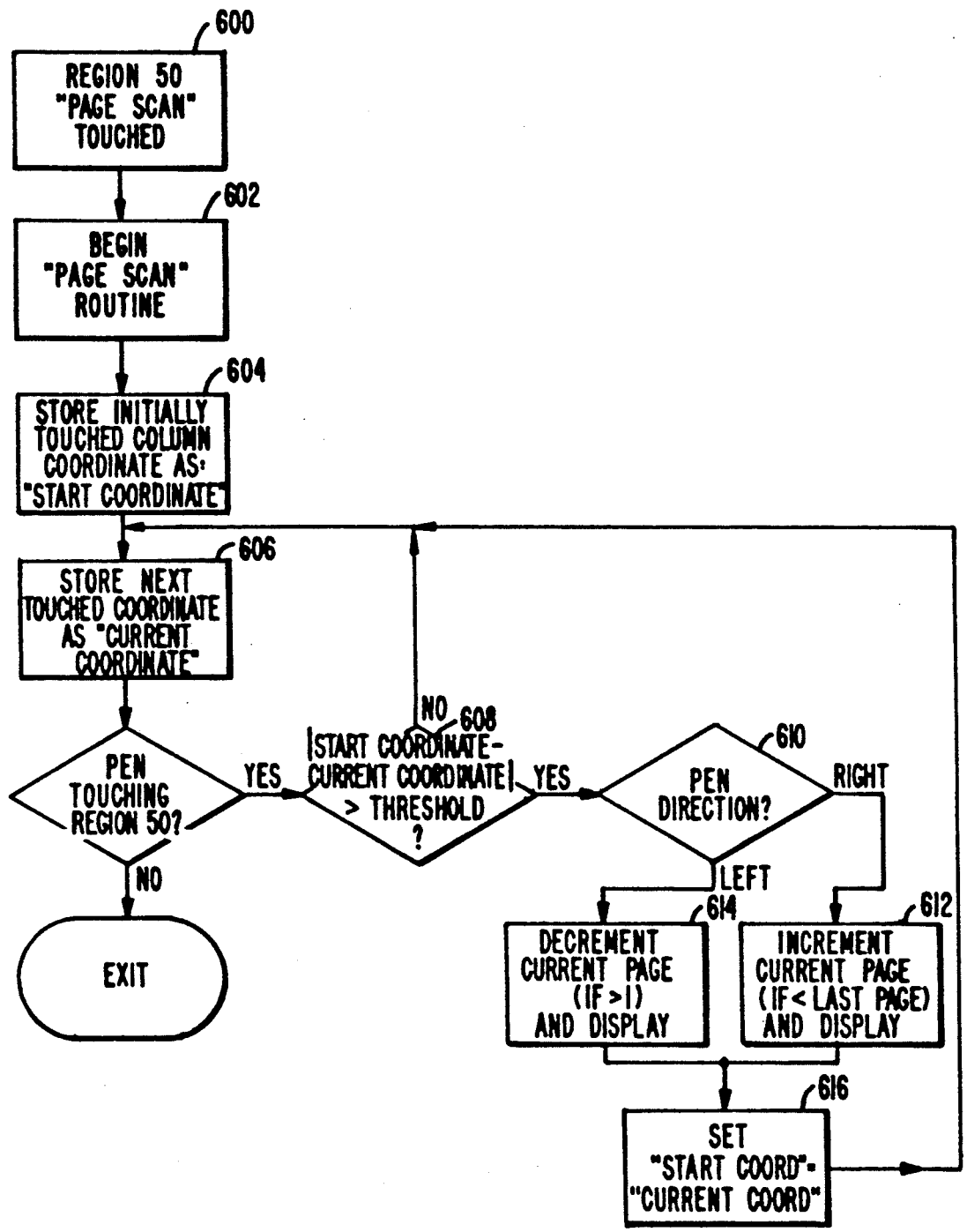
FIG._12.

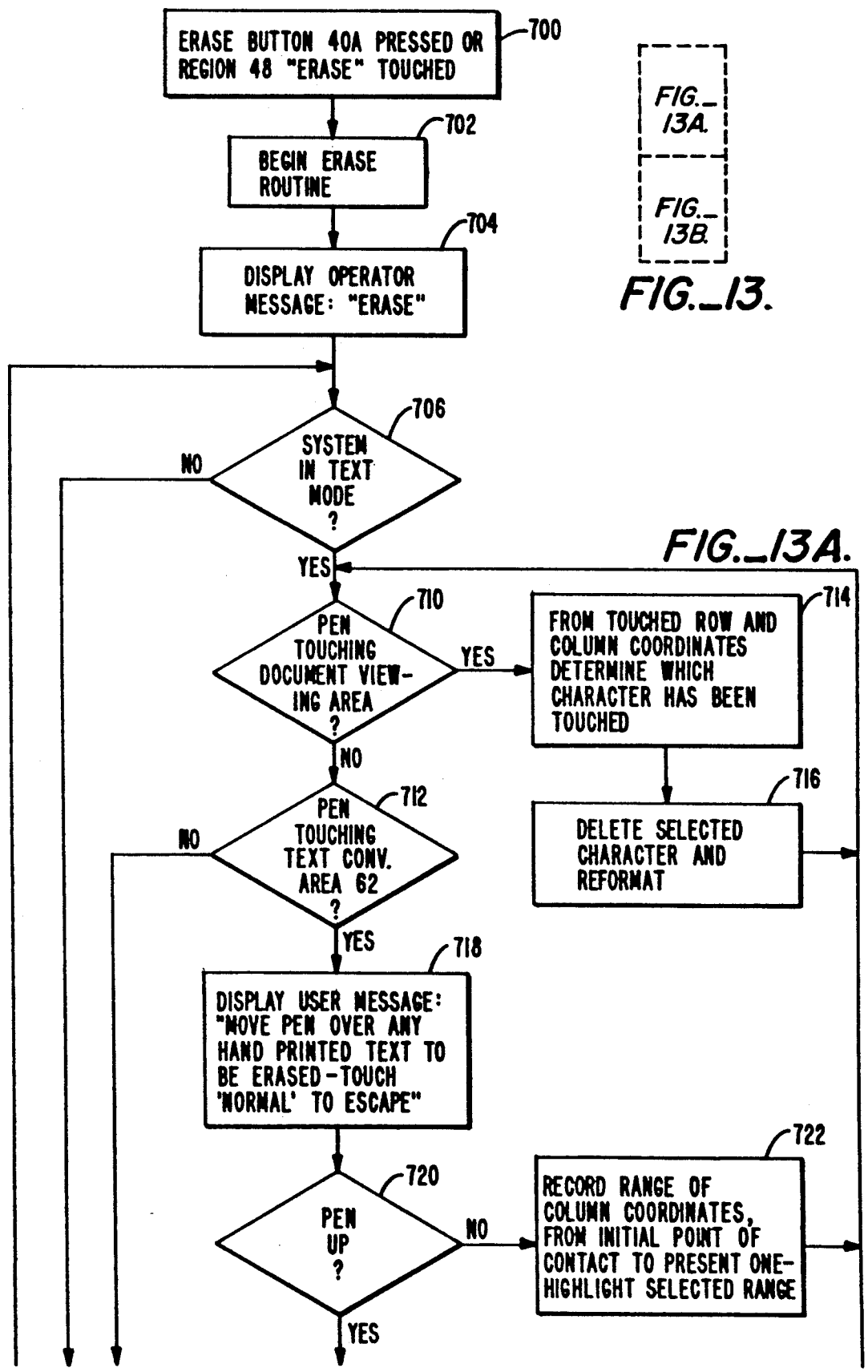

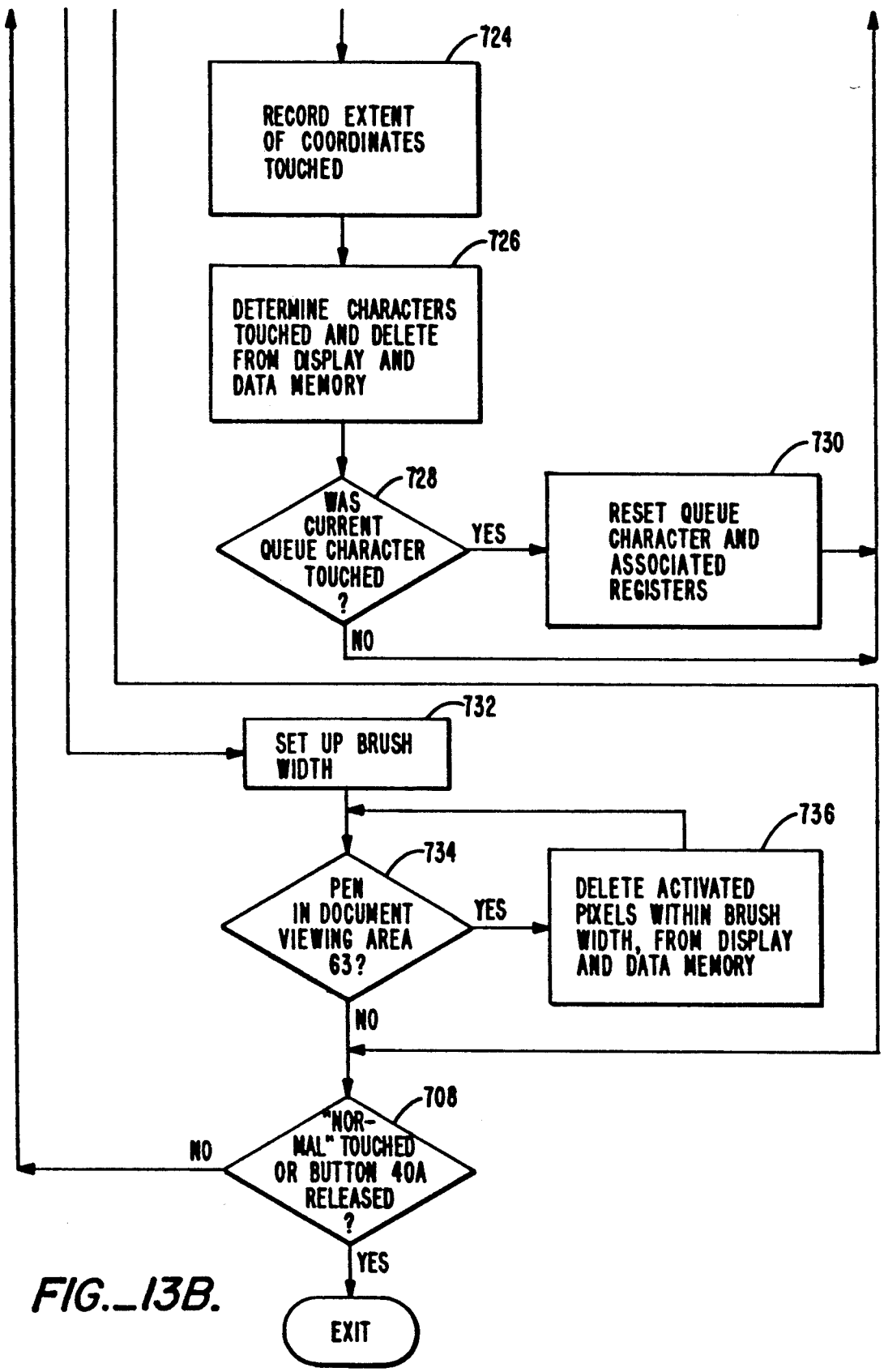
FIG._13B.

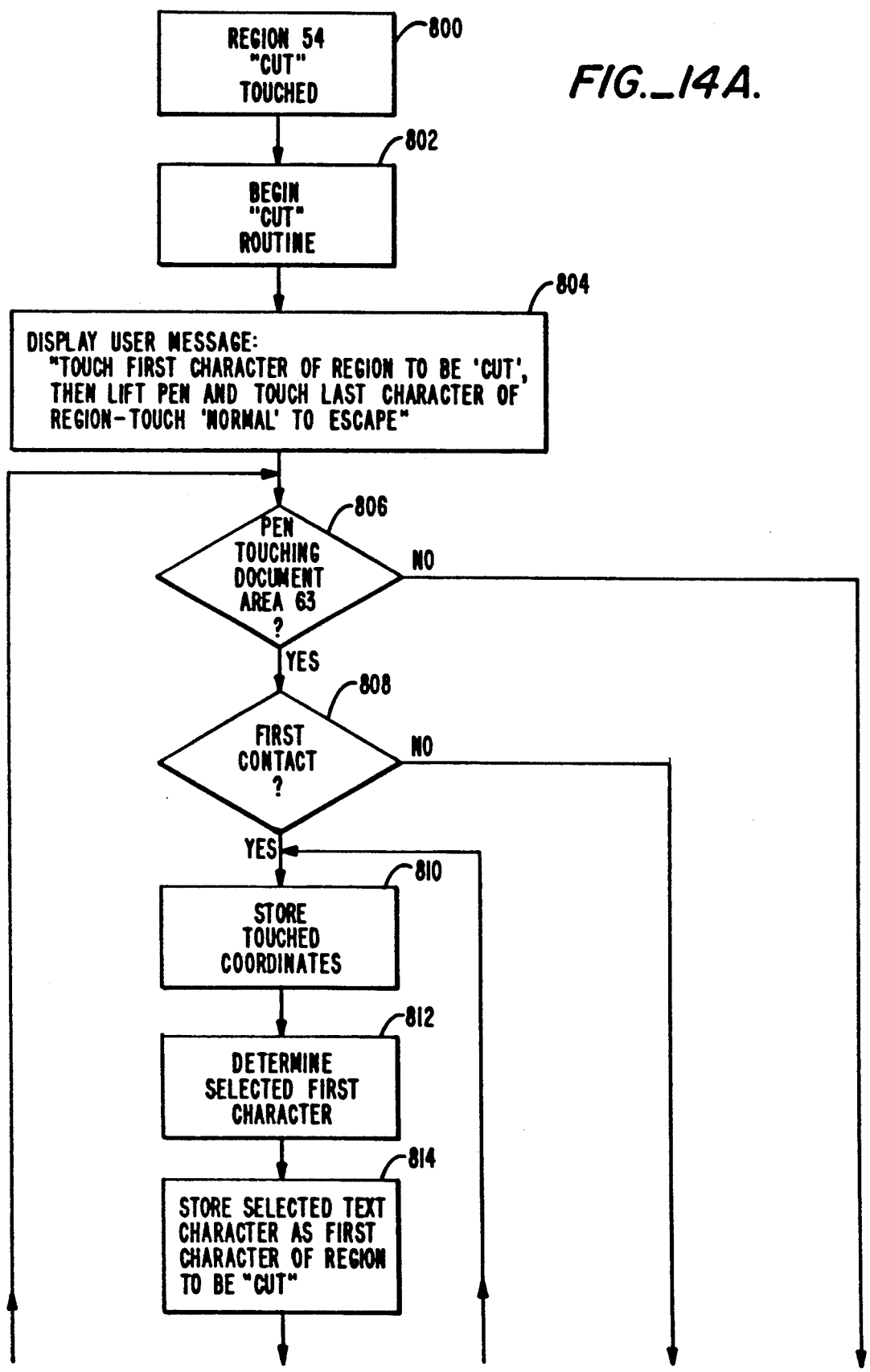
FIG._14A.

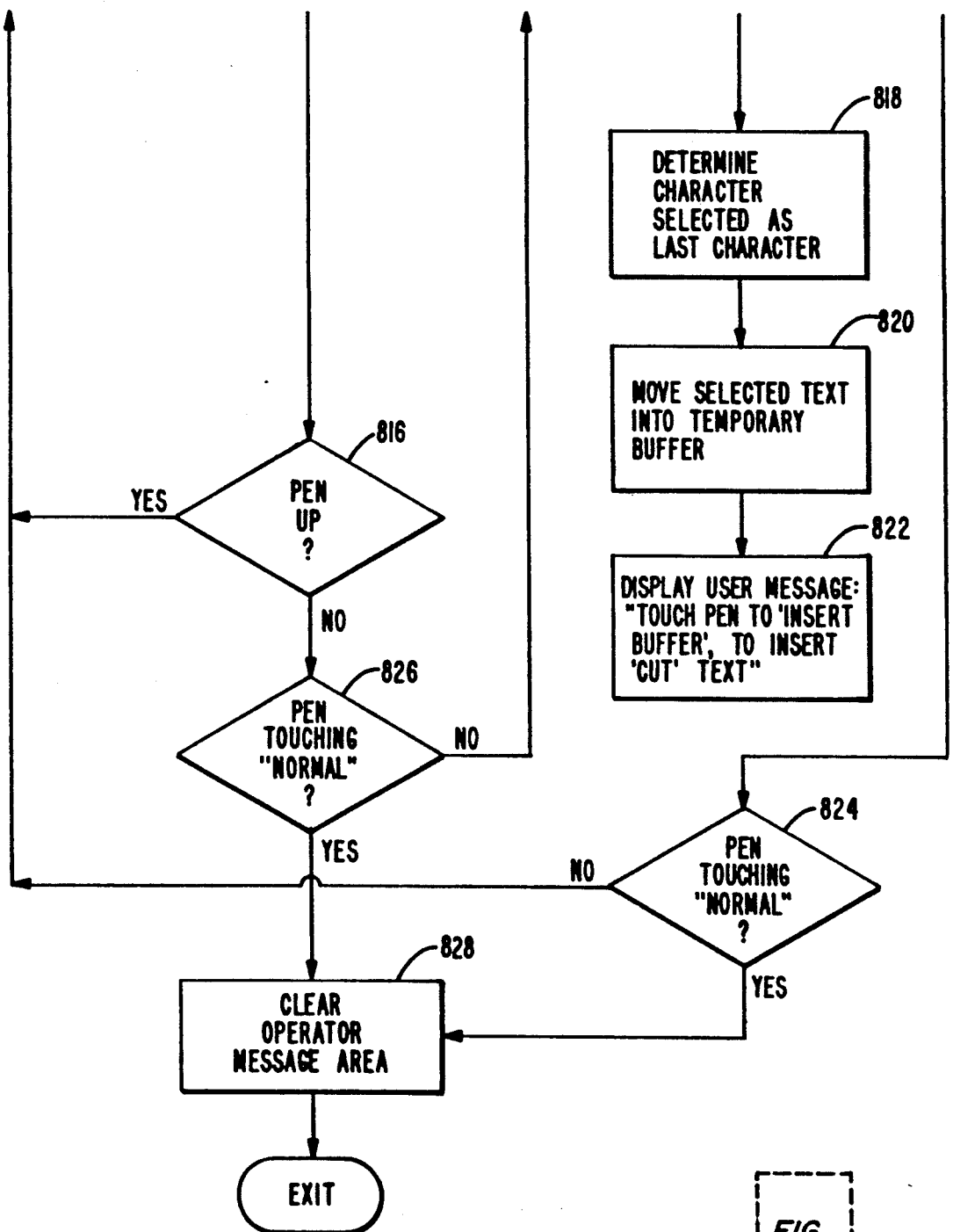
FIG._14B.
FIG._14.

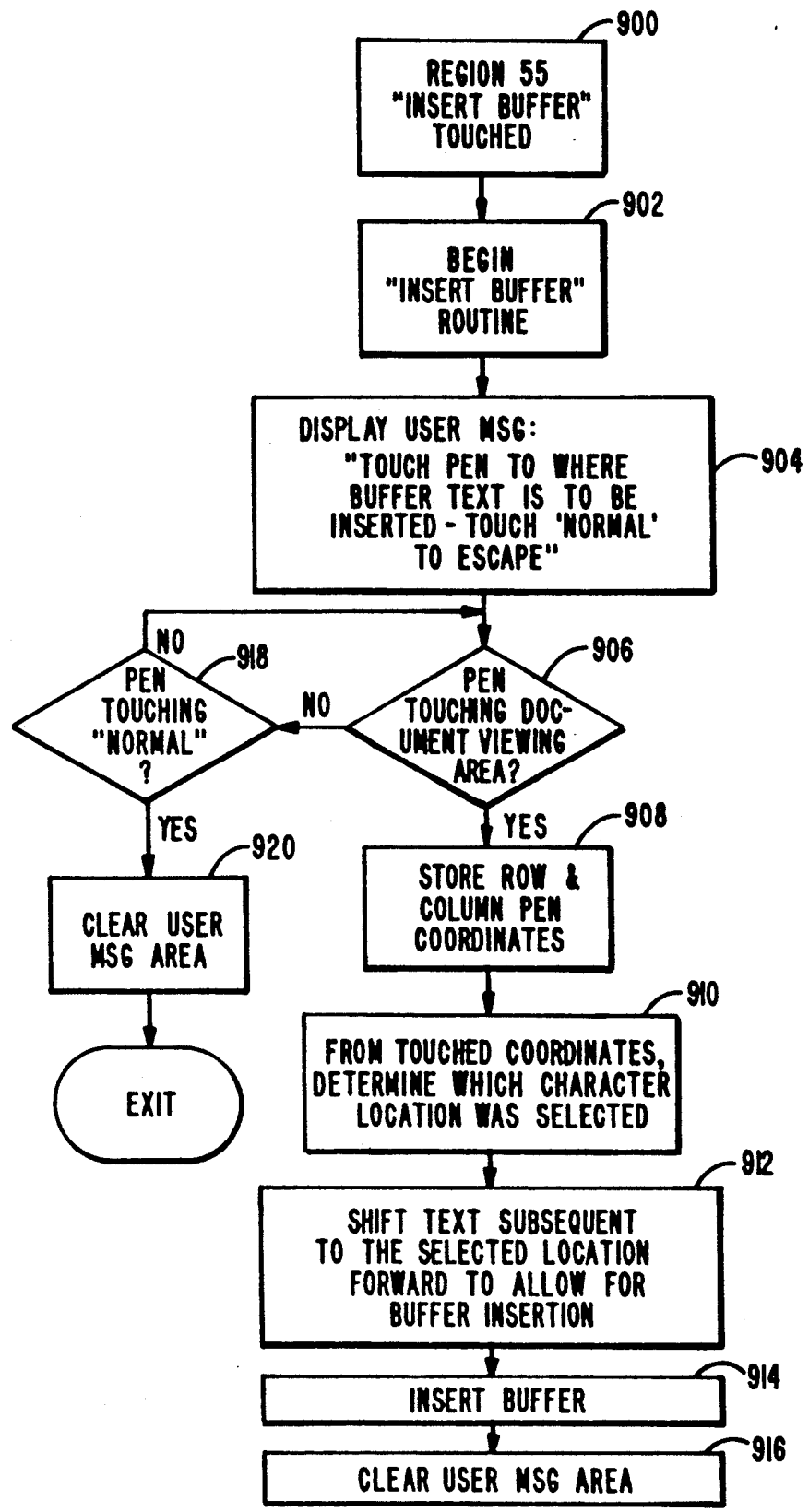
FIG._15.

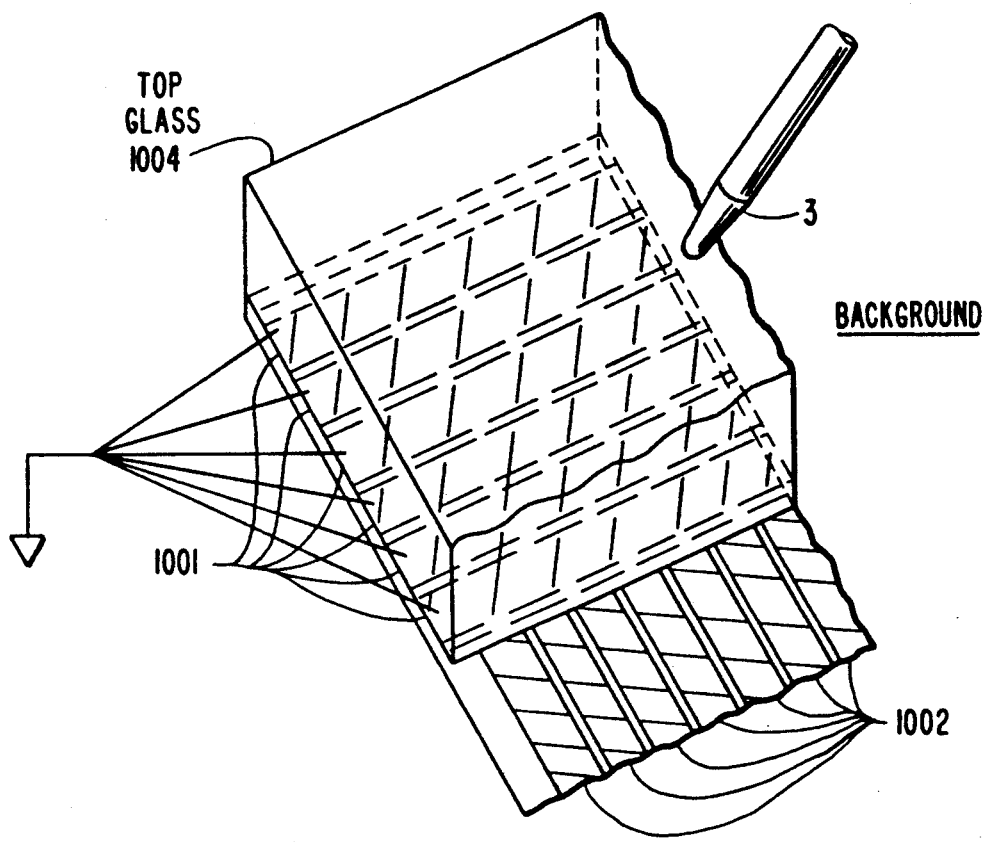
FIG._16
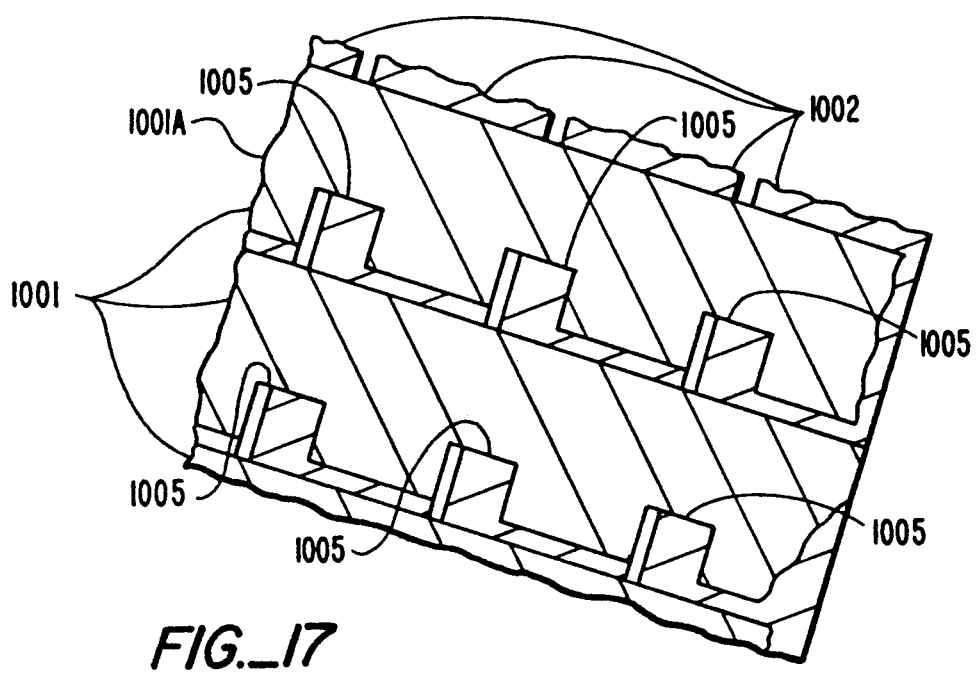
FIG._17

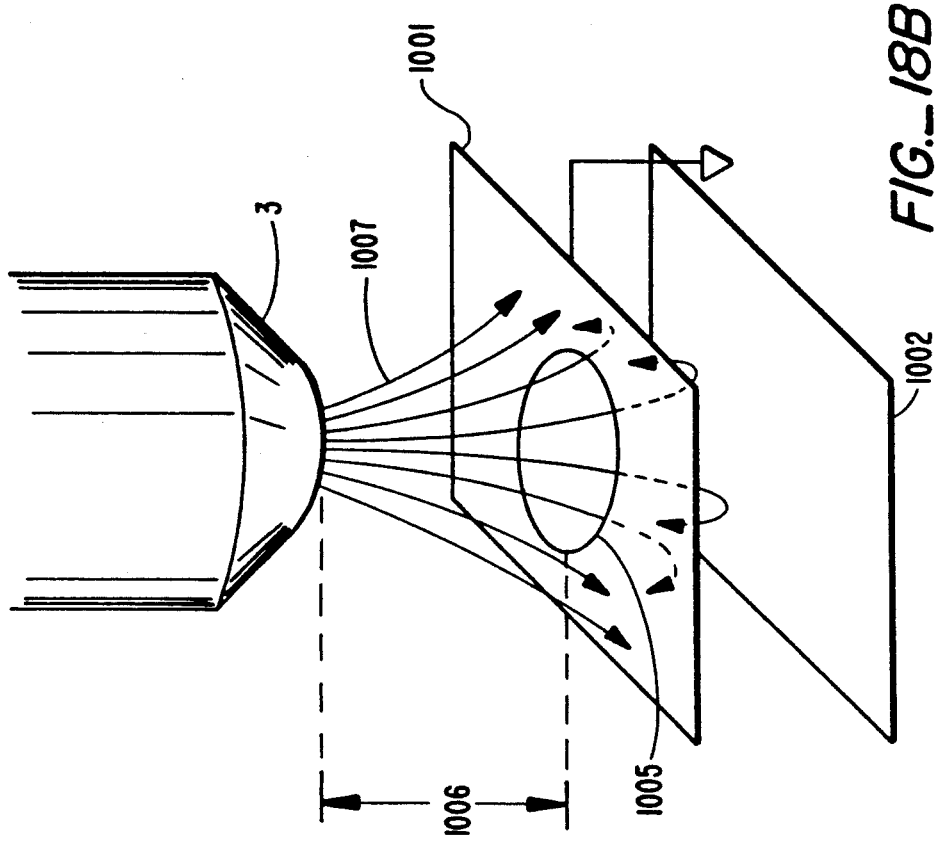
FIG._18B
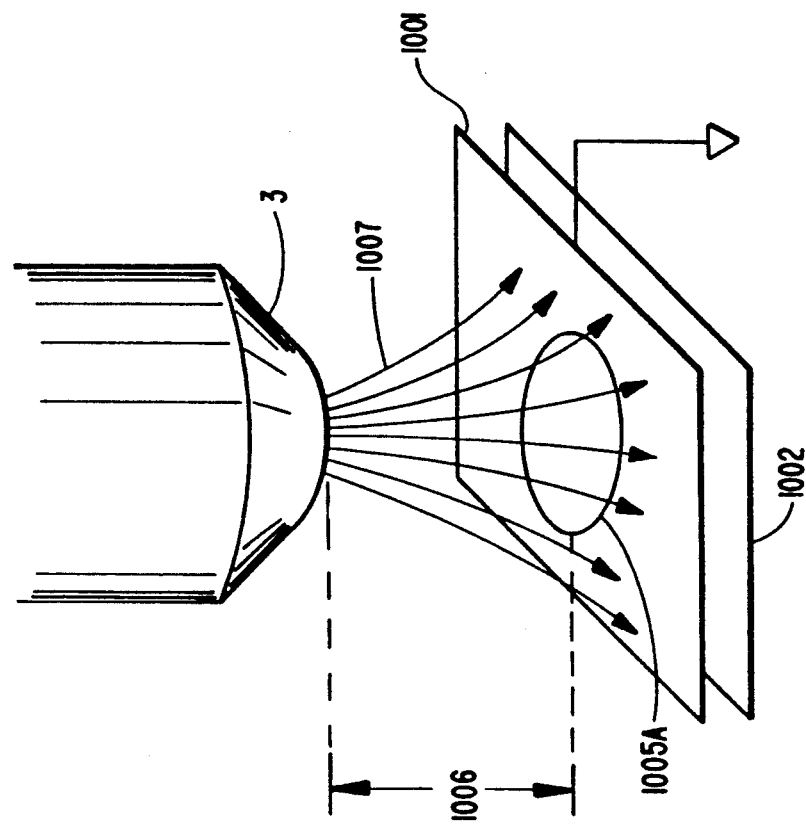
FIG._18A

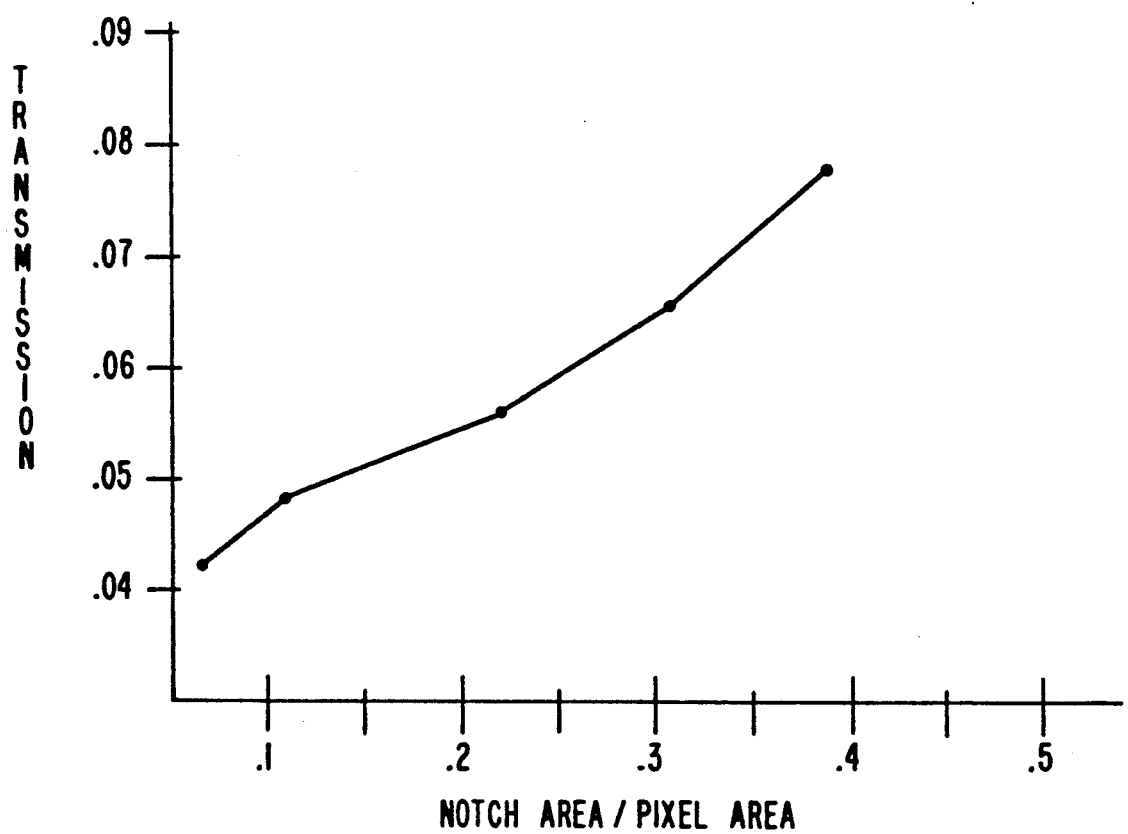
FIG._19
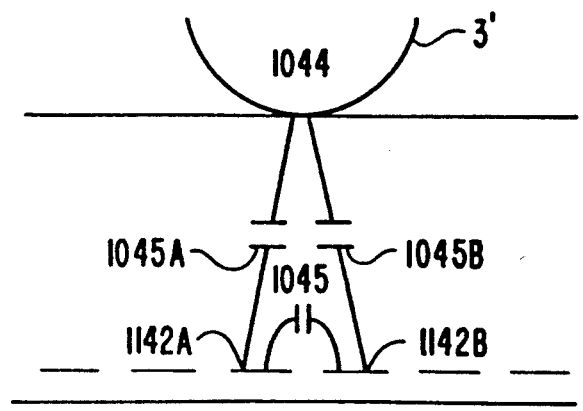
FIG._24

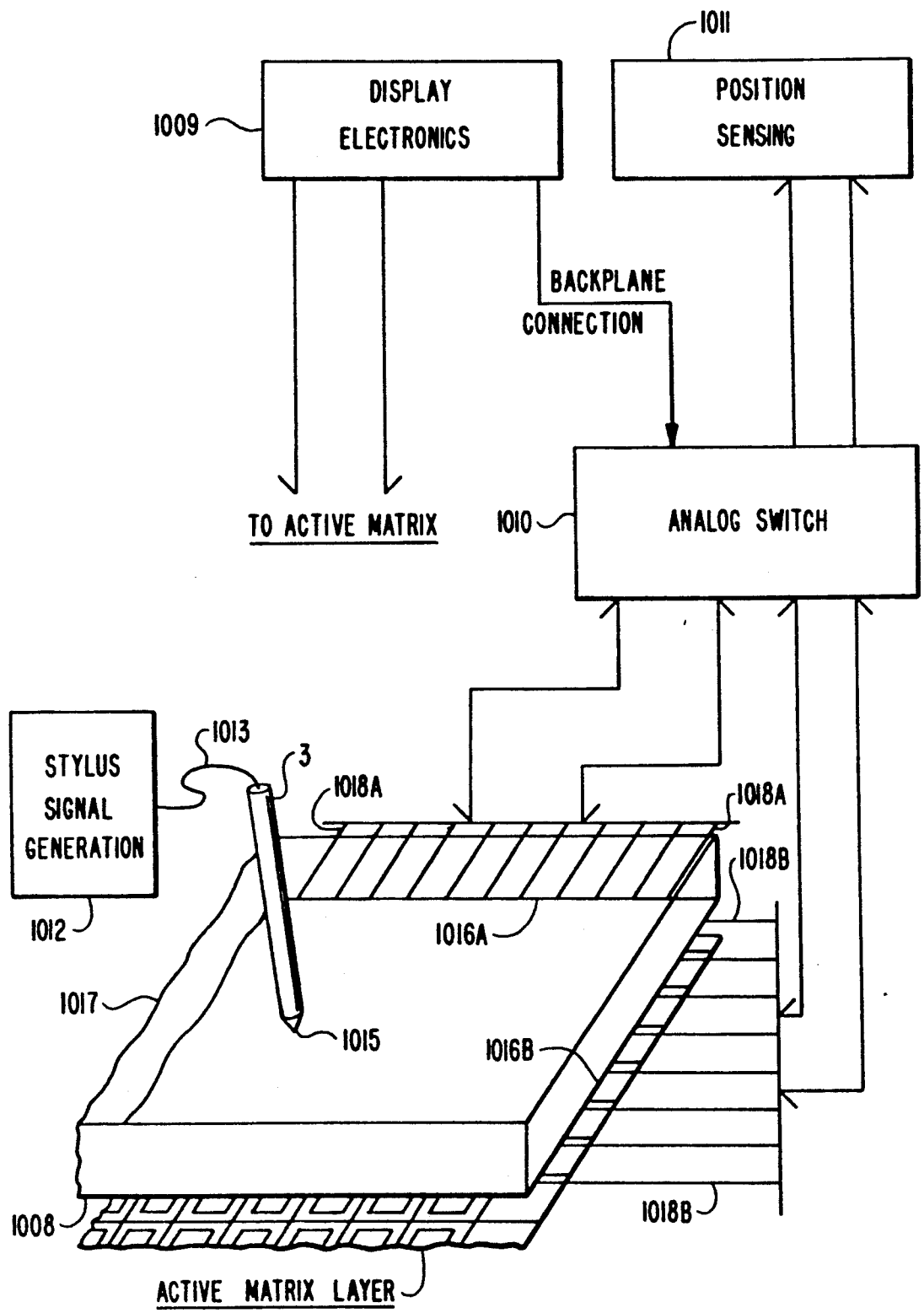
FIG._20

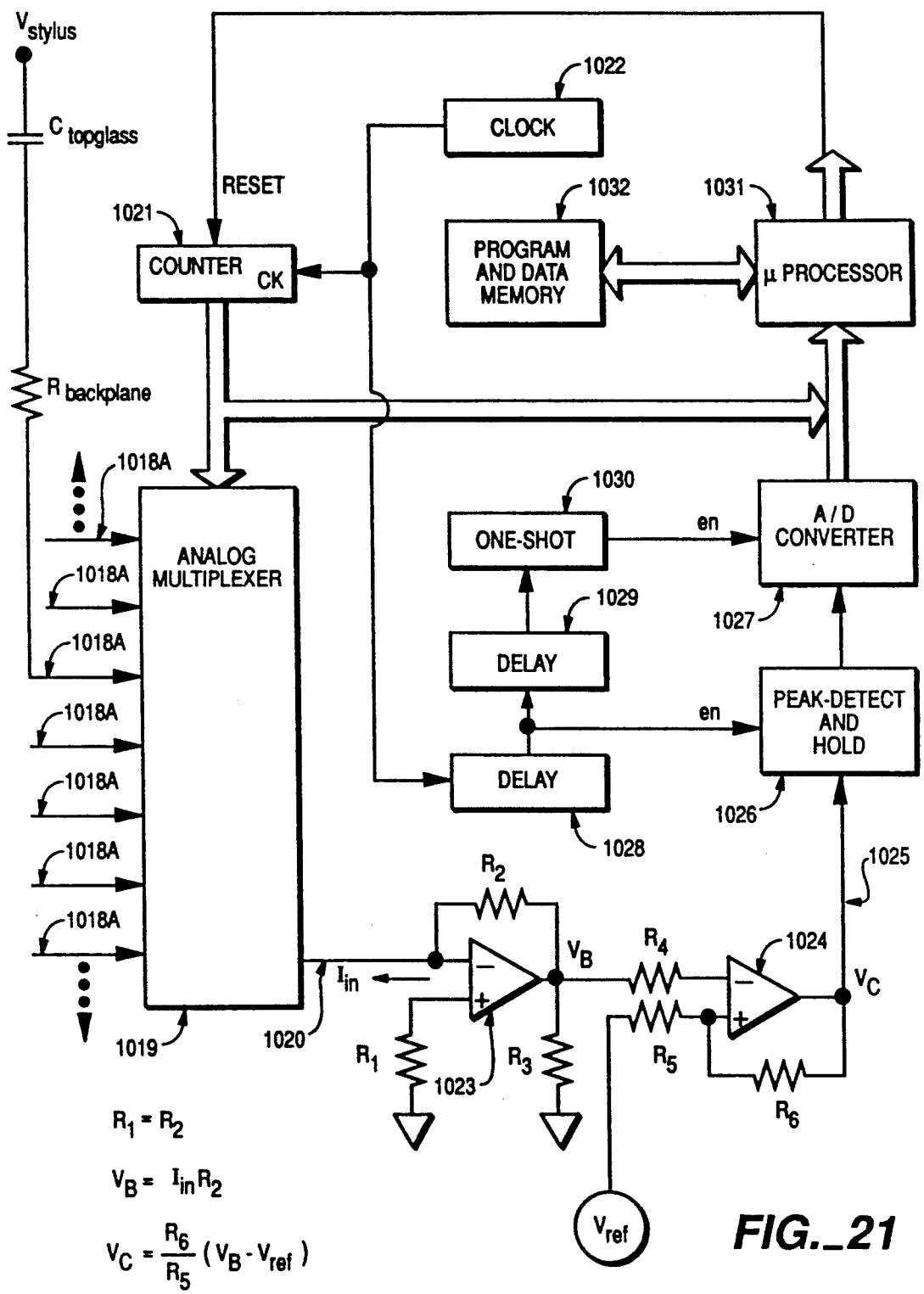
FIG._21

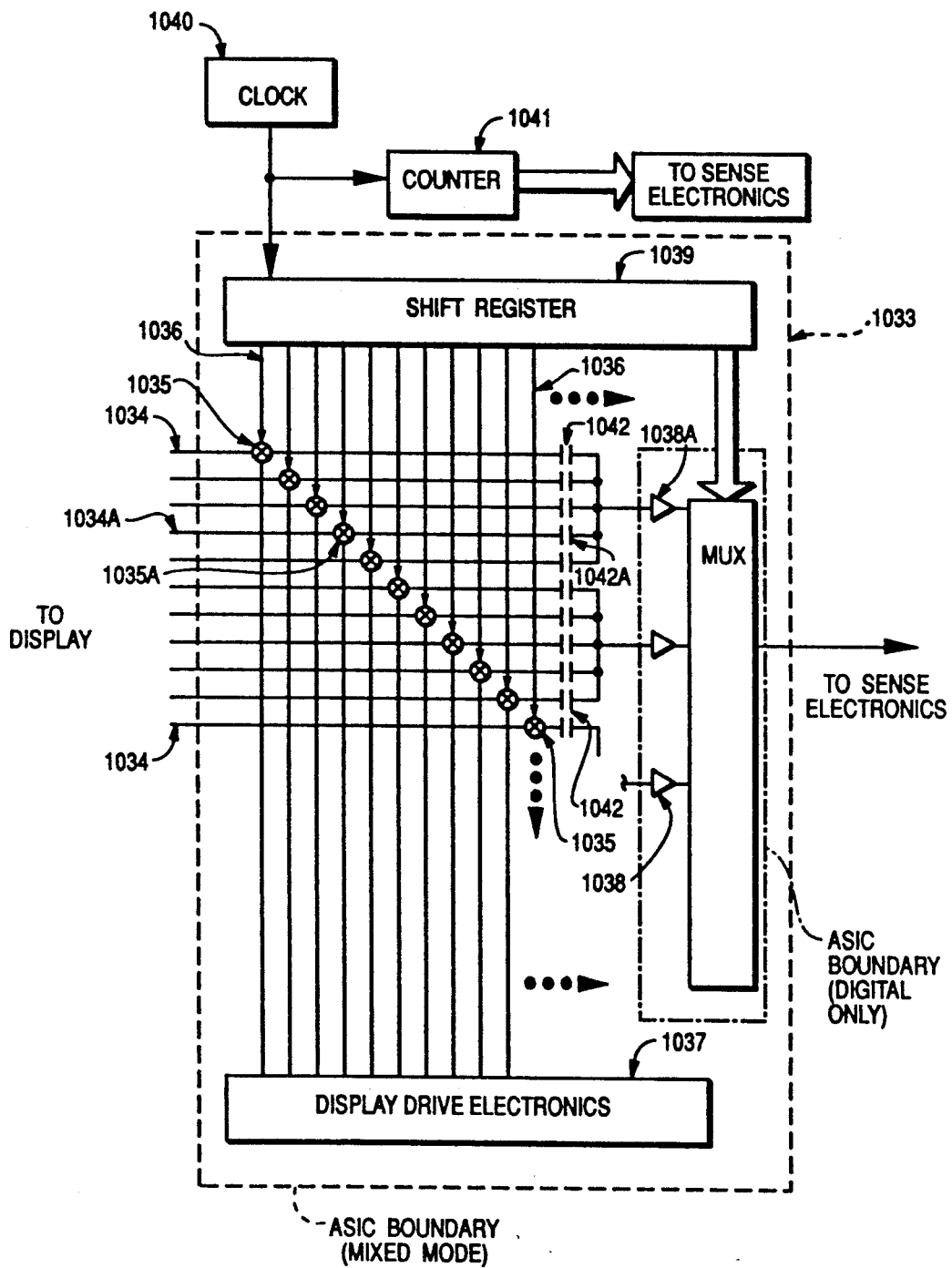
FIG._22A

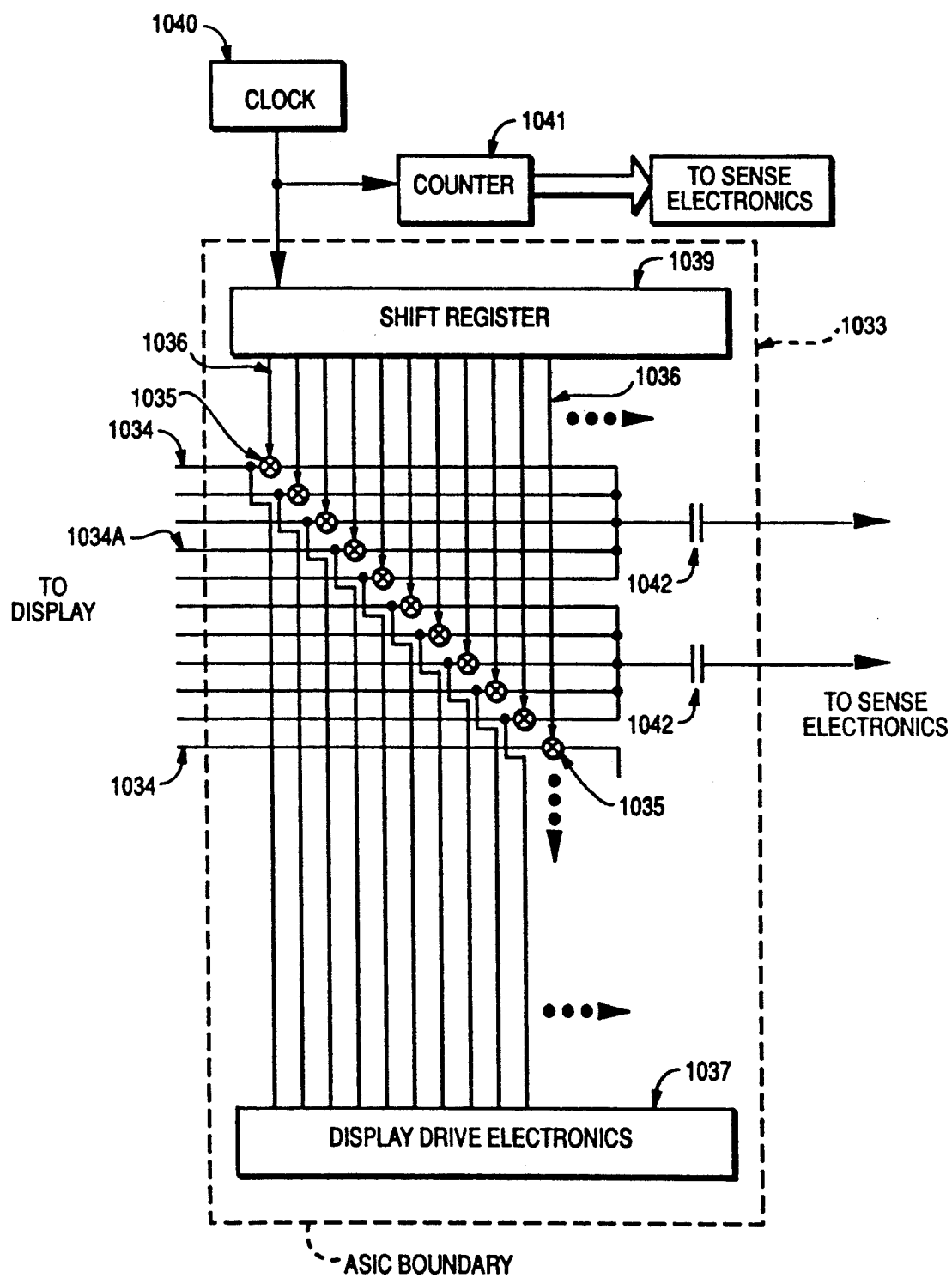
FIG._22B

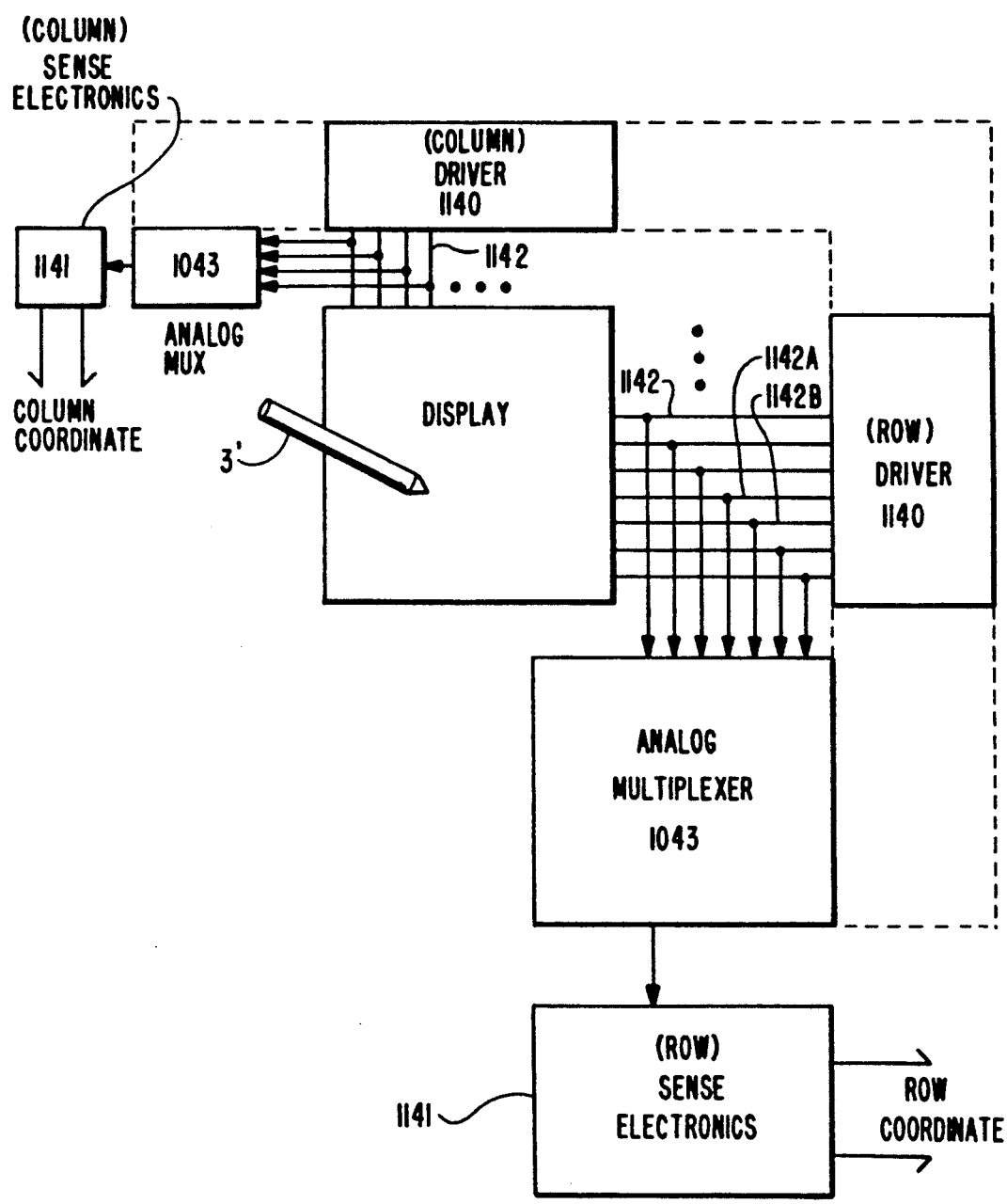
FIG._23

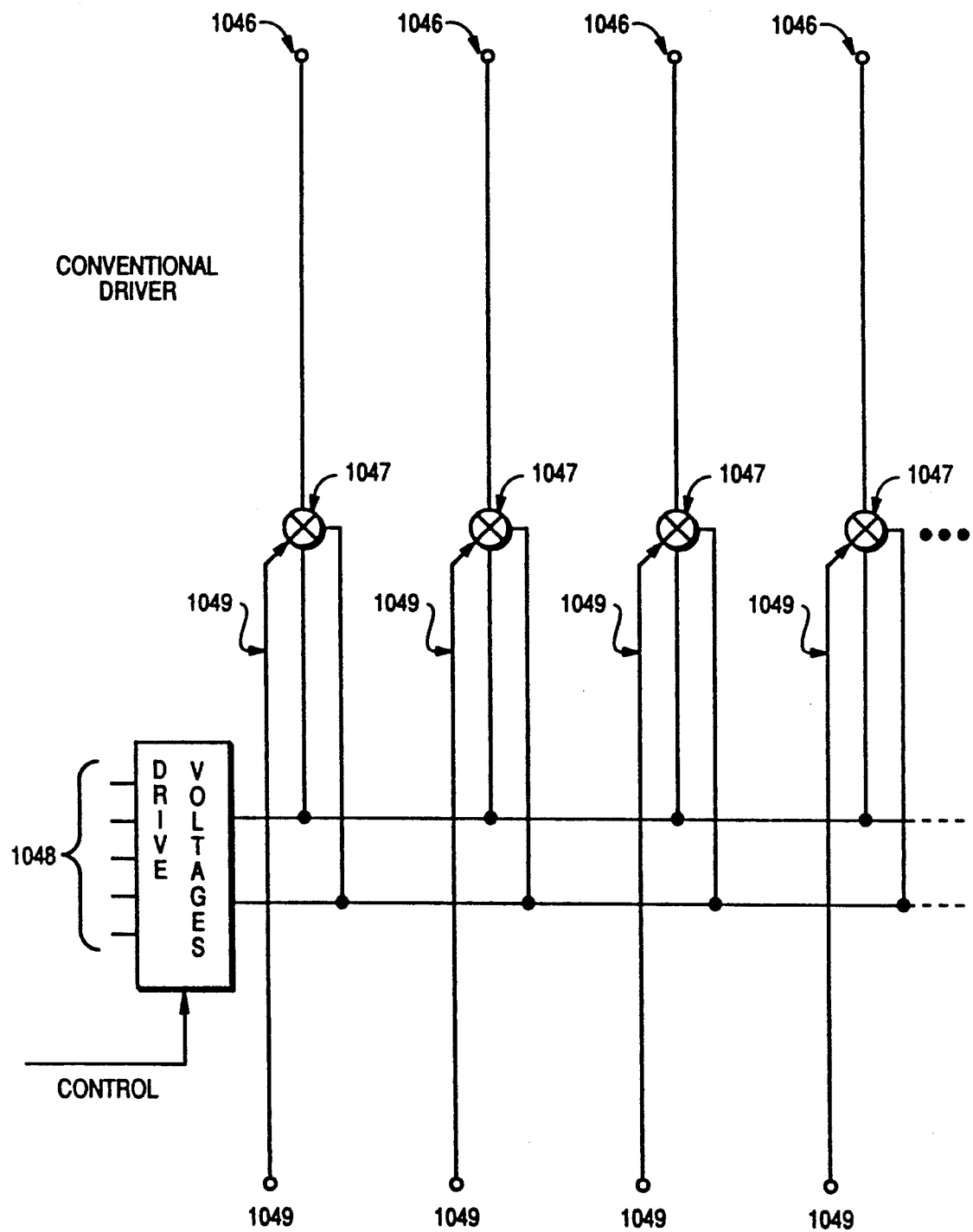
FIG._25A

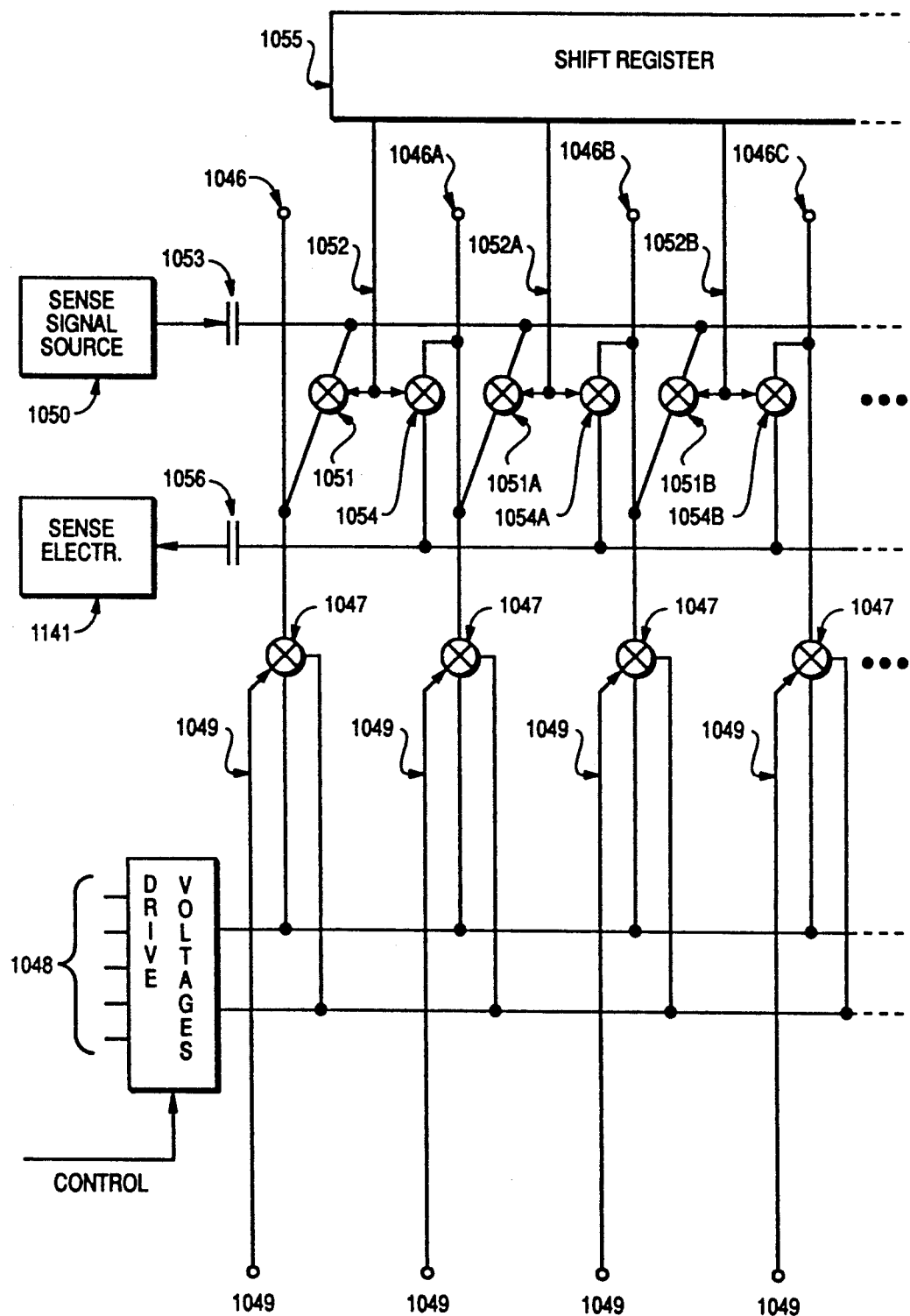
FIG._25B

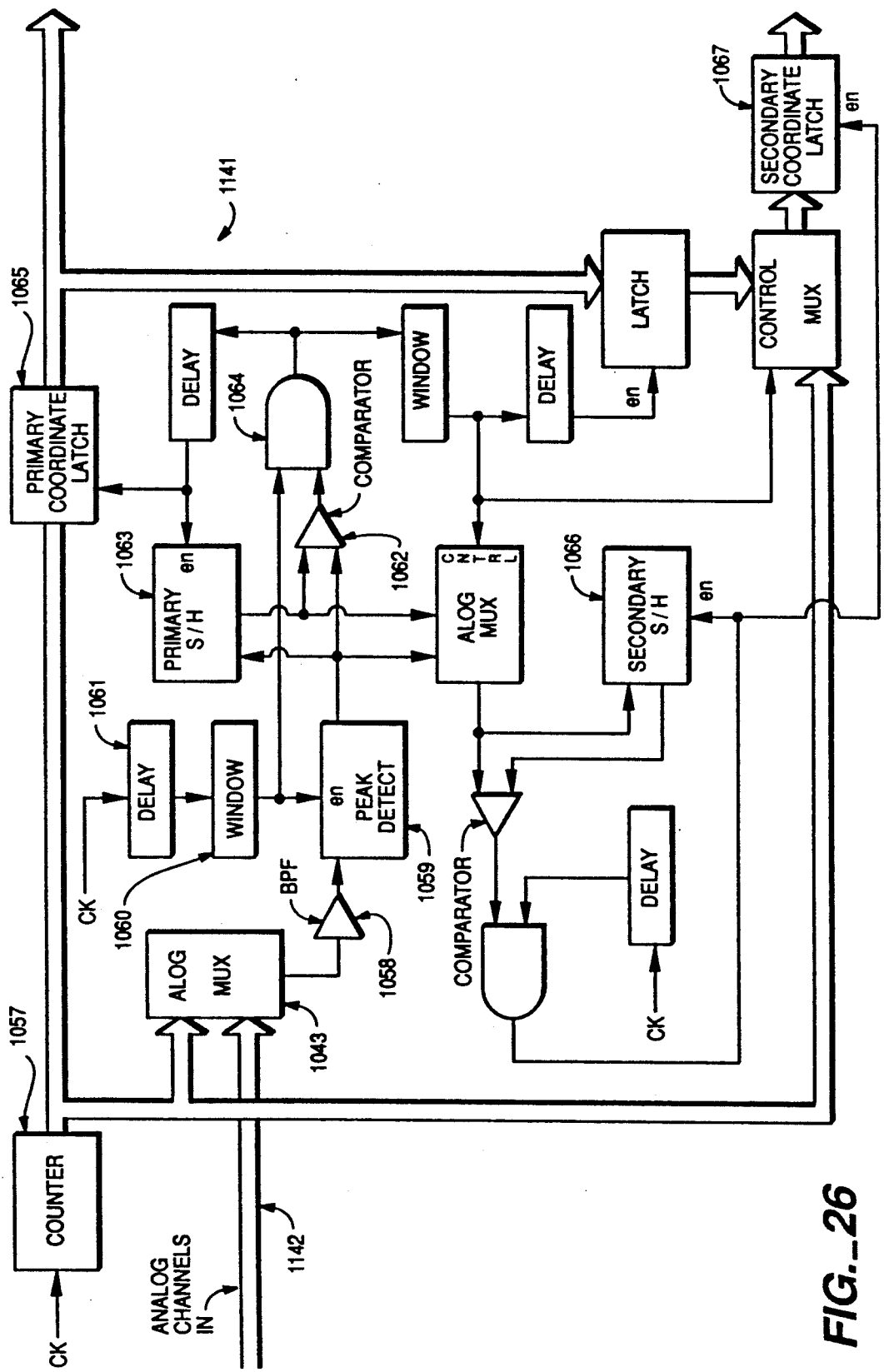
FIG._26

ELECTRO-OPTIC SLATE FOR DIRECT ENTRY AND DISPLAY AND/OR STORAGE OF HAND-ENTERED TEXTUAL AND GRAPHIC INFORMATION

CROSS-REFERENCE TO RELATED APPLICATION

This patent application is a continuation-in-part of Edward S. More and John C. Aiken, U.S. patent application Ser. No. 936,567, filed on Dec. 1, 1986, entitled "ELECTRO-OPTIC SLATE FOR INPUT/OUTPUT OF HAND-ENTERED TEXTUAL AND GRAPHIC INFORMATION", now U.S. Pat. No. 4,839,634.

BACKGROUND OF THE INVENTION

This invention relates in general to electronic data handling devices and, more particularly, to interactive electronic data processing and storage devices having integrated data displays. Specifically, the invention is directed to a portable, interactive electro-optic data input/output, processing, storage, and display device responsive to hand printed text and hand drawn graphics, as well as hand entered commands, input directly onto the display surface, for providing an electronic writing and drawing slate. The device also provides an input/output capability with other information processing equipment, such as a printer, plotter, or computer.

Various display systems are known which incorporate the capability for pointing or writing directly onto a display screen, along with a detector for sensing and encoding the location of the finger of a user or a writing stylus on the display screen so that graphic information can be drawn directly onto a display surface. These display systems include devices utilizing a separate sensing substrate (such as a touch screen), high power (e.g., CRT, light emitting diode, and electroluminescent) devices, and non-emissive displays using display element locations as input points. These display systems have various shortcomings.

Touch screen and other display systems utilizing separate hardware on the display surface for sensing the position of a writing stylus (or finger), such as a dedicated sensing layer, are typified by input resolution lower than desirable for interactive input and processing of detailed graphics. Input registration and parallax present problems for interactive graphics when physically separate sensing and display elements are employed at resolutions desirable for detailed graphics. Limits on miniaturization of sensing hardware and dedicated interconnecting lines for addressing individual sense locations also place restrictions on achievable input resolution. Additionally, fabrication costs and complexity are increased by the need for separate dedicated sensing hardware on the display surface, as well as requirements that the sense locations be interfaced with display hardware for properly associating the sense locations with the appropriate display elements.

CRT's and display systems employing other emissive (e.g., LED and electroluminescent) displays in connection with a light pen do not require auxiliary sensing hardware on the display surface. The need for auxiliary sensing hardware on the display surface is eliminated by providing a light receiving pen which senses light emitted from the display elements. The optical output from emissive display elements detected by the light pen is then used to determine pen position. See U.S. Pat. No. 4,268,826. Since these display systems use emissive display elements, however, they consume more power than desirable for a portable battery-operated device.

Non-emissive mechanical displays incorporating a writing instrument employ mechanical display elements moved through a fluid whenever the state (i.e., "on" or "off") of any of these elements is changed. See U.S. Pat. No. 4,520,357. These mechanical displays require greater operating power than other non-emissive electronic (e.g., liquid crystal) displays. Additionally, the writing instrument changes the state of display elements by moving them physically, while leaving the previously stored state of any touched display element in memory unchanged. Input to memory is effected by detecting the state of each display element after input by the writing instrument, and then comparing the detected state to the state previously stored in memory. The memory can then be updated to reflect any inputted change in state. Since input depends upon changing the state of the display elements, and since the writing instrument can change only "on" display elements to "off," or vice versa, the user is able to effect input only to one of either "on" or "off" display elements at any one time. This is a substantial limitation to interactive word processing and graphics, as well as to other input operations, which desirably accommodate input to arbitrary display element locations (regardless of whether they are "on" or "off").

Other non-emissive displays utilizing display elements as input points are also known. These include a thermally addressed smectic liquid crystal device (see "Thermally Addressed Liquid-Crystal Flat Display with Laser Light Pen," Society for Information Display, Digest of Technical Papers, 1985, pages 289–292), as well as an interactive electrophoretic display (see "A Stylus Writable Electrophoretic Display Device," SID Digest, 1979, page 44). The thermally addressed device requires an operating power of 25–35 watts, as well as a full display write time of 10 seconds, making it unsuitable for highly portable and interactive applications. The electrophoretic device requires a pen voltage of over 200 volts to obtain a reasonable writing speed.

The principal problem with the interactive mechanical, the thermally addressed, and the electrophoretic displays, however, is that they all perform their pen input functions by physically toggling the state of display material to be only one of either "on" or "off," then periodically comparing new input from the pen to display states that are stored in memory, and then updating the memory with the new input. Consequently, all of these devices have the problem that pen input cannot be made to arbitrary display locations regardless of whether those locations are "on" or "off." This limitation makes these devices undesirable in a majority of interactive applications that may involve pointing to arbitrary locations on the display. Furthermore, since pen input is accomplished by modifying the state of display elements, the achievable speed of input is dependent upon display fluid and mechanical properties. This causes pen movement limitations, particularly at high resolutions and refresh rates.

Additionally, low power electro-optic displays suitable for displaying text and graphics are known. These displays can be constructed with high pixel densities including surface areas containing many thousands of individually addressable pixel display elements. The compact nature, flat profile, light weight, and low power requirements of some of these displays have contributed at least some degree of portability in such products as laptop personal computers which embody a flat panel information display with sufficient pixel density to display graphics and with a large enough active surface area to display multiple lines of text. Unfortunately, these displays are typically associated with additional components, such as keyboards, which detract from the overall compactness and portability and do not accommodate direct hand entry of data onto the display surface. Further problems associated with using known techniques in connection with a high resolution, portable data input/output, processing, storage, and display device will become apparent in view of the following observations.

Low power consumption is essential, in the context of portability, to facilitate operation for long periods between battery replacements, as well as the use of inexpensive and readily obtainable batteries which occupy minimal space. Additionally, low power consumption enables the use of other modes of compact and portable power, such as solar cells. Also, low power consumption enables storage of large quantities of information, for longer periods, in low cost, high capacity, volatile memory.

Non-emissive displays (e.g., twisted nematic LCD's) offer very low power consumption and low cost in comparison to other known flat panel devices and can be produced by well known manufacturing processes and with high resolution active matrix addressing for high contrast and wide angle viewing. Among the problems in employing these displays, however, is detection of writing stylus position. By way of contrast, on the one hand, non-emissive displays using display elements as input points (e.g., mechanical displays) avoid the need for auxiliary sensing hardware on the display by employing display elements themselves as pen sense points by providing an input writing instrument which physically toggles the position or state of display elements in a way that is both visible as a change in display state (e.g., "on" to "off"), and detectable by display electrodes (e.g., as a local capacitance change). In order to effect input, these displays compare display element states before writing instrument input (stored in memory) and after writing instrument input. Thereafter, any inputted changes to the display are updated in memory.

On the other hand, emissive display systems eliminate the need for auxiliary sensing hardware by utilizing a light pen with the ability to sense the optical output of emissive display elements themselves. In contrast, a non-emissive display (e.g., twisted nematic LCD) which does not physically switch the state of bistable display elements with pen input does not toggle the display elements for electronic sensing, nor are its display elements light emitting as in emissive displays with pen input.

An additional problem in such a display relates to the speed with which writing stylus input must be sensed in order to accommodate high input resolution without auxiliary sensing hardware on the display. Emissive, mechanical, and other display systems, which use the display elements themselves as pen sense points, perform the sensing function by sampling each pen sense location on a display surface, either in concert with display output, or in a separate cycle, and for each pen sense (display element) location, the presence (or absence) of the writing instrument or light pen is determined. To accommodate a human observer, an interactive display must check all pen sense locations on a display surface for new input, and then update the display for viewing any new input, within a "frame time" period of roughly 30 milliseconds. In this regard, the sampling of display elements in display systems employing display elements as pen sense points is adequate provided there is low enough input resolution that natural pen movement during a frame time is unlikely to traverse more display elements than the number of times each display element location can be sampled for input during a frame time. This is necessary in order to provide sufficiently rapid tracking of arbitrary writing stylus movement. Some known display systems incorporating high power emissive display elements achieve more rapid pen sensing, but only do so at the expense of requiring that added pen sense instrumentality auxiliary to the display itself be fabricated into the display system (e.g., Japanese Patent 58-17247(A), which incorporates a piezoelectric pen sense layer).

In the case of interactive graphics where high pixel resolution (and concomitantly high pen sense element density) is desirable, and given a reasonable pen sense element spacing of, for example, 10 mils, it is conceivable for known displays employing display elements as input points that a writing instrument or light pen could travel from one pen sense element to another in less time than would be possible to sample all pen sense elements on a display. To address this problem, known interactive displays typically incorporate dedicated sensing hardware (e.g., a dedicated sensing layer or an external digitizing system), suffer reduced resolution and/or display area (in order to reduce the number of points sampled in a frame time), or restrict the speed of pen movement.

It is also pointed out that known display systems have heretofore been limited in the amount of information which can be stored internally on electronic memory devices. This limitation is attributable not only to the storage capacity, physical size, power requirements, and cost of available electronic memory, but also by the extent to which the displays can store commonly used symbols, such as text characters and graphic shapes, directly and in a compact and referenceable format, such as ASCII, suitable for word processing and for interface to conventional text processing and printing devices.

Conventionally, typefont text characters, each displayed as a pattern of many individual pixel display elements, can be input to a display via a keyboard device, in a standardized coded format, such as ASCII. This facilitates efficient text storage, word processing, and interface to conventional text processing devices, such as printers, which accept standardized text formats.

However, in order for text characters to be thus input in a compact and referenceable way, the additional instrumentality for text character selection, such as a keyboard, is typically employed. The keyboard must be interfaced to the display and display storage means, which detracts from the overall portability of the display system by requiring a separate structure to accommodate the customary array of fingertip sized keypads required for comprehensive keyboard text input, or by occupying the limited surface area on the display itself to accommodate the required text selection instrumentality, thereby increasing size and weight and/or limiting display area needed for enhanced viewing and editing of full page documents.

If, however, text is input directly onto the display surface via a writing stylus, then hand written textual information can be input, displayed, and stored without requiring text selection instrumentality auxiliary to the display itself. However, substantially more electronic memory is typically required for storing each hand written text character, since each character consists of a multiplicity of pixel display elements, each of which may need to be separately represented in memory, in contrast to text characters represented in a standardized format usually requiring only a single byte for each character stored. For a display input and storage device possessing a notepad or notebook sized display page and which stores hand drawn text or graphics, considerable electronic memory is required for storing more than just a few display pages of information. Even with data compression, such as disclosed in T. S. Huang, et al., "Runlength Encoding and Its Extensions," Symposium on Picture Bandwidth Compression, Massachusetts Institute of Technology, 1969, Gordon and Breach (New York), 1972, the monetary cost of electronic memory severely limits the price/performance, i.e., cost versus storage capacity relationship. Additionally, word processing functions, straightforward with characters represented in a compact and referenceable format, such as ASCII, are much more cumbersome with hand drawn characters. Also, conventional text printing devices are not well adapted to reproduce hand drawn text.

Alternatively, computer terminal devices incorporating a dedicated digitization indicator board equipped with a writing instrument, and utilizing character recognition techniques for input of hand printed commands and text are known. See, e.g., "Micropad Handwriting Terminal," Computer Equipment Review, Vol. 3, No. 1, pages 51-55, and U.S. Pat. No. 4,562,304. These on-line hand print character recognition systems have been found useful in applications where limited amounts of text are routinely input to a computer. For example, these systems are used in lieu of conventional inventory forms or hotel guest sign-in forms.

However, the character recognition techniques associated with these on-line hand print character recognition systems require that adjacent characters be explicitly separated. Accordingly, each character must be drawn within the confines of a prescribed area, or handprint box, printed in grid paper form pre-aligned to a writing panel prior to use. Grid or box entry precludes adjacent characters from overlapping or touching, as is common with natural hand printing.

Another device, the Casio PF-8000, permitting a single character to be printed individually within the confines of an associated digitization panel by means of a user's finger tip, is also known. However, in addition to the above mentioned constraints, this device also prescribes stroke direction (i.e., up or down), as well as the order in which strokes may be drawn when inputting text characters.

In any event, known character recognition techniques provided for on-line hand print character input systems require that characters be printed by prescribed rules which encumber natural hand printing, and consequently make input of lengthy text strings inefficient by comparison to the alternative of keyboard input. Additionally, variations characteristic of natural hand printing, such as stroke overwriting, character skew, serifs, or arbitrarily connected or nonconnected strokes, are restricted or disallowed by currently available on-line hand print character recognition devices. Furthermore, the display surface on these devices, being incapable of independently accepting input from a writing instrument, only accepts data from an associated and separate digitization panel which is itself incapable of independently displaying information, so that the writing instrument cannot be used for directing display processing changes or input to a particular character or location within a body of converted text, displayed on the display surface. Word processing instead requires explicit cursor positioning controls responsive to keyboard commands, mousing, or the digitization panel, the added instrumentality of which detracts from portability and complicates operation.

Less restrictive character recognition techniques than those mentioned above are known (e.g., C. C. Tappert, "Adaptive On-Line Handwriting Recognition," Seventh International Conference on Pattern Recognition (Cat. No. 84CH2046-1), Montreal, Quebec, Canada, Jul. 30-Aug. 2, 1984 (Silver Spring, MD:IEEE Comput. Soc. Press 1984, Vol. 2, page 1004-1007). However, they are computationally more complex and consequently less cost effective and/or slower than are used in current on-line hand print character input systems.

For a highly portable and interactive data input/output, processing, storage, and display device, a text and high resolution graphics capability is needed that can be operated without requiring auxiliary text selection hardware, such as a keyboard, and without consuming available display surface area with keyboard text selection instrumentality auxiliary to the display itself. Additionally, there should be provided an economical and rapid on-line hand print character recognition capability that allows pages of text to be efficiently input, and stored with a minimum of on-board electronic memory devices, and in a form amenable to word processing and data I/O in association with conventional text processing/printing devices.

SUMMARY OF THE INVENTION

It is therefore a general object of the present invention to provide a highly portable and interactive information entry, processing, storage, and display device.

It is a further object of the present invention to provide a portable data input/output, processing, storage, and display device that is flat, compact, light weight, and which operates at low power.

It is a more particular object of the present invention to provide a data input/output, processing, storage, and display device incorporating a writing pen with additional means provided for sensing and encoding the position of the pen on the display surface so that textual or high resolution graphic information can be entered directly onto the display surface with individual point control, and so that display processing functions, such as word processing and graphics editing, can be controlled responsive to pen contact with the display surface.

It is a further object of the present invention to provide a portable data input/output, processing, storage, and display device that displays hand drawn textual or graphic information, as the information is drawn by means of the writing pen, directly onto the display surface.

It is a further object of the present invention to provide a portable data input/output, processing, storage, and display device that incorporates nonmechanical, non-emissive display elements, and incorporates means for sensing and encoding writing pen location which can be effected without the use of an auxiliary pen sense layer, and without dependence upon display fluid or mechanical properties, and which employs the display electrodes for pen sensing, and which provides sufficiently rapid pen sensing to accommodate a high resolution large area display, and which does not suffer from display distortion effects associated with writing pen contact with the display surface (e.g., an LCD surface), and which can be manufactured economically.

Another object of the present invention is to provide a portable data input/output, processing, storage, and display device incorporating character recognition of hand printed text characters drawn directly onto the display surface by means of a writing pen and processed by an on-board computer program which identifies and automatically separates the hand drawn text characters as they are input, without the need for grid entry and regardless of overlapping strokes or overlapping character boundaries from adjacent characters, and which permits serifs, stroke overwriting, reasonably arbitrary stroke connectedness or non-connectedness, and other characteristics of natural hand printing input as hand printed text, and, finally, which incorporates provision for becoming customized to a particular user's printing style.

Another object of the present invention is to provide a portable data input/output, processing, storage, and display device which provides for textual display, information that is hand printed onto a display surface, and then identified by character recognition means resident in the device, to be re-displayed in a uniform and standardized character typefont and formatted with other previously converted text.

A further object of the present invention is to provide a portable data input/output, processing, storage, and display device with which textual display information can be edited by on-board word processing computer programs, operating internally to the device and responsive to writing pen activated commands and directed to any particular text to be processed, by touching the writing pen to the display area containing the text to be processed.

It is another object of the present invention to provide a portable data input/output, processing, storage, and display device with which graphic display information can be entered directly onto the display surface and stored in a compressed form for efficient storage, and which can be restored to its original form (i.e., decompressed) when re-displayed.

A further object of the present invention is to provide a portable data input/output, processing, storage, and display device with which hand drawn graphic display information can be edited responsive to writing pen activated commands and with individual point control responsive to pen position on the display surface with respect to any graphics to be processed.

It is still another object of the present invention to provide a portable data input/output, processing, storage, and display device possessing means for document storage such that pages of display data containing textual and/or graphic information can be stored and organized into retrievable files which can be re-displayed for viewing and/or further processing, or which can be output to an auxiliary device, such as a printer, plotter, or computer.

A further object of the present invention is to provide a portable data input/output, processing, storage, and display device with which file names associated with documents stored in the device can be viewed collectively in a file directory, and selected for output, display, or further processing by means of the writing pen.

It is also an object of the present invention to provide a portable data input/output, processing, storage, and display device which can interface with external devices, as well as accept programming for customized applications.

The present invention improves over known display systems and mechanical displays for writing stylus input to a flat panel display by providing an integrated display and pen sensing device which can be configured for high resolution interactive graphics, and which incorporates only non-mechanical, non-emissive display elements, and consequently operates at low power. The present invention provides a portable device which consumes a minimal amount of power, not only for purposes of portability, but also for purposes of cost effectively storing large amounts of data, for long periods, in electronic memory devices, which in the interest of low cost may be volatile devices requiring a continuous power source.

When used in conjunction with an input pen, the display and pen sensing device in accordance with the invention does not require a separate pen sensing substrate and can be manufactured economically, using readily available techniques. Manufacturing complexity is reduced by utilizing the display element hardware itself for pen sensing, thereby precluding the need for additional fabrication into the device of dedicated pen sense elements or electrodes and associated interconnect electronics for associating pen sense locations with display element locations. The present invention does not suffer from high power requirements, input location limitations, or pen movement restrictions heretofore associated with non-emissive interactive displays using display element locations as input points.

The present invention also provides means for rapid pen sensing on a low power, intrinsically addressed, or active matrix addressed, display to allow natural pen movement on a large, high resolution display, while permitting input to arbitrary display element locations. Conveniently, the means for rapid pen sensing does not add manufacturing complexity to existing techniques for the fabrication of display-only devices.

Further embodiments of the interactive electro-optic slate in accordance with the invention facilitate fabrication of time multiplexed and active matrix addressed interactive electro-optic slates with a minimum of modification from common non-emissive, non-mechanical display-only configurations. Despite the use of arbitrarily close spacings between adjacent display/sense electrodes on both upper and lower substrates, sufficient transmission of an input pen signal between a lower substrate and the input pen is facilitated. By slightly modifying the lithographic pattern of display electrodes located on the upper substrate to include notches which are small compared to pixel pitch, a signal can sufficiently couple between the input pen located above the upper substrate and electrodes located on the lower substrate. The notches are small so as to have negligible effect upon display quality. This can be applied to the upper substrate electrodes of time multiplexed addressed interactive electro-optic slates and to the backplane row electrodes of active matrix addressed interactive electro-optic slates.

These further embodiments of the interactive electro-optic slate permit the combination of display circuitry and much of the input pen position sensing circuitry. This minimizes part count and cost along with the need to interconnect numerous display I/O channels between separate integrated circuits.

These further embodiments of the interactive electro-optic slate also permit the simultaneous use of display electrodes for both input pen position sensing and displaying information. This will eliminate the need to perform stylus position sensing and display functions at separate time intervals, and thereby improves display contrast and contributes to manufacturing simplicity by permitting the use of standard display drive hardware and firmware.

These further embodiments of the interactive electro-optic slate permit the use of an input pen that requires no electrical connection between the input pen and the slate. One contemplated embodiment can be implemented without the need to include active electrical components within the input pen.

These further embodiments of the interactive electro-optic slate facilitate fabrication of active matrix addressed interactive electro-optic slates with a minimum of modification from common active matrix addressed non-emissive, non-mechanical display-only configurations without requiring the use of a separate sensing layer. Rather than requiring the segmentation of the backplane into backplane row electrodes for sensing row input pen position with notches to couple an input pen signal to drain pads for sensing column position, the backplane is unsegmented and senses both column and row input pen position. When the position of the input pen is being sensed, the backplane is connected to sense electronics located on the periphery of the backplane. These sense electronics detect both the row and column position of the input pen. Consequently, the backplane operates as an input layer for position sensing, as well as a conventional backplane for the display of information. As a result, the use of an added and separate sensing layer is avoided, as is the need to photolithographically segment the backplane. Additionally, it is much less complex and costly to combine the sense electronics with only the backplane layer than to combine the sense electronics with both the backplane and active matrix layer electronics.

Additionally, the present invention improves over known interactive display systems by providing a character recognition method optimized for automatic and computationally efficient on-line recognition of hand printed text characters, while allowing for a natural printing style. The character recognition method places no restrictions on stroke order, or on the direction in which strokes are drawn. Automatic and computationally efficient separation of characters is provided so that separate characters written on the same line are correctly identified and segmented independently of hand-print boxes or character separation grids, and regardless of overlapping strokes or overlapping character boundaries on adjacent characters, or of horizontal or temporal stroke separation. Additionally, other common modes of variation in hand printed text, including stroke overwriting, reasonable character skew, reasonably arbitrary connected or non-connected strokes, and serifs, are accommodated to an extent which better reflects their nature and frequency of occurrence in informal hand printed text. Also, means is provided for familiarizing the device with peculiarities of a user's own particular writing style and any reasonable range of variations therein.

Furthermore, input text and graphics are made visible dynamically, on the same surface upon which the text or graphics are input, at the time of input, to provide the user with means to see text characters that are printed, or graphics that are drawn, without requiring that grid paper or other material be utilized in conjunction with a separate digitization surface to facilitate character recognition. Display processing changes (i.e., graphics or word processing), as well as text or graphics input, can be directed to any particular character or location within a body of converted text or graphics displayed on the display by simply touching the writing pen to the desired location on the displayed document in the appropriate sequence, rather than requiring explicit cursor or pointer positioning responsive to keyboard commands, mousing, or digitization pads auxiliary to the display surface itself. By minimizing the necessity for control devices auxiliary to the display itself, device weight and auxiliary instrumentality are minimized, and portability is enhanced. Furthermore, more display area on the device itself is made available for displaying documents, so that the encumbrance to the user of having to scroll to different locations on a multi-line page or document is minimized.

BRIEF DESCRIPTION OF THE DRAWINGS

The above and other objects and features and the concomitant advantages of the present invention will be better understood and appreciated by those skilled in the art in view of the description of the preferred embodiments given below in conjunction with the accompanying drawings. In the drawings:

FIG. 1 is an isometric view of one embodiment of a portable, interactive, electro-optic data input/output, processing, storage, and display device in accordance with the invention;

FIG. 2 is a block diagram of an on-board electronic control system incorporated into the device shown in FIG. 1;

FIG. 3A shows an embodiment of a passive matrix addressed display adapted for incorporation into the device shown in FIGS. 1 and 2;

FIG. 3B shows an alternative embodiment of a passive matrix addressed display adapted for incorporation into the device shown in FIGS. 1 and 2 for rapid pen sensing;

FIG. 4, comprising FIGS. 4A-4D, shows an embodiment of an active matrix addressed display adapted for incorporation into the device shown in FIGS. 1 and 2;

FIG. 5A shows an alternative embodiment of an active matrix addressed display adapted for incorporation into the device shown in FIGS. 1 and 2 for rapid pen sensing;

FIG. 5B shows a modification of the rapid pen sensing embodiment shown in FIG. 5A;

FIG. 5C shows an alternative modification of the rapid pen sensing embodiments shown in FIGS. 5A and 5B;

FIG. 6, comprising FIGS. 6A-6H, illustrates various aspects of recognition of hand printed characters in accordance with the invention;

FIG. 7, comprising FIGS. 7A-7E, is a flow chart of an embodiment of a method for recognition of hand printed characters in accordance with the invention;

FIG. 8, comprising FIGS. 8A and 8B, is a flow chart of an embodiment of a method for conversion of hand printed characters to typefont characters in standardized format in accordance with the invention;

FIG. 9, comprising FIGS. 9A and 9B, is a flow chart of an embodiment of a method for correction of misread or unrecognized characters in accordance with the invention;

FIG. 10, comprising FIGS. 10A-10C, is a flow chart of an embodiment of a method for transfer between a text mode and a graphics mode, as well as operation in the graphics mode, in accordance with the invention;

FIG. 11, comprising FIGS. 11A and 11B, is a flow chart of an embodiment of a method for file directory management in accordance with the invention;

FIG. 12 is a flow chart of an embodiment of a method for document scanning in accordance with the invention;

FIG. 13, comprising FIGS. 13A and 13B, is a flow chart of an embodiment of a method for erasure in accordance with the invention;

FIG. 14, comprising FIGS. 14A and 14B, is a flow chart of an embodiment of a method for selection of data to be moved within a document in accordance with the invention;

FIG. 15 is a flow chart of an embodiment of a method for movement of selected data to another position within a document in accordance with the invention;

FIG. 16 shows one embodiment of a display for incorporation into the device shown in FIGS. 1 and 2;

FIG. 17 shows an embodiment of a modified display for incorporation into the device shown in FIGS. 1 and 2;

FIG. 18A is a cross-sectional view of an input pen relative to one form of display in accordance with FIG. 17;

FIG. 18B is a cross-sectional view of an input pen relative to another form of display in accordance with FIG. 17;

FIG. 19 shows a plot of coupling of an input pen signal to lower electrodes of the display shown in FIG. 17;

FIG. 20 shows an active matrix addressed display with backplane input pen position sensing for incorporation into the device shown in FIGS. 1 and 2;

FIG. 21 shows an embodiment o a circuit for row and column coordinate input pen position sensing for an active matrix addressed display such as shown in FIG. 17;

FIG. 22A shows one embodiment of display drive electronics for a display having simultaneous display and input pen position sensing;

FIG. 22B shows another embodiment of display drive electronics for a display having simultaneous display and input pen position sensing;

FIG. 23 shows an embodiment of a circuit for input pen position sensing on a time multiplexed display;

FIG. 24 is an equivalent circuit for the display shown in FIG. 23;

FIG. 25A shows a conventional driver circuit for a display;

FIG. 25B shows a modified driver circuit for a display adapted for incorporation into the device shown in FIGS. 1 and 2; and FIG. 26 shows an embodiment of a circuit for input pen position sensing.

DETAILED DESCRIPTION OF THE PREFERRED EMBODIMENTS

Referring to FIGS. 1 and 2, a portable data input-/output, processing, storage, and display device, in accordance with one embodiment of the invention, comprises a non-mechanical, non-emissive, flat panel, low power display 1. Associated with the display 1 is pen sense control means 2 for sensing and encoding locations on the display surface where sufficient contact is made by, or proximity is detected with, an associated input pen 3. Also incorporated is a control subsystem 4 for processing control. The control subsystem 4 is interfaced to: the pen sense control means 2; as well as to graphics processing subsystem 5; a file management subsystem 6; a text processing subsystem 7; a character recognition subsystem 8; a data I/O subsystem 9; data memory 10; and display control means 11.

The display 1, pen sense control means 2, subsystems 4-9, data memory 10, and display control means 11 are all contained and operatively interconnected within a single portable housing, as shown in FIG. 1. As shown in FIG. 2, the input pen 3 can be connected to the pen sense control means 2 by means of a flexible and electrically conductive cable 12 which conducts a pen signal, or voltage. Alternatively, the input pen 3 is not tethered to the pen sense control means 2 by a cable, as will be described later.

The display 1, as shown in FIG. 1, is preferably divided into five functional subsections At the right edge and bottom of the display 1, individual regions 41-60 are provided to allow for user selection of textual and graphic display processing commands by touching a selected one of these regions with the input pen 3. Each of the individual regions 41-60 can be labeled with a symbol indicating its function, and each region may have a different size depending upon the associated command's frequency of use or significance. Each of the given functions associated with the regions 41-60 is associated with a range of respective row and column coordinate positions corresponding to each region's horizontal and vertical boundaries, respectively, so that touching the input pen 3 to the display surface within these boundaries activates the function associated with the touched region. As a result, the effect is that of input keys.

At the top of the display 1 is a user message area 61 on which device status instructions, or references to guide the user can be made visible. At the bottom of the display 1 is a text conversion area 62 on which strings of hand printed text characters can be input by means of the input pen 3 and identified for efficient text storage and conversion to typefont text for display in a document viewing and processing area 63.

Text, which has been input by the user to the text conversion area 62 or output from the data memory 10, is displayed on the document viewing and processing area 63. Graphic information or hand printed text may be drawn directly onto the surface of the document viewing and processing area 63 with the input pen 3. The document viewing and processing area 63 occupies the main surface of the display 1 and preferably possesses sufficient area to allow the display of a page of textual or graphic information.

As hand printed text is entered onto the text conversion area 62, the path of the input pen 3 is traced and made visible on the underlying display surface to enable the user to see what has been written. When the text conversion area 62 has been filled with text, or the user touches the input pen 3 to region 59 designated "CONVERT", any hand printed text displayed in the text conversion area vanishes and re-appears as typefont text in the document viewing and processing area 63. The text conversion area 62 then becomes available for new text input. As new lines of typefont text are thus added to the document viewing and processing area 63, any previously converted typefont text displayed thereon is reformatted to allow space for the added text with automatic left and right justification responsive to user settable left and right margins invoked by touching regions 53A and 53B designated "LEFT MARGIN" and "RIGHT MARGIN", respectively.

Graphic information or hand printed text drawn directly onto the document viewing and processing area 63 can be edited responsive to graphics processing commands which are utilized upon first assuring that the device is operating in a graphics mode (if the device is in a text mode, the user touches the input pen 3 to region 44 designated "TEXT/GRAPH" so as to cause the device to operate in the graphics mode). Next, the user touches one of regions 47, 48, or 49 (i.e., corresponding to "INSERT", "ERASE", AND "NORMAL", respectively) with the input pen 3, and then touches the input pen to any displayed graphics to be processed by the selected operation. Similarly, word processing functions can be applied to any typefont text displayed on the document viewing and processing area 63 by setting the device to the text mode, next touching the input pen 3 to the desired one of regions 47-60, and then touching the input pen to the text to be edited. A wide range of graphics editing and word processing functions comparable to those found in dedicated graphics and text processing systems can be provided, as will be described in more detail later.

Region 50, designated "PAGE SCAN", is provided near the bottom of the display 1 for rapidly scanning forward or backward through the pages of a multi-page document. By moving the input pen 3 across region 50 to the right or left, pages are scrolled forward or backward, respectively, at a rate proportional to the speed at which the input pen is moved.

As shown in FIG. 2, the display 1 incorporates the pen sense control means 2 for sensing and encoding input pen tip location on the display 1 so that when the input pen 3 is brought into sufficient contact or proximity with the display surface, the location of the display element thereunder (e.g., a row and column coordinate position) is encoded and made available to the control subsystem 4. The control subsystem 4 can then operate the display element to an "on" or "off" state and/or refer the row and column location coordinates to storage or further processing.

Considered in more detail, the display 1 is preferably a flat panel passive matrix or, alternatively, an active matrix (e.g., thin film transistor) electronically addressed non-emissive display, which can be viewed in reflective mode, of a type known in the art. In either case, the display 1 contains elements which can be operated with individual point control to an "on" or "off" (e.g., visible or non-visible) state responsive to input from the data memory 10 or sufficient contact with or proximity to the input pen 3.

Referring to FIG. 3A, a passive matrix addressed embodiment for the display 1 is shown. The display 1 has a substantially transparent upper substrate 13, spaced from a lower substrate 14, with a cavity therebetween containing electro-optic (e.g., liquid crystal) material 15. On the interior surface of the upper substrate 13 and lower substrate 14 of the passive matrix addressed display 1, as shown in FIG. 3A, are fabricated substantially transparent, parallel, and conductive row electrodes 16, and column electrodes 17, respectively, with the upper substrate row electrodes being substantially perpendicular to the lower substrate column electrodes. Row and column electrode crosspoints form a display element matrix such that by applying opposite polarity potentials to one of the upper substrate row electrodes (e.g., 16B), and one of the lower substrate column electrodes (e.g., 17C), the intervening electro-optic (e.g., liquid crystal) material in an area substantially local to the associated row and column crosspoint location (e.g., an area 18) is operated, for example, to become "visible."

In order to facilitate display clarity and preclude distortion during pen input, spacing members 22 consisting of a suitable substantially transparent, electrically insulative material, are preferably fabricated by a suitable film deposition and masking process known in the art between the upper substrate 13 and the lower substrate 14. Known film deposition processes suitable for fabricating the spacing members 22 include, for example, sputtering and e-beam evaporation, which currently are in common use for fabricating display-only devices.

The spacing members 22 prevent input pen pressure on the upper substrate 13 from causing thickness variations in the cavity 15 and consequently prevent distorting the display 1. In order to minimize degradation to display quality, spacing members 22 are preferably transparent, much narrower than the distance separating adjacent display element locations, and are separated by the greatest allowable distance that will maintain adequate cavity thickness tolerance under input pen pressure. Additionally, rather than running the full length or width of the display 1, the spacing members 22 preferably provide gaps through which display fluid can more easily flow to all parts of the display during manufacture.

Referring to the passive matrix addressed display shown in FIG. 3A, the respective row and column electrodes 16 and 17 themselves are preferably employed in sensing the presence of the input pen 3. In one embodiment, the terminuses of the display matrix electrodes are alternately switched between: the pen sense control means 2 for sensing contact or sufficient proximity of the input pen 3; and the display control means 11 for operating the display elements to an "on" or "off" state. (In another embodiment to be described later, sensing contact or sufficient proximity of the input pen 3 and operating the display elements occurs simultaneously.) With this approach, the same row electrodes 16 and column electrodes 17 that are used for operating the display elements are also used for sensing the location of the input pen 3, so that fabrication of the display 1 is simplified by alleviating requirements that substantial input pen sensing electrodes and associated conductive lines, or another substrate, be additionally fabricated into the device. Additionally, parallax and registration problems, attributable to display element location sense points being positioned on a dedicated substrate located at a distance above the associated display elements themselves, are avoided. Furthermore, problems associated with interconnecting a plurality of display element locations with their associated input pen sense locations are minimized. Finally, problems associated with formatting input data from the input pen 3 for actual display are minimized, since input row and column coordinates are identical to display row and column coordinates in terms of both the data memory 10 and on the display 1 itself.

The pen sense control means 2 may include detection and encoding means, such as those used in connection with digitization systems which cannot independently display information, but which employ an X-Y grid of conductors to perform their function of stylus detection and position encoding. Such devices typically output analog or digital signals onto input pen sense electrodes for purposes of forming an electrostatic field on an X-Y grid that can be sensed by a stylus, and then used to determine stylus position on the grid (see U.S. Pat. No. 4,022,971).

These techniques when implemented in connection with analog signals do not typically use a sensing electrode for each row or column for which sensing is possible. Rather, analog techniques utilize only a small number of electrode lines per inch (e.g., 4 per inch), yet achieve equivalent input resolutions on the order of 1000 lines per inch.

Therefore, referring to FIG. 3A, in the case of analog electrostatic sensing, only a fraction of the available row and column electrodes 16 and 17 are connected to the pen sense control means 2. Additionally, analog electrostatic sensing usually requires that row resistors 80A be placed between adjacent row electrodes 16, and that column resistors 80B be placed between adjacent column electrodes 17 in order to facilitate formation of an electrostatic field on the grid. As shown in FIG. 3A, these resistors are positioned behind function select switches 39, so that resistors 80A and 80B form part of the X-Y grid only while the sensing function is in operation and thus do not interfere with the display function. The function select switches 39 alternately connect the pen sense control means 2 or the display control subsystem 11 to the row and column electrodes 16 and 17 for selecting input pen sensing or data display, respectively.

Digitization techniques for input pen sense and position encoding, with digital signals induced onto an X-Y grid (see U.S. Pat. No. 4,560,830) can also be implemented in connection with the pen sense control means 2. This implementation requires, however, that a larger number of row and column electrodes be employed in input pen sensing, and that any associated amplifiers and interconnections between electrodes be disposed behind the function select switches 39 so as to limit their connections to the row and column electrodes 16 and 17 only to the input pen sense operation.

It is also contemplated that the pen sense control means 2 may additionally include suitable electronics for imposing level and timing constraints on signals which emanate from the input pen 3, and which are electrostatically coupled through the upper substrate 13 onto sufficiently wide row and column electrodes 16 and 17, in order to detect and encode input pen position. Referring to FIG. 3B, this can be accomplished by electrostatically coupling a input pen signal originating at a pen signal source 24, from the tip of the input pen 3, onto the row and column electrodes 16 and 17. The terminuses of both row and column electrodes 16 and 17 can be connected periodically by means of bidirectional switches 25A and 25B, respectively, to row sense means 2A and column sense means 2B, respectively. The row and column sense means 2A and 2B include level detection means 19 (such as analog comparison means, or digital comparison means and analog/digital conversion means) which simultaneously polls all input electrodes, in reference to a threshold window, for example, established for an allowed or expected display element positional offset. If a signal of sufficient amplitude is detected by the level detection means 19, synchronization logic means 20 compares timing characteristics of the sensed signal to that of the pen signal source 24. Finally, encoding means 21 transforms the input from one of a plurality of input electrodes, with appropriate level, offset, and timing characteristics, into a suitably coded binary number indicating row or column coordinate position.

Alternatively, a display device with display element electrodes functioning as both means for operating the display fluid (e.g., liquid crystal), as well as means for sensing sufficient proximity of the input pen 3 to the display 1, forming an extension to active matrix addressed display-only devices can be used. Referring to FIG. 4A, an active matrix addressed (e.g., LCD) display is shown along with a detail of several individual display elements 28A–28F and their associated control electronics 30A–30F and 31A–31F. Such active matrix addressed displays are well known and will be described only to the extent needed to illustrate how such a display can be altered so that display surface hardware used in the display function can also be employed for detecting and encoding the position of an associated input pen.

Referring to FIG. 4A, row display element drive electrodes 17 and vertical gate electrodes 16 are shown to be configured as respective columns and rows, the terminuses of which are connected to horizontal drive electronics 32 and vertical drive electronics 33, respectively. The vertical drive electronics 33 sequentially operates the display row enable electrodes 16 one at a time, in the indicated direction 34, in essentially the fashion of a vertical shift register. A selected one of the display row enable electrodes 16 is operated by the vertical drive electronics 33 to connect the display elements of the selected row to associated display element drive electrodes 17.

When one of the display row enable electrodes 16 is operated to enable a given row of display elements by the vertical drive electronics 33, each of the enabled row's respective data enable transistors 31 is enabled to permit input of display data from the display element drive electrodes 17 onto all of the enabled row's respective display elements. During the next cycle of the vertical drive electronics 33, the just enabled display row enable electrode is operated to disconnect all of the previously enabled row's display elements from the associated display element drive electrodes 17.

When displaying information, the display states (e.g., "on" or "off") for one full row of liquid crystal display elements 29 are loaded via an input bus 37 into a horizontal register 38. After this data has been loaded, it is latched onto the horizontal drive electronics 32, which outputs the data onto the display element drive electrodes 17. This display data is then gated onto whichever display row is being enabled by an output line of the vertical drive electronics 33.

All liquid crystal display elements 29 are formed of driving electrodes 35 and a backplane 36 which is formed from a substantially transparent and conductive material and which can run continuously over the display surface in both horizontal and vertical directions.

When a voltage potential on a given driving electrode is sufficiently different than that of the backplane, the associated display fluid in an area substantially local to the driving electrode 35 is operated to become, for example, "visible."

For example, while data is being loaded into the horizontal register 38, the horizontal drive electronics 32 is outputting display information onto display element drive electrodes 17, which are being gated onto display row L (e.g., 16L), which has its display elements (e.g., 28A-28C) gated responsive to a signal on the Lth output line from the vertical drive electronics 33 for operating the data enable transistors (e.g., 31A-31C) for each display element in row L to accept the data currently on the display element drive electrodes 17. When this data is input to each of the respective display elements in row L (e.g., 28A-28C), storage capacitors (e.g., 30A-30C), associated respectively with each of the display elements in row L, store the input data for when display row L is disabled and the next display row is enabled at the next cycle of the vertical drive electronics 33. The storage capacitors 30 drive each display element's associated liquid crystal 29 until the next time row L is enabled to accept input data.

During the next cycle of the vertical drive electronics 33 in the indicated direction 34, the display elements in row L are disconnected from their associated display element drive electrodes and storage capacitors 30 for row L, store their respective input data, and prolong the effects of the data on their respective liquid crystals 29. Also, accompanying the next shift of the vertical drive electronics 33, data in the horizontal drive electronics 32 that is meant to drive display elements in row M (i.e., L+1) are latched into the horizontal drive electronics 32, and the Mth output line (i.e., 16M) of the vertical drive electronics 33 gates data enable transistors (e.g., 31D-31F) of each display element in row M to accept the new data on the display element drive electrodes 17. This process is then repeated for row N (i.e., L+2) and so on, until the bottommost display row is enabled, at which time the vertical drive electronics 33 begins again with the topmost display row.

The display state previously input to each of the previously enabled row's display elements can be there stored on each respective display element's respective storage capacitor 30 such that each capacitor's stored charge substantially drives its associated display element 29 for a time sufficiently longer than that of the dielectric relaxation period for the display element. Preferably, this time exceeds that required to shift through all of the other display rows and return again to the initial one.

In the case of an active matrix addressed display, which accommodates pen input, spacers 22 are preferably fabricated on the display element drive electrodes themselves, as shown in FIG. 5C, in order to prevent distortion due to input pen pressure on the display surface. The spacers 22 are positioned over the display electrodes themselves to conserve space for the display fluid (note that in FIG. 3A spacing members are positioned between electrodes). Additionally, rather than running the full length or width of the display 1, the spacers 22 preferably provide gaps through which display fluid can more easily flow to all parts of the display during manufacture.

Referring to FIG. 4B, to accommodate input pen sensing, as well as the display function, in the active matrix addressed display shown in FIG. 4A, the terminuses of the display element drive electrodes 17 are alternately switched by function select switches 39, between the horizontal drive electronics 32 for operating display elements to "on" or "off" states, and the pen sense control means 2 for sensing contact or sufficient proximity of the input pen 3 to the display 1 and encoding the input pen location.

Referring to FIG. 4B, in the case of an active matrix addressed display which also accommodates input pen sensing, a display-sense transistor 79 is placed in series with each data enable transistor 31. Additionally, for each display element 29, a substantially transparent and conductive sense pad 72 is preferably deposited on an insulating layer (e.g., silicon dioxide) directly on top of the display electrodes 35, as shown in FIG. 4C. As shown in FIG. 4B, the sense pad 72 is electrically connected to a point between the display-sense transistor 79 and data enable transistor 31. Conductive display-sense electrodes 78 are electrically isolated from, and run parallel to, data enable electrodes 16'. The display-sense electrodes 78 and data enable electrodes 16' run in pairs, as shown in FIG. 4B.

During the display operation, a row of display elements which are enabled to receive display data from the horizontal drive electronics 32, via display element drive electrodes 17, has both its associated display-sense electrode 78 and data enable electrode 16' connected via the vertical function select switches 39A to a potential sufficient to turn on the display-sense transistors 79 and data enable transistors 31 associated with all display elements of the enabled row. The configuration of the vertical function select switches 39A during the display operation is shown in FIG. 4B. As shown in FIG. 4D, during the input pen sensing operation, the vertical function select switches 39A connect only the display-sense electrodes 78 of enabled rows to the vertical drive electronics 33, so that electrostatic signals emanating, for example, from the input pen 3 (as shown in FIG. 4B) can be conducted to the display element drive electrodes 17, without any display data stored on the capacitors 30 being subject to charging or discharging through the data enable transistors 31, and onto the display element drive electrodes 17. Additionally, the frequency and amplitude of signals emanating from the input pen 3, and the thickness of the insulating layer which separates the sense pad 72 and display electrodes 35 is such that the input pen signal does not interfere with display data stored on the capacitors 30, or displayed on the associated liquid crystal elements 29.

When the device having display elements as depicted in FIGS. 4B and 4C is displaying information only, the vertical drive electronics 33 shifts a single "on" bit sequentially through each of the row enable electrodes 16 connected to output points on the vertical drive electronics, and the vertical function select switches 39A connect each of the row enable electrodes 16 to its associated display-sense electrode 78, as well as to the data enable electrodes 16'. Thereafter, when the data enable electrode 16' and display-sense electrode 78 for a particular display row are operated to connect each display element of the display row to its associated display element drive electrodes 17, each display element of the display row has both its data enable transistor 31 and display-sense transistor 79 gated so as to connect each of the row's liquid crystal elements 29, and associated capacitors 30, with the associated display element drive electrodes 17. However, to accommodate input pen sensing, when a display row is first enabled by its associated row enable electrode 16 from the vertical drive electronics 33, the vertical function select switches 39A are initially operated to only connect the row's associated display-sense electrode 78 to the vertical drive electronics 33 (as shown in FIG. 4D), while the function select switches 39 are initially operated to connect the display element drive electrodes 17 to the pen sense control means 2 long enough to permit the pen sense control means to detect and encode input pen position on the display 1. During this period, if the input pen 3 is in contact or proximity with the display row other than the one being gated by a display-sense electrode 78, the display-sense transistors 79 associated with each display element in the row being contacted by the input pen are turned off, and thus cannot sufficiently transmit input signals electrostatically coupled onto the sense pad 72 associated with the touched display element to the pen sense control means 2. If, however, the input pen 3 is positioned on a display row, which has been enabled during sensing by its associated display-sense electrode 78, thereby turning on the row's associated display-sense transistors 79, the input pen signal is sufficiently coupled to the pen sense control means 2.

As in the example of FIG. 3B, the pen sense control means 2 can comprise level sensing means known in the art, which receives as inputs a plurality of column electrodes 17, and determines whether or not the input pen 3 is in sufficient contact or proximity with an enabled display row, synchronization logic, and encoder, which outputs the column coordinate position of the input pen as a suitably coded binary number. Once the column coordinate position of the input pen 3 has been determined, the column coordinate is associated with the currently enabled display row number. The row and column coordinates are then output to the control subsystem 4 for use in connection with display and/or further processing (e.g., character recognition, graphics input, or mapping to a user interface function).

After input pen sensing, the currently enabled row receives data for display. At this point, the vertical function select switches 39A are operated to connect both the display-sense electrodes 78 and data enable electrodes 16' to the vertical drive electronics 33. Additionally, the function select switches 39 are operated to connect the display element drive electrodes 17 to the horizontal drive electronics 32, at which time display data for the currently enabled row of display elements are transmitted to the display elements for display. Next, the vertical drive electronics 33 is shifted to enable the next display row to be operatively connected to the pen sense control means 2 (via the display element drive electrodes 17), and subsequently to accept output (display) data from the horizontal drive electronics 32, and the process- is repeated sequentially for each row of the display 1. The above described input pen sensing technique is only an example illustrating that the present invention can be configured to provide input pen location sensing and encoding for an entire row of input pen sense elements simultaneously, thereby providing the means for sufficiently rapid input pen tracking desirable for high input resolution and natural pen movement.

In order to accommodate even more rapid input pen location sensing and position encoding, which is desirable for interactive displays with high resolution and with large surface area, the device in accordance with the invention can be configured to perform an input pen sensing function more independently of the dielectric relaxation times required to operate liquid crystal display elements, and thus is limited only by the speed of associated input pen sense electronics.

Accordingly, in order to facilitate rapid and frequent input pen sensing, prior to each time a display row is enabled for receiving display data on the display element drive electrodes, all of the display rows can be addressed and sampled at high speed (rather than enabling only one display row at a time for the input pen sensing function, between transmissions of display data to each display row). This can be accomplished by clocking the vertical drive electronics 33 at a frequency much higher than that of the clock frequency associated with the display function, for a brief period occurring between each display data enable. During this period, each row of the display 1 is enabled for a short period, long enough to determine if the input pen 3 is in sufficient contact or proximity with any of the display elements on the enabled row.

Referring to FIG. 5A, for each row, this determination is made for all display columns simultaneously, so that a determination of column position is made only if the input pen 3 is determined to be in sufficient contact or proximity with the enabled row. This can be accomplished by electrostatically coupling the input pen signal from the input pen 3 through the upper substrate (and on to the sense pad 72), and directing all display element drive electrodes 17 (enabled for sensing) of the enabled row through level detection means 19 which simultaneously polls all column electrodes and which can comprise analog comparison, or digital comparison and analog to digital conversion, thereby determining whether an input pen signal of a sufficient amplitude is in contact with, or in sufficient proximity to, any display element location on the enabled row. If so, synchronization logic means 20 can be provided to compare the signal received from the display 1 in response to the input pen 3 to that of the pen signal source 24 in order to sufficiently assure that the sensed signal originated from the input pen, rather than another signal source, such as ambient noise. Finally, encoding means 21 serves to transform the location or column identification of the sensed column electrode to a suitably coded binary number.

Other alternatives suited to active matrix addressed liquid crystal devices involve sensing signals which originate from the pen signal source 24 and that are conducted to the display surface (rather than directly to the input pen 3, as described above) at the time the vertical drive electronics 33 is clocked for brief periods at high frequency. In this embodiment, an identical signal for all display element drive electrodes is transmitted to all display elements (specifically, the sense pads 72) of enabled rows via the display element drive electrodes 17. For each enabled row, this signal is transmitted for a period sufficient to enable the pen sense control means 2 to identify a row which is receiving the highest amplitude signal from the input pen 3 (i.e., a row for which a display element is sensed that exceeds a given threshold, as determined by level detection means 19). Again, synchronization logic means 20 can be applied to further qualify the sensed signal. Next, a sensed signal that qualifies as pen input enables a determination of the column nearest the input pen's point of contact by one of the following alternatives.

Referring to FIG. 5B, one modification for determining the nearest column involves sending pulse coded column identification signals in unison, or uncoded signals sequentially, onto the display element drive electrodes 17, to be picked up by the input pen 3, and then determining a maximum transmitted value in association with an associated column and row coordinate position, for example, in reference to a threshold window established for an allowable or expected display element positional offset. Input pen signals transmitted onto display element drive electrodes 17 are picked up by the input pen 3, when in sufficient contact or proximity with an enabled row, and then checked for sufficient amplitude by level detection means 19, and for synchronization, by synchronization logic means 20. When a signal is detected by the input pen 3, with appropriate level and timing characteristics, an enabling signal is sent to means 71 for switching the display element drive electrodes 17 to column level detection means 72A, column synchronization logic means 72B, and column encoding means 72C for determining column coordinate position on the enabled row. A modification is to provide bi-directional ports and any required level comparison means, synchronization logic, and encoding means in association with the pen signal source 24.

Another modification is illustrated in FIG. 5C and has the advantage that rapid input pen sensing is accomplished on an active matrix addressed display, without requiring that display-sense electrodes and transistors, vertical function select switches, and associated interconnects be fabricated. The display elements are configured as in FIG. 4A, and in this embodiment, the display electrodes 35 are used to detect input pen signals emanating from the input pen 3. The backplane 36 associated with an active matrix addressed display (the backplane 36 also appears in FIGS. 4A and 4B) is a continuous and conductive surface to which may be applied a voltage potential. When sufficiently different from that of a given display element drive electrode, this potential causes the associated display fluid thereunder to be operated to a given display state (e.g., "on" or "off"). The backplane 36 shown in FIG. 5C is conductive, but rather than being continuous in horizontal and vertical directions, is formed from a plurality of row electrodes, with width comparable to that of the display's associated display elements, separated by a distance substantially less than that of the width. These backplane electrodes are electrically isolated from one another except when the device is displaying data, at which time row switch means 75 is operated to connect them together and to operate them together in the typical function of a backplane. During input pen sensing, however, which can occur between shifts of the vertical drive electronics 33 (as described in the examples of FIGS. 5A and 5B), the row switch means 75 is operated to electrically isolate each backplane row electrode from its neighbors and to connect each electrode, individually, to row sense means 76, comprising, for example, level detection means 19, synchronization logic means 20, and encoding means 21, as in the example of FIG. 5A.

The input pen sense operation is then reduced to a two-step process. First, the row switch means 75 is operated to connect row electrodes of the backplane 36 to the row sense means 76. Next, the row where the input pen 3 is detected is enabled by the vertical drive electronics 33 to connect the row of display elements, where the input pen was detected, to the display element drive electrodes 17. Concurrently, a column switch means 74 connects the display element drive electrodes 17 to the column sense means 77, which is configured similarly to the row sense means 76, and outputs a resultant column coordinate position. Subsequently, display data are output to the display 1 by operating the row switch means 75 to connect the row electrodes in the normal function of a backplane, and operating the column switch means 74 to connect the horizontal drive electronics 32 to the display element drive electrodes 17. It should be noted for the above-described embodiment, however, that a row, which is contacted by the input pen 3 during input pen sensing, requires that all data enable transistors 31 of the contacted row be turned on for a time sufficient to enable a determination of column coordinate position by the column sense means 77. Consequently, for a frame time (i.e., about 30 milliseconds) during which the input pen 3 is in contact with, or in proximity to, a row of display elements, that particular row only is disabled from displaying any information stored on its associated storage capacitors 30. In the case of a high resolution display (with a large number of display rows per inch), this does not constitute a significant disadvantage. An alternative, however, would be to employ display-sense electrodes 78, transistors 79, and vertical function select switches 39A, as shown in the example of FIG. 4B, thereby protecting any data on capacitors 30 during column determination. This later alternative would provide for the rapid input pen sensing described in conjunction with FIG. 5C (using backplane row electrodes for an initial row determination), while protecting display data for any row where the input pen 3 is sensed during column determination.

The above described input pen sensing techniques are only examples. It is also contemplated that analog or digital input pen sense techniques used in connection with digitization systems described earlier can be employed. Such an implementation would be similar to that described in connection with FIG. 3A and would have the advantage that only row enable transistors need be fabricated. Such an implementation is facilitated by an active matrix addressed display's pre-existing row and column electrodes. However, input pen sense signals generated onto the row enable electrodes 16 need to be of sufficiently small amplitude to prevent turning on data enable transistors 31, thereby preventing input pen signals from interfering with display data.

As described above, non-emissive, non-mechanical displays are provided which utilize display electrodes as a means for receiving input from or transmitting output to the input pen 3. The benefits of this approach over those of utilizing a separate sensing layer (such as disclosed in U.S. Pat. No. 4,639,720) include lower manufacturing costs, as well as elimination of the added parallax and opacity of a separate sensing layer. The benefits over other prior art (see, for example, U.S. Pat. No. 4,520,357), which utilizes local alterations in display element materials, include more rapid input pen movement and resolution capabilities, and the ability to point arbitrarily at any location on the display surface regardless of the state (i.e., "on" or "off") of the underlying display element, and without dependence upon affecting the state of the underlying display element, for the purpose of, for example, indicating a location to insert text or graphics. Lower cost and lower operating power are other benefits.

Embodiments are described above for both time multiplexed and active matrix addressed displays which utilize the display electrodes themselves as a means for input from the input pen 3. Referring to FIG. 16, embodiments which utilize time multiplexed and active matrix addressing from the input pen 3 typically require that for brief periods, a signal be coupled through a top glass 1004 and layer of upper electrodes 1001 to a lower electrode layer 1002. It is noted that during these periods, the upper electrodes 1001 can be grounded and spaced together so closely that any signal from the input pen 3 to be coupled to lower electrodes 1002 is substantially shielded by upper display electrodes 1001 located on an upper substrate. This effect becomes increasingly significant as display panels become available with lower indium tin oxide (ITO) electrode resistance and higher resolution.

Additionally, it is pointed out that the time multiplexed and active matrix addressed displays described above utilize separate circuitry to perform the display function and the input pen position sensing function. Furthermore, although the display electrodes are utilized by both the input pen position sensing and display functions, they are in some instances used for these two operations at separate times, which in some embodiments (particularly those with high resolution and/or large display area) nee some modification of the display driving function from that of a conventional display, and result in some loss of contrast due to reduced pixel dwell times. These shortcomings apply to both the time multiplexed and active matrix addressed displays described above.

Also, both the time multiplexed and active matrix addressed displays described above permit the use of the input pen 3 which does not require an electrical connection between the input pen and display and sense electronics, by providing an input pen sense signal generated independently by the input pen. However, this requires that a pen signal source, such as an oscillator, be provided and powered within the input pen. Although this eliminates the need for the electrically conductive cable 12 between the input pen 3 and the device, it also can result in an increase in manufacturing complexity over the case in which an electrically conductive cable is utilized.

Additionally, it is pointed out that although the time multiplexed embodiment of the display described above requires no substantial lithographic modifications from conventional display-only panel configurations, in the active matrix addressed display embodiments, the backplane electrodes are preferably segmented so as to provide for row coordinate position sensing of the input pen 3. These backplane electrodes operate as independent sense electrodes during the row sensing operation and are short circuited together during the display operation so as to provide the function of a unipotential backplane. A further complication is that the sense electronics are typically closely interfaced with both the backplane electrodes and the active matrix layer control electronics. It also complicates the display operation by requiring that the display operation be suspended during input pen position sensing.

Referring to FIG. 17, upper display electrodes 1001 of a time multiplexed or active matrix addressed display are photolithographically patterned to include notches 1005 to permit input pen position sensing. The notches 1005 are sufficiently small in area to have minimal effect upon display quality. The absence of electrode material at a notch 1005 causes only the area directly underlying the notch to be always in the "off" state, regardless of the state of the remainder of the associated pixel area (i.e., the area where upper and lower electrodes overlap). In the process of coupling an input pen signal to lower electrodes 1002 for the purpose of column sensing, field lines associated with the input pen signal are coupled through a notch 1005 in grounded upper electrode 1001A to lower electrodes 1002.

Referring to the cross-sectional view of FIG. 18A, from the relative distance between the upper electrode 1001 and lower electrode 1002, the pixel size (or more properly, the size of the input pen tip), and the top glass thickness 1006, it can be seen that electric field lines 1007 emanating from the tip of the input pen 3 can terminate on the lower electrode 1002. Referring to FIG. 18B, without the lower electrode 1002 in such close relative proximity to the upper electrode 1001, the field lines 1007 either terminate directly on the upper surface of upper electrode 1001, or extend beyond the notch 1005 only to bend back and terminate on the underside of the upper electrode. The ability of the notched electrode configuration to permit coupling of the input pen signal onto lower electrodes has been confirmed experimentally using ITO electrodes, and is plotted in FIG. 19. Referring to FIG. 19, the horizontal axis represents the ratio of notch area to the area associated with each pixel. The vertical axis represents the ratio of measured signal level at the lower electrode to the signal level coupled to the lower electrode through a notch 1005 without an intervening upper electrode. The plot of FIG. 19 applies to display panels with a top glass thickness : pixel pitch : liquid crystal cavity thickness ratio of 50:10:0.2. This applies, for example, to a 50 mil top glass with a 10 mil pitch and 5 micron cavity thickness. It is noted that a notch area/pixel area ratio of 0.05 typically applies to most standard displays manufactured without notched electrodes and is sufficient. That is, the distance separating conventional "non-notched" electrodes on standard displays permits sufficient coupling of the input pen signal to lower electrodes in most instances.

Referring to FIG. 20, an active matrix addressed display backplane 1008 comprises a continuous sheet of conductive transparent material, such as ITO, for sensing the position of the input pen 3, as described above, or, as shown in FIG. 20, an input pen 1014 that produces an input pen signal or simply has a conductive tip, as will be described later. While the device is displaying data, the backplane 1008 is connected to display electronics 1009, via an analog switch 1010, so as to enable it to operate as a conventional backplane. For brief intervals, imperceptible to a user, the backplane 1008 is connected, via switch 1010, to position sensing electronics 1011, as shown in FIG. 20, so that the backplane acts as a resistive position sensor for these intervals. During position sensing, an input pen signal emanating from a pen signal source 1012 is conducted, via conductive cable 1013, to the input pen 1014. The input pen signal is capacitively coupled through the top glass and onto the backplane 1008. For row (or column) input pen position sensing, there is a varying impedance between the input pen tip 15 and the backplane edges 1016, depending upon the distance between the input pen tip and the backplane edges.

Row and column input pen position sensing is identical, so that a description of row coordinate input pen position sensing will be sufficient to describe both row and column sensing. In the case of row coordinate sensing, the input pen signal is coupled through the top glass 1017 and along the backplane 1008 to the backplane edge 1016A. The farther the input pen tip 1015 is from the backplane edge 1016A at the top of the display panel, the greater the impedance contribution of the backplane 1008 to the current path. Along the backplane edge 1016A, the backplane 1008 is connected at multiple contact points 1018A to the inputs of the switch 1010.

During the display operation, the switch 1010 is operated to short circuit all of the contact points 1018A and 1018B to the display electronics 1009. During input pen position sensing, the switch 1010 connects each contact point 1018A and 1018B to position sense electronics 1011. Contact points 1018A can be connected to row sense electronics one-at-a-time, through another analog switch or multiplexer, or there can be dedicated row sense electronics associated with each contact point. In what follows, the latter case is assumed, and the sense electronics associated with a single contact point will be described. Sense electronics for all other row and column contact points are preferably identical. Referring to FIG. 21, the input pen 1014 generates an AC signal $V_{stylus}$ which is capacitively coupled through top glass capacitance $C_{top}$ glass to the transparent and conductive backplane layer (e.g., ITO). The signal is conducted along the backplane resistance $R_{backplane}$ to the display edge (1016A in FIG. 20) and to row edge connections 1018A.

Each row edge connection 1018A is sequentially channeled through to the output 1020 of analog multiplexer 1019 for subsequent processing. The individual multiplexer input 1018A which is channeled to the multiplexer output 1020 is controlled by a counter 1021, so that multiplexer input channels are processed sequentially. A clock 1022 controls the rate of sequencing, so that the counter 1021 is incremented with each clock pulse. The signal at the multiplexer output 1020 is processed by an operational amplifier configured as a current to voltage converter 1023. With a backplane six inches on edge and of resistance 150 ohms per square and a 10 mil pixel pitch, a 50 mil top glass thickness, and a 50 megahertz sinusoidal input pen signal, the current range at the current to voltage converter input ($I_{in}$) for all input pen positions is 9.7 to 9.9 microamps. For $R_1 = R_2 = 250,000$ ohms, the corresponding range of voltages at the output of the current to voltage converter is 2.425 to 2.475 volts.

A differential amplifier 1024 amplifies and translates this range of voltages to be zero volts to 5 volts for the above parameters. To do this for the above parameters, $V_{ref}$ in FIG. 21 is 2.425 volts, $R_6 = R_3 = 100,000$ and $R_4 = R_5 = 1,000$ ohms, so that the differential amplifier 1024 has a gain of 100, and the output 1025 of the differential amplifier has a range comparable to that of a subsequent analog to digital (A/D) converter 1027.

Next, a peak detect and hold circuit 1026 of a type well known in the art produces a DC voltage level corresponding to the peak amplitude at the output 1025 of the differential amplifier 1024. A/D converter 1027 then produces a digital representation of the DC voltage level which appears at the output of the peak detect and hold circuit 1026.

Note that the clock signal to counter 1021 is also input to the peak detect and hold circuit 1026, via a delay 1028, and subsequently to the A/D converter 1027, via a second delay 1029. When a clock pulse increments the counter 1021, so that a new multiplexer input line 1018A is channeled to multiplexer output 1020, the delay 1028 provides sufficient delay such that peak detect and hold circuit 1026 is not enabled to capture the signal until the signal has had sufficient time to propagate through the current to voltage converter 1023 and the differential amplifier 1024. The subsequent delay 1029 similarly delays the analog to digital conversion process until the end of the current clock pulse (i.e., until the peak detect and hold circuit 1026 has had time to acquire the peak amplitude from the signal). Near the end of the current clock pulse, a one-shot 1030 enables an analog to digital conversion of the peak amplitude from the peak detect and hold 1026 to a digital representation.

The output of the A/D converter 1027 is processed by a microprocessor 1031 to determine if a threshold voltage level has been exceeded, indicating input pen contact or proximity with the display surface. If, on the other hand, the signal level from the A/D converter 1027 does not exceed the threshold for input pen proximity, the A/D output is ignored, and the counter 1021 is incremented to sample the next multiplexer input 1018A. On the other hand, if the threshold is exceeded, the A/D output is compared to the maximum A/D output so far encountered. If the current A/D output exceeds any so far encountered, it is stored in memory along with the corresponding output of the counter 1021, and the counter is incremented to sample the next multiplexer input 1018A. This continues until all multiplexer inputs 1018A have been sampled.

The counter setting associated with the maximum A/D output is then associated with a display row number. This can be done, for example, if each counter setting has been previously associated with a row number in a memory 1032, so that the counter setting associated with the maximum A/D output need only be matched to its associated row number stored in the memory. Correspondences between counter setting and row number can also be calculated mathematically by the microprocessor 1031. Once the row number corresponding to the current input pen position is determined, the row number can be output for processing by display control electronics 1009 in FIG. 20.

Identical hardware and processing are preferably utilized to determine column input pen position. However, the multiplexer input connections 1018B are tapped from the column backplane edge 1016B in FIG. 20, rather than connections 1018A from row backplane edge 1016A described above in connection with row coordinate determination.

As a means for integrating the display and input pen position sensing functions onto conventional drivers to the greatest possible extent, thus minimizing added device count while eliminating the need to interrupt the display operation, the following display drive/sense circuit configurations are provided for time multiplexed and active matrix addressed displays. This enables simultaneous operation of the display and input pen position sensing.

Referring to FIG. 22A, transmission gates 1035 are incorporated onto a modified drive/sense integrated circuit 1033 so as to provide two possible current paths for each display electrode channel 1034. The current path selection for each of the transmission gates 1035 is determined by the voltage levels on control lines 1036. One of the two current paths couples display drive electronics 1037 to the display electrodes 1034 (i.e., to facilitate the normal display function), while creating a high impedance between the display electrodes 1034 and amplifiers 1038. The other of the two available current paths couples the display electrodes 1034 to the amplifiers 1038, while creating a high impedance between the display electrodes and the display drive electronics 1037.

Concurrently with the display operation, a shift register 1039 shifts a very short (e.g., less than 200 nanosecond) pulse sequentially to each of the transmission gates 1035, via the control lines 1036, in order to sequentially couple the display electrode 1034 associated with each transmission gate 1035 that is pulsed to the amplifiers 1038. When one of the transmission gates 1035A is so pulsed, a high frequency, low amplitude signal originating from an input pen in contact or proximity with the display panel at a position sufficiently close to the display electrode 1034A (associated with the pulsed transmission gate 1035A) is coupled to the amplifier 1038A.

The function of the display drive electronics 1037 is that of a conventional display driver. When a transmission gate 1035A is pulsed to couple a display electrode 1034A to the amplifier 1038A, a capacitor 1042A blocks any DC drive voltages held on liquid crystal cells associated with the display electrode 1034A, and allows any low level, high frequency input pen signal from the input pen 1014 on the display surface (in sufficient proximity to electrode 1034A) to pass through to the amplifier 1038A.

It is also conceivable that the capacitors 1042 can be replaced by a single capacitor at each input to amplifiers 1038. Since the input pen signal frequency is much greater than the display (column and row) drive and shift register frequencies, any such components of signals coupled to the amplifiers 1038 can be further filtered out at a subsequent stage.

Referring to FIG. 22B, it is also conceivable that the transmission gates 1035 can be configured such that the display electrodes 1034 are typically coupled to the display drive electronics 1037. In such an arrangement, depending upon the voltage level of one of the control lines 1036, the associated display electrode 1034 is coupled to peripheral electronics in one of two ways. The first of these permits the sensing of the input pen signal level on the associated display electrode 1034, while providing a display voltage level to that same electrode. That is, the display electrode 1034 is coupled to both the display drive electronics 1037 and input pen position sensing electronics, as shown in FIG. 22B. In this configuration, only one gate 1035 per display channel, plus a shift register, need to be added to a conventional display driver for providing both display drive and input pen position sensing functions. Standard display driver chips, such as the Philips 2201 80 channel driver, include sufficient unused pins to permit the use of these pins by input pen position sensing signals. Consequently, modified versions of conventional driver chips can provide the input pen position sensing function on specialized drivers which are pin for pin replacements for the conventional drivers that they replace. Since the input pen position sensing signal is at a much higher frequency than that associated with the display operation, the input pen position sensing signals can be sensed "over the top" of the display voltages. This is further facilitated by the decoupling capacitors 1042. As the shift register 1039 enables successive display channels for sensing, display drive voltage levels appear as low frequency, low amplitude components to the composite sense signal. The input pen position sensing signals are of sufficiently low amplitude to have no effect on the display quality. The other way in which the transmission gates 1035 operate is to couple the display electrodes 1034 to only the display drive electronics 1037.

A clock 1040 which controls the shift register 1039 also controls a counter 1041 which keeps track of which display electrode 1034 is being coupled to the amplifiers 1038 for sensing. In this way, when the display electrode 1034 with the highest amplitude input pen signal is sensed, its location on the display can be determined from the output of the counter 1041.

Using this approach, the display drive operation can be completely unmodified and uninterrupted so that contrast is improved over the case in which the display operation must be suspended during input pen position sensing. Lower cost and greater simplicity are facilitated since the hardware associated with the display drive function is the same as that in a conventional display-only panel, except for the addition of one transmission gate 1035 per channel and the added shift register 1039. Hence, it is conceivable to construct an application specific integrated circuit which performs both the display driving function and the part of input pen position sensing requiring input from the display electrodes 1034. It is also conceivable that the transmission gate function can be shared with existing analog multiplexers (for providing the drive voltages to the display) which are already on conventional display drive chips. Additionally, typical 80 channel drivers manufactured today (such as the Philips 2201 driver) have up to eight surplus pins, so that it is possible to manufacture pin-for-pin replacements for existing drivers which can be used to convert standard LCD modules into interactive display panels at low cost.

An input pen 1041 can be provided which does not require an electrical connection between the input pen and the drive and sense electronics by simply fabricating an independently powered oscillator within the input pen. For example, a battery within the input pen assembly can power an oscillator within the input pen with a conducting wire connected to the oscillator output and leading to the input pen tip 1015. The oscillator output to the input pen tip 1015 acts as an antenna for coupling the oscillator signal onto display electrodes for input pen position sensing. As with the tethered input pen approach, a ground shield can be provided to enclose the wire conducting the oscillator signal, leaving only the input pen tip 1015 exposed to provide improved directionality.

The input pen assembly can be further simplified to the extent that the input pen 1014 contains no active electronics at all. In fact, all that is required of the input pen 1014 is a conductive material at the input pen tip 1015, preferably coated by a thin layer of smooth material, such as teflon, for minimizing friction.

Referring to FIG. 23, the input pen 1014 preferably does not comprise an oscillator or other active electronics, but simply comprises a conductive tip for input pen position sensing as follows. Signals generated by drive electronics 1140 are used to both drive pixel display elements "on" or "off" and for providing an input pen position sensing signal that is processed by sense electronics 1141. When such a sense signal is coupled by drive electronics 1140 onto one of the display electrodes 1142A, an analog multiplexer 1043 is operated to connect adjacent display electrode 1142B to position sensing electronics 1141, while substantially preventing other display electrodes from making electrical contact with the position sensing electronics.

Referring to FIG. 24, this permits coupling of the input pen signal generated onto the display electrode 1142A to be coupled for amplitude sensing onto the adjacent display electrode 1142B by adjacent electrode capacitance 1045 as it would be normally, but also by series capacitances 1045A and 1045B, between display electrodes 1142A and 1142B, respectively, and the conductive input pen tip 1044. Hence, if the input pen tip 1044 is in close proximity to display electrodes 1142A and 1142B, there is an increased sense signal amplitude on the display electrode 1142B as measured by sense electronics 1141 while a sense signal is being generated onto display electrode 1142A. For input pen position sensing, an input pen sense signal is sequentially pulsed to each row and column display electrode 1142, while simultaneously operating the analog multiplexer 1043 to electrically connect each display electrode adjacent to each display electrode 1142 so pulsed to sense electronics 1141 for input pen position sensing. Input pen position sensing electronics 1141 compares the amplitudes of the input pen sense signals coupled onto each of both row and column electrodes such that the row (column) display electrodes with the highest detected sense signal amplitudes are considered to be in closest proximity to the input pen tip 1044.

Coupling between adjacent lower electrodes is also accomplished as described above, but as in other embodiments, partial shielding by the upper electrodes and finite upper electrode resistance are taken into account in determining required sense signal amplitude and gain to be provided by the position sensing electronics 1141.

Input pen sense signals are preferably coupled onto the display electrodes 1142 simultaneously with display drive voltages. The fundamental harmonic of the input pen sense signal is at a much higher frequency than that of the drive waveform (for example, the input pen sense signal is preferably in the megahertz range, while the fundamental frequency of the drive waveform is only approximately 10 kilohertz). Consequently, the input pen sense signal can be sensed "over the top" of the display driving waveforms, and, subsequently, decoupled from the drive waveforms. Additionally, the input pen sense signal is a sinusoid (or square wave) biased at the voltage level of the driving voltage upon which it is superimposed. Accordingly, no changes in the composite RMS drive voltages result, and contrast and display drive firmware are not affected.

Referring to FIG. 25A, a conventional display driver comprises, in part, output points 1046, level shifting transistors 1047 (used to switch various driving voltages 1048 onto display electrodes connected to the output points 1046), and control lines 1049 to the shifting transistors 1047 that control which voltage levels get coupled to the output points 1046 for driving the display electrodes. Referring to FIG. 25B, the output of a sensing signal generator 1050 is preferably connected to sensing signal gating transistors 1051 which are controlled by control lines 1052 to selectively connect the input pen sense signal to one of the display drive electrodes via an associated output point 1046. In order to leave the RMS driving voltages unchanged, the input pen sense signal (for example, a simple sinusoid or square wave) is biased at the level of the driving voltages at all times. This is done by decoupling the DC component of the input pen sense signal with a capacitor 1053. Additionally, the display drive level shifting transistors 1047 typically have an "on" impedance on the order of 10,000 ohms, which effectively acts as a biasing resistor (the smaller sensing signal gating transistors 1051 can be made to have substantially lower "on" impedance).

Sense transistors 1054 couple input pen sense signals to the sense electronics 1141 and are also controlled by the control lines 1052. These transistors act as the analog multiplexer 1043 described in connection with FIG. 23.

Shift register 1055 sequentially (and concurrently with the displaying operation) sends an "on" pulse onto each one of the control lines 1052, so that each one of the display electrodes connected to the output points 1046 is individually coupled to the input pen sense signal for a brief period (e.g., three cycles of a 5 megahertz signal). Additionally, the control lines 1052 are configured such that during the period while an output point 1046A is connected to the input pen sense signal by the operating control line 1052A to turn "on" the input pen sense signal gating transistor 1051A, the adjacent sense transistor 1054B is simultaneously turned "on" also, so that the display electrode connected to output point 1046B is connected to the sensing electronics 1041, via the decoupling capacitor 1056. The decoupling capacitor 1056 is intended to decouple the low frequency drive waveforms from the much higher frequency input pen sense signal. Active components, such as filters, can also be used.

To minimize leakage through parallel "off" state sense transistors 1054, it is also possible to permit only a limited number of output channels to be connected to each of a multiplicity of circuit paths to the sensing electronics 1041. Existing conventional drivers have sufficient unused pins to permit the use of these extra pins as additional input pen sense signal output points, so that it is possible to duplicate the pin-out configurations of conventional display drivers while providing the input pen sensing capability.

It is also conceivable to utilize analog multiplexers that are already on conventional driver chips for selectively coupling input pen sense signals to sense electronics 1141 (via adjacent electrodes), as well as for displaying data. Although an auxiliary shift register can be provided on-chip to sequentially send an input pen sense signal to each row and column display electrode 1142 as described for simultaneously coupling display and sense waveforms onto each electrode, the shift register that is already included on the display drivers (normally used to cause the driver to sequentially drive display rows) can also conceivably be used for this purpose.

In order to provide input pen position sensing resolution which matches that of the display, input pen sense signal amplitude and coordinate position for the two display electrodes with the greatest amplitude sense signals are provided (for both rows and columns) by sense electronics 1141. Referring to FIG. 26, a method for doing this involves the use of a counter 1057 which serves to operate the drivers 1140 to sequentially pulse each of the display electrodes 1142 with a sense pulse or signal, and to simultaneously operate the analog multiplexer 1043 for sequentially connecting each of the display electrodes adjacent to the pulsed display electrodes to the sense electronics 1141.

Each time that the counter 1057 is incremented, a new display electrode 1142 is connected to the sense electronics 1141, described as follows. A sense signal coupled into sense electronics 1141 is first amplified by an active band pass filter 1058, and then a peak amplitude for that signal is detected and held by a peak detector 1059 for an interval, and after a delay provided by a detect window one-shot 1060 and delay 1061, respectively. The peak value is subsequently compared by a comparator 1062 to the largest peak amplitude value so far encountered (held on a primary sample/hold 1063). If the current amplitude value exceeds that value held on the primary sample/hold 1063, then an AND gate 1064 triggers the primary sample/hold to acquire the new amplitude value, while also triggering a coordinate latch 1065 to latch the current output of the counter 1057, which can be associated with the currently active display electrode by a look-up table, for example.

Also, the voltage amplitude previously held on the primary sample/hold 1063 is compared to that held on a secondary sample/hold 1066, replacing it if greater. If this occurs, the counter value previously held on the coordinate latch 1065 replaces that held on the secondary coordinate latch 1067. Any voltage amplitude not exceeding that held on the primary sample/hold 1063 is compared to that held on the secondary sample/hold 1066, replacing it if greater and replacing the associated counter value held on the secondary coordinate latch 1067 with the current value of the counter 1057. In this way, after all rows (columns) of the display are thus interrogated by the sense electronics 1141, the counter values associated with the two display electrodes 1142 with the highest input pen sense signal amplitudes are available for processing along with their associated amplitude values.

Referring again to FIGS. 1 and 2, the pen sense control means 2 responds to input from sufficient input pen contact with, or proximity to, the surface of one of: the text conversion area 62, the document viewing and processing area 63, and the regions 41-60 for processing and document control. The pen sense control means 2 serves to output pen position coordinate signals from the text conversion area 62, document viewing and processing area 63, and regions 41-60 for actuating editing and processing functions. The input pen coordinate signals are routed to the control subsystem 4 to provide operational control over device input and processing functions.

The internal control and interaction of display processing and character recognition functions is performed by the control subsystem 4 which can be formed from one or more micrcomputers. The data memory 10 stores information currently displayed on the display 1, stores information files which can be recalled for display and processing, stores information input from an external device, or stores information to be output to an external device. A suitable microprocessor device which can be incorporated into the control subsystem 4, as well as the other subsystems, is the MC68000 manufactured by Motorola Inc., located in Phoenix, Arizona. The electronics occupy sufficiently little space to enable these electronics to be housed in a substantially flat and portable device. In addition, the electronics require sufficiently little power to enable operation powered by available, compact power supplies such as rechargeable batteries housed internally to the device.

Operations involved in producing and processing a document will now be generally described with reference to FIGS. 1 and 2. To produce a text document, for example, a letter with typefont text, the control subsystem 4 is set in the text mode, either by default, or if the control subsystem is in the graphics mode, by explicitly touching the region 44 designated "TEXT/GRAPH" with the input pen 3 or 1014 in order to place the device in the text mode. The control subsystem 4 preferably indicates that it is in the text mode by highlighting the word "TEXT" in "TEXT/GRAPH", or by displaying a message in the user message area 61.

With the control subsystem 4 in the text mode, the user can input hand printed text onto the text conversion area 62. Any hand printing that extends to the right into the region 59 designated "CONVERT" causes all hand printing which has been written onto the text conversion area 62 to be stored in the data memory 10 in association with the document being edited and to be cleared from the text conversion area, as well as to re-appear as typefont text in the document viewing and processing area 63. Accordingly, while printing text from left to right onto the text conversion area 62, when enough printed characters have been written to encroach into the region 59 at the right of the text conversion area, or when the user purposely touches any point in the region 59, the just-printed text is incorporated into the document being edited, and the text conversion area is cleared to become available for new input. Text input can continue uninterrupted with new input starting from the left of the text conversion area 62. Text is preferably stored in the data memory 10 in a standardized form, such as ASCII.

Each typefont text character which is displayed on the document viewing and processing area 63 is internally associated with a range of row and column coordinate positions within which it is contained. In this way, by touching the input pen 3 or 1014 to any row and column coordinate position within the character boundary of a given typefont character, that character can be identified for word processing.

For example, consider that a word displayed in the document viewing and processing area 63 is to be deleted from the document being edited. First, the user touches the input pen 3 or 1014 to the region 48 designated "ERASE" and then to any typefont text character to be erased. Since all points within each character boundary are mapped to the associated character, only one point need be touched on any character to be erased. Therefore, it is sufficient to simply run the input pen 3 or 1014 across the letter or word to be deleted. Any subsequent, non-deleted text is then moved over to fill the gap left by the deleted text.

An alternative to invoking "ERASE" by touching the input pen 3 or 1014 to the region 48, is an easily accessed spring loaded "DELETE" control button 40A located on the input pen itself. The control button 40A activates the delete utility only when pressed, thereby effectively converting the input pen 3 or 1014 into an eraser, while the button is depressed.

Similarly, in the text conversion area 62, hand printed characters are also associated with the range of columns and rows which they occupy, so that touching any point within the character boundary of a printed character which has been identified by the character recognition subsystem 8, and which is displayed in the text conversion area, with the input pen 3 or 1014 set to delete, serves to delete that character. Therefore, as is the case of the document viewing and processing area 63, any hand printed text word or words can be deleted by simply pressing the control button 40A and running the input pen 3 or 1014 across the word or words to be deleted. In the text conversion area 62, as with pen and paper writing, erasures are left as blanks. To accommodate proper text formatting, blank space between characters that existed prior to deletion (i.e., blank space between words) is consolidated into a single blank (e.g., an ASCII space). Otherwise, a deletion in the text conversion area 62 causes any space in the document viewing and processing area 63 that would have been occupied by the deleted character(s) to be filled in by any subsequently input hand printed text.

The character recognition subsystem 8 automatically inserts a space between adjacent printed words, provided that the respective last and first characters of the printed words are sufficiently separated. A means can also be provided, however, by which the user can explicitly control the input of all spaces by disabling the automatic space recognition function associated with the character recognition subsystem 8. A means for commanding insertion of one or more spaces is provided by a region 60 designated "SPACE" that runs just below, and along the full length of, the text conversion area 62. While printing text, touching any point along the region 60 causes a space to be inserted explicitly in the document viewing and processing area 63 just after the last text character or space that was entered. A spring loaded "SPACE" control button 40B positioned on the input pen 3 or 1014 can also be provided to insert a text space.

If the user wishes, typefont text can be inserted within a block of already existing text. First, the user touches the input pen 3 or 1014 to a region 47 designated "INSERT", unless an erase control button 40A as described above is provided, in which case the input pen is in an "INSERT" mode by default. After the insert utility is invoked, the user touches the input pen 3 or 1014 to any part of the text document at which new text is to be inserted. Next, the control subsystem 4 determines which character location was touched by mapping the touched position coordinates to an associated character's range of position coordinates on the document viewing and processing area 63. The text conversion area 62 is then cleared, and any previously printed text thereon is temporarily stored.

The text conversion area 62 is now available for the user to input any text to be inserted at the pre-specified location on the document viewing and processing area 63. As new text is inserted at the pre-specified location, any subsequent text or graphics present prior to the insertion is automatically moved over to accommodate the newly inserted text. The insert session continues until explicitly terminated by touching the input pen 3 or 1014 to the region 49 designated "NORMAL". When this occurs, any text that was previously displayed in the input text conversion area 62 prior to the insert session is redisplayed, and normal operation is resumed (e.g., any new text is added to the end of the current file).

As in typical word processing computer programs, a utility for copying selected text from a document into a buffer, and for subsequent insertion of the buffered text to another part of the document, is preferably provided. If, for example, a string of text is to be copied from one location to another, the user can touch the input pen 3 or 1014 to the region 54 designated "CUT". At this point, the user message area 61 preferably displays a message, for example: "Run input pen across any text to be cut." Any selected text is then stored in an internal buffer.

Later in the editing session, the user can touch the region 55 designated "INSERT BUFFER", and then touch a position on the document viewing and processing area 63 with the input pen 3 or 1014 where the buffered text is to be inserted. Many buffers can be stored in referenceable memory locations such that any selected one of these is insertable at a selected location within a document. When such a utility is invoked, the first few words in each buffer are preferably made visible on the document viewing and processing area 63, with ranges of row and column coordinate positions associated with the respective displayed buffers, such that touching any location within the displayed contents of a selected one of the available buffers causes the selected buffer to be inserted into a display location subsequently selected by the user. Other insert utilities, such as inserting entire files, can also be provided and can be effected in a similar manner, for example, by referencing and displaying file names for user selection with the input pen 3 or 1014.

The display 1 preferably accepts both upper and lower case printing. The character recognition subsystem 8, however, can be configured to output all characters in lower case by default, regardless of whether they are printed in upper or lower case by the user. This is meant as a convenience to those users who prefer to print predominantly in upper case, or who arbitrarily switch between cases when printing. The default is initiated by touching the input pen 3 or 1014 to the region 51 designated "LOW CASE". The default is removed by touching the input pen 3 or 1014 to the region 51 again. If default to all lower case letters is set, a spring loaded "SHIFT" control button 40C on the input pen 3 or 1014 can serve as a control to override the default, so as to specify upper case for all characters that are printed when the control button 40C is activated.

Although the character recognition subsystem 8 is configured to correctly recognize and convert any printed character that typical human readers can recognize, a facility is provided to fix unrecognized or misread characters. If the user prints a character that the character recognition subsystem 8 fails to recognize, the space on the document viewing and processing area 63 that the character would occupy is blackened (i.e., all pixels within a rectangular character boundary defined by a standard character's horizontal and vertical extrema are turned "on"). By touching the region 52 designated "FIX", and then touching any such blackened character (or other character) in the document viewing and processing area 63, with the input pen 3 or 1014, the display elements associated with the selected character are preferably caused to flash (i.e., all pixels "on," to all pixels "off," to all pixels "on," and so on), and the leftmost quarter inch of the text conversion area 62 becomes available for rewriting the selected character. After the character has been rewritten in this quarter-inch area, the user touches the input pen 3 or 1014 to the region 59 designated "CONVERT", and if the rewritten character is recognized by the character recognition subsystem 8, it replaces the old one at the prespecified location. Thereafter, the leftmost section of the text conversion area 62 is restored.

As mentioned earlier, when new lines of typefont text are inserted or added to the document viewing and processing area 63, any following typefont text is moved over and reformatted automatically to make space. Additionally, margins set by the user are invoked by the control subsystem 4.

For example, if a left margin is to be established for some existing text, the user first touches the input pen 3 or 1014 to the region 53A designated "LEFT MARGIN" at which time the user message area 61 displays a message, for example: "Touch pen to desired margin position at the first row to be left justified." When this is accomplished, the control subsystem 4 stores the column coordinate of the desired left margin, and the coordinate position and identity of the first character in the first row to be left justified, and displays in the user message area 61 a message, reading, for example: "Touch pen to last row (if any) to be left justified, and then touch pen to 'LEFT MARGIN' again." When the last row to be left justified is touched, the control subsystem 4 stores the coordinate position and identity of the last character of the last row to be left justified. The user then touches the region 53A again with the input pen 3 or 1014, and the control subsystem 4 proceeds to left justify all text within the specified rows. If no row on the document viewing and processing area 63 is touched prior to touching "LEFT MARGIN" again, all text beginning with the first specified row is left justified, as is any new text subsequently input to the device.

Other text formatting utilities, invoked by touching the input pen 3 or 1014 to the appropriate region, allow the user to explicitly begin a "NEW LINE" (region 58, equivalent to "line feed"); start a "NEW PARA[graph]" (region 57, equivalent to line feed with indent); or begin a "NEW PAGE" in the current file, leaving any remaining space on the previous page blank (region 56, equivalent to form feed). The above-described editing functions constitute only a few examples. In addition, a multitude of other text editing and processing functions can be provided and can be effected in conjunction with the device in a manner similar to the functions described above.

With the control subsystem 4 in the text mode, if the input pen 3 or 1014 touches the region 44 designated "TEXT/GRAPH", the control subsystem enters the graphics mode. In the graphics mode, the path of the input pen 3 or 1014 on the document viewing and processing area 63 is traced and made visible, and coordinate positions of thus activated display elements are stored in the data memory 10 in association with the document being processed.

In the graphics mode, the input pen 3 or 1014 inserts hand drawn graphics onto the document viewing and processing area 63. If graphics are drawn in the midst of typefont text, the position of the text is translated downward to accommodate the insertion of the graphics at the selected location in the document. That is, when graphics are being drawn, the topmost and bottommost row coordinates of the graphics are continually updated and recorded, so that when the coordinates sufficiently encroach upon an are occupied by typefont text, the text is translated vertically to make space. In the graphics mode, the regions 47-49 described above for processing text can be used only for processing graphics.

For example, if a graphics stroke is to be erased, by touching the input pen 3 or 1014 to the region 48 designated "ERASE", or by depressing the control button 40A on the input pen 3 or 1014, the input pen becomes an eraser, which in the graphics mode has a "brush width" larger than that used for drawing the graphics strokes themselves. The larger brush width is provided so that when erasing, the input pen 3 or 1014 need only be within a brush width of the center of a stroke to be erased, in contrast to requiring that the input pen make contact with all points associated with the portion of the stroke to be erased. The entire length of a stroke can also be erased by making input pen contact with any point along the stroke's length, provided that all of the stroke's point coordinates are mapped in the data memory 10 to the associated stroke. Therefore, graphics editing changes can be applied globally to all of the stroke's point coordinates responsive to the input pen's brush width contacting any one of the stroke's display element points. Although brush widths are provided by default, a means can be provided for explicit brush width adjustment for both drawing and erasure, responsive to an input pen actuated command, in order to accommodate individual styles. Additionally, other types of graphics manipulation available with many mousing devices can be provided to enable the user to produce pre-defined shapes, such as circles, curves, lines, etc., by touching the input pen 3 or 1014 to an appropriate region. Such pre-defined shapes have the advantage of being representable in the data memory 10 in a compact and parametric form such that only a code for the selected shape and essential attributes, such as position and dimension, need be stored in memory. This is in contrast to bit-mapped and other graphics storage representations suitable for arbitrary graphics, which require that individual display elements be represented, and that substantially more memory be consumed.

The above described graphics functions constitute only a few examples. Additionally, a multitude of other graphics editing and processing functions can be provided and can be effected in a manner similar to the functions described above.

In order to return to t he text mode, the user touches the input pen 3 or 1014 once again to the region 44 designated "TEXT/GRAPH". This prompts the control subsystem 4 to indicate that it is now in the text mode, preferably by highlighting the word "TEXT" (in the region 44), or by explicitly displaying the mode in the user message area 61.

Documents are stored as referenceable files in the data memory 10, with associated file names collectively displayed as a file directory. File management utilities available by touching a selected one of the regions 42-43B enable the user to select, delete, or create a file containing textual and/or graphics information.

Touching the input pen 3 or 1014 to the region 42 designated "DIR" causes the document viewing and processing area 63 to display the first page of the file directory containing the names of files which have been stored in the file directory in the data memory 10. Since each displayed file title is associated with its associated range of display row and column coordinate positions on the display 1, touching any point on a selected one of these file titles causes the first page of the associated file to be selected for viewing and processing. Touching the region 43A designated "DEL FILE" also causes the file directory to be displayed, and enables the user to delete from the directory any file whose title is subsequently touched by the input pen 3 or 1014. A file can also be created or renamed by touching the region 43B designated "NEW FILE". The control subsystem 4 first displays the file directory and then prompts the user to either touch a selected file title for renaming, and to subsequently print the new file name onto the text conversion area 62, or to open a new file by first entering a new file name onto the text conversion area (i.e., without first touching an existing file title). In either case, when the new or renamed file title has been written, the user touches the region 59 designated "CONVERT" with the input pen 3 or 1014, and then the first page of the new or renamed file is displayed for viewing or processing.

It is also contemplated that graphics and text may be stored with associated file titles represented by hand drawn text characters or symbols. For example, a file title for a file to be stored in the file directory can be hand written in a specified area of the document viewing and processing area 63. The directory file to be displayed upon selection of the DIR, DEL FILE, or NEW FILE functions therefore comprises a series of hand written file titles, each associated with vertical and horizontal boundaries, so that the input pen 3 or 1014 can be used to select one of these file titles for display, processing, deletion, or renaming.

The above file management operations constitute only a few examples. There exists a multitude of other file management utilities which can be provided.

Other commands for text and graphics editing and display processing can be actuated and specified by touching the input pen 3 or 1014 to the region 46 designated "COMMAND", explicitly writing the desired command word, or words, into the text conversion area 62, and then touching "CONVERT". This feature provides a capability for accommodating custom on-board software for which there may not be a general need among most users, or for which there may otherwise be no area on the device for accommodating a dedicated command square. For example, custom software may include standard math functions, specialized user interface features, or capabilities for providing program compilation and execution, as on personal computers.

Before describing the character recognition process, some general features of the procedure will initially be described. First, characters are identified one at a time, as they are printed. A stroke is defined as the path that the input pen 3 or 1014 follows from the time it touches the text conversion area 62 until it is lifted. A character which is not yet identified but whose strokes are currently being printed is referred to as the "current queue character."

When each newly drawn stroke is processed, it is assumed to be associated with either the current queue character, or with a subsequent character. Input strokes associated with previously identified characters are disqualified from being associated with the current queue character. With each new stroke, the character recognition subsystem 8 determines all of the possible characters which could be partially formed, or completely formed, from all of the strokes so far associated with the current queue character, including that most recently drawn. Characters which qualify as partially or completely formed from strokes of the not-yet-identified current queue character are referred to as "partial" and "complete candidate characters," respectively.

Each time that a new stroke is input, the identity of the current queue character is tentatively characterized in terms of: partial candidate characters (i.e., those characters which could be partially formed from the strokes drawn so far); and complete candidate characters which are completely formed from strokes drawn so far, or which were completed with a previously input stroke.

When a character is completely formed, the strokes associated with it are stored along with the character identification. Therefore, if after subsequent input strokes it is determined that a previously completed candidate character was actually the intended character, only those strokes associated with that completed character become disqualified for analysis in connection with subsequent characters.

The character recognition subsystem 8 assumes that all strokes associated with a printed character are drawn prior to strokes associated with any subsequent character. Since each character is identified only on the basis of strokes associated with it, there is no need for handprint boxes to separate adjacent characters, or for requiring that adjacent characters do not touch each other, as this would encumber natural hand printing.

Additionally, strokes are divided into segments called "sub-strokes" or "stroke segments" which are represented for computation as binary coded "analysis scan words" containing information pertaining to stroke segment direction, vertical and horizontal extent, connectedness, and position with respect to other stroke segments in the current queue character. The segmentation of strokes into stroke segments represented as individual analysis scan words is such that segments of each stroke, which could individually contribute to the essential structure of the character being printed, are represented as analysis scan words, separately and independently of other segments of the same stroke. Therefore, strokes typically comprise a plurality of stroke segments represented as a corresponding plurality of associated analysis scan words.

In order to compare analysis scan words input by the input pen 3 or 1014 with the necessary combinations of stroke segments for forming characters in the device's allowed character set, "sub-stroke template words" are used, each one of which contains a range of allowed analysis scan word characteristics required for forming one of the stroke segments (i.e., sub-strokes) essential to the structure of one of the allowed characters. Therefore, strokes containing segments non-essential for forming a printed character do not inhibit character recognition, since the essential segments are considered for comparison with sub-stroke template words separately from those which are not essential, regardless of whether essential and non-essential stroke segments are part of the same stroke.

Referring to FIG. 6A, since essential and non-essential segments are considered separately, it is possible to recognize characters with arbitrary serifs 64 or with stroke overwriting 65, both common to natural hand printing. Reasonably arbitrary stroke connectedness and non-connectedness are also allowed, since essential segments are processed separately, whether connected, as shown at 66, or not, as shown at 67.

Additionally, whenever a new stroke is drawn and its associated analysis scan words are stored and compared with sub-stroke template words, any analysis scan word, whose characteristics are found to sufficiently match one of the sub-stroke template words associated with one of the characters in the allowed character set on initial evaluation, is stored as a possible match for the template in a candidate character register occupying a portion of the data memory 10. An analysis scan word which initially matches a sub-stroke template word, and is therefore transferred to the candidate character register or referenced there, is referred to as a "candidate scan word" with respect to the sub-stroke template word it matches, as well as with respect to the template's associated character, and represents a "candidate segment" with respect to the input stroke of which it is a part.

When all of the template words for a given candidate character have at least one matching candidate scan word, the character being evaluated becomes a "complete candidate." Next, the character's contributing candidate scan words are related to one another and further qualified, or disqualified, for inclusion as contributing components of the character being evaluated, according to parameters pertaining to interconnectedness, relative position, and orientation with respect to the other of the character's candidate stroke segments. This enables the character recognition procedure to update the status of candidate characters (i.e., to partial, complete, or disqualified) with each newly drawn stroke, as will be described in greater detail below.

The flow diagram shown in FIG. 7 illustrates the sequence of operations associated with automatic recognition of hand printed text characters, and subsequent representation in standardized format (e.g., ASCII) for storage in the data memory 10. The text is also displayed as typefont text in the document viewing and processing area 63.

Referring to FIGS. 1, 2, and 7, when inputting text, the character recognition subsystem 8 is enabled for a pen sense and store routine, as shown at 100 in FIG. 7. Thereafter, the character recognition subsystem 8 waits to receive a "pen down" signal from the pen sense control means 2, as shown at 102, indicating that the input pen 3 or 1014 is in contact with, or sufficient proximity to, the text conversion area 62.

Next, the character recognition subsystem 8 initializes itself to accept and process printed text input, as shown at 104. This entails initializing the necessary counters and registers, and setting the status of all template words and candidate character registers to reflect that all characters in the device's allowed character set are now qualified for being considered in identifying the new queue character. Until the input pen 3 or 1014 is lifted from the text conversion area 62 (i.e., the stroke is completed), as determined at 106, the path of the input pen is traced on the text conversion area, and stored as a string of adjacent pixel directors (APD's), as shown at 108.

Referring to FIG. 6B, there are eight possible directions that can be taken as the input pen 3 or 1014 travels from one display element to another in a display comprising substantially perpendicular rows and columns of display elements. Each of these directions is a possible value which can be associated with an APD representing the path of the input pen 3 or 1014 from one display element to the next.

In connection with step 108, referring to FIG. 6C, when a "dogleg" is encountered and represented as two adjacent and orthogonal APD's (e.g., 68 and 69), it is re-represented as the nearest single APD (e.g., 70). This is performed as part of simplifying the representation of stroke direction in the processing of strokes which are only one display element in width, and is less computationally intensive than thinning procedures required prior to the character recognition processing of input strokes having a width greater than that of one display element. A stroke represented as a string of APD's is referred to as an "initial scan word".

A preamble is associated with each initial scan word, comprising a plurality of suitably coded information describing stroke characteristics, such as the row and column coordinate positions of the horizontal and vertical stroke extrema, including, for example: the stroke's topmost point, bottommost point, leftmost point, and rightmost point. Also included in the initial scan word preamble is suitably coded information pertaining to the number of display elements included in the stroke. Preamble information is then used to redefine the horizontal and vertical extent of the current queue character, if necessary, and to determine whether or not the associated stroke is far enough to the right of the previous stroke to automatically be considered part of a new character by default, rather than waiting to infer the presence of the next character by deduction based upon the status of current candidate characters and their associated candidate segments, as will be described in greater detail below.

Next, rules can be applied to the initial scan word to remove any obvious serifs or tails, as shown at 110 in FIG. 7. The process of tail removal is known in the art and will therefore not be described in detail here. The segmentation and separate processing of separate stroke segments by the character recognition subsystem 8 make an explicit tail removal procedure redundant, except where there are enough serifs to substantially slow the character recognition process, and such that their early removal can be effected more efficiently than their subsequent processing by the character recognition procedure.

Next, the initial scan word currently being processed is consolidated into a string of "direction segmented scan words" (DSSW's), as shown at 112. At this time, local groups of neighboring stroke display elements with similar APD direction values, which are represented by sections of the initial scan word having substantially the same APD direction values, are consolidated into one DSSW with an associated "repeat value." The repeat value represents the number of neighboring display elements with substantially alike APD values, that were consolidated into the DSSW. Additionally, DSSW's with an associated direction value of 4, 5, 6, or 7, representing a right to left drawing direction (see FIG. 6B), are changed to reflect a left to right drawing direction by replacing respective APD values of 4, 5, 6, and 7 with 0, 1, 2, and 3, respectively. Finally, DSSW's are segmented and ordered to reflect a sub-stroke input direction of left to right, regardless of actual drawing direction.

For example, referring to FIG. 6D, a stroke 81 is segmented and represented prior to reordering by DSSW's associated with stroke segments 82, 83, 84, 85, 86, 87, 88, 89, 90, and 91. After re-representing these and re-ordering them to reflect a left to right drawing direction, they are ordered 82, 83, 84, 85, and 89, 88, 87, 86, and 90, 91. Note that the original stroke is re-organized into these component sub-strokes, reflecting a left-to-right-only drawing direction. The above described re-organization and segmentation of individual strokes serves to make the character recognition procedure independent of the direction or order in which strokes are drawn, a desirable feature for natural hand printed text input.

The last step which precedes the conversion of drawn strokes into recognized characters involves the conversion of DSSW's into a form better suited for rapid computation during the character recognition process, as shown at 113. This final form of representation for drawn strokes is referred to as an "analysis scan word" (ASW). A sample analysis scan word is shown in FIG. 6E.

Referring to FIG. 6E, a stroke number is represented in portion A of the analysis scan word, which identifies the stroke of which the scan word's associated sub-stroke segment is a part. Stroke numbers are stored chronologically, that is, in the order drawn.

When a current queue character is finally identified, any strokes associated with one or more of the identified character's substantially contributing analysis scan words are disqualified from being associated with future queue characters. Additionally, any remaining strokes which do not contain any substantially contributing sub-strokes for the just-identified current queue character, and which were input subsequently to the contributing sub-strokes, are reordered according to their order of input and applied to the next queue character. Four binary bits, allocated for representing stroke number, permit up to 16 strokes to be considered at any one time as part of the current queue character.

Next, in portion B of the ASW, the specific ASW or sub-stroke identification number is represented. Four binary bits allocated here permit strokes to be segmented in up to 16 sub-strokes.

Also, referring to FIGS. 6E and 6F, in portion C of the ASW, sub-stroke shape, such as an upward concave 92A, downward concave 92B, or straight 92C, is represented. The principal APD value at the left end of the sub-stroke is represented in portion D of the ASW, and the principal APD value at the right end of the sub-stroke is represented in portion E. The identity (i.e., the stroke number and sub-stroke number) of any connecting analysis scan words that extend continuously from the respective left end of the segment, or right end of the segment, are represented in portions F and G, respectively. The row and column position coordinates of the respective right, left, bottom, and top sub-stroke extremities are represented in ASW portions H, I, J, and K, respectively. Finally, the number of display elements contained in the sub-stroke are represented in portion L of the ASW.

The above described analysis scan word portions represent a sample set which can be expanded with other parameters or abbreviations of parameters already described for purposes of computational efficiency during subsequent processing. For example, a parameter useful in comparing a sub-stroke template word to an ASW might involve dividing the vertical space available to a character in the text conversion area 62 into three respective areas, e.g., upper, middle, and lower, so that rather than, or in addition to, specifying top and bottom position coordinates, the ASW could specify, more simply, upper, middle, or lower, respectively. Therefore, the necessary computations for this aspect of comparison are performed during ASW formation, rather than during other more time critical processing.

The next step in the character recognition process determines whether or not the current stroke and its associated analysis scan words are to be considered as the first stroke of a new queue character, as shown at 114. If so, it is necessary to initialize the character recognition subsystem 8, as shown at 116, by initializing the necessary counters and registers, and by setting the status of all template words and candidate character registers to reflect that all characters in the device's allowed character set are now qualified for being considered in identifying the new queue character.

Additionally, any strokes (and associated sub-strokes) that were not associated with the last identified queue character are referred to as "leftover" strokes. Upon identification of the last recognized queue character, such leftover strokes are assigned new stroke numbers to reflect their order of input, and then recompared, one at a time, in the order originally input, to all of the template words of the allowed character set, after the character recognition subsystem 8 has been re-initialized for the new queue character. Once all leftover strokes are processed, if the new queue character is still not identified, the character recognition subsystem 8 waits to process the next stroke that is input by the user, and applies that stroke to the current queue character, and so on.

As indicated, if the stroke being analyzed is other than the first for the current queue character, the initialization procedure 116 is skipped, and the character recognition subsystem 8 proceeds directly to comparison block I, as shown in FIG. 7. Otherwise, the initialization is immediately followed by the comparison block I.

In the comparison block I, as shown at 118, each ASW, of which the stroke currently under analysis is comprised, is fetched. Each ASW is compared, as shown at 120, to every sub-stroke template word associated with the essential stroke segments of all currently qualified characters in the character set (that is, all characters in the character set whose status is either complete candidate character or partial candidate character, i.e., other than disqualified). As is reasonable for natural hand printed text, each complete stroke is assumed to contain at least one segment which contributes substantially to the essential structure of the character currently being printed by the user.

In order to narrow the range of candidate characters efficiently, the above rule is invoked to assure that a given character is disqualified from identification with the current queue character if none of the ASW's associated with the stroke currently being analyzed match any of the essential sub-stroke template words for forming the given character. In other words, it is required that at least one ASW associated with the stroke under analysis matches at least one sub-stroke template word associated with a given character under comparison. Otherwise, that character is no longer considered a candidate for identification with the current queue character. An exception is when a character which has been completely formed by previously drawn strokes has been "saved," so that it can be identified with the current queue character later if necessary. Such a saved candidate character is referred to as a "backup" candidate character and will be described in more detail later.

Once an ASW is matched up to a given sub-stroke template word, it is compared to the remaining templates of both the character currently under comparison and the remaining templates associated with the other still-qualified candidate characters in the character set. Accordingly, a single ASW can be matched up to more than one sub-stroke template word associated with any number of candidate characters.

Similarly, a single sub-stroke template word can be matched up to more than one ASW from more than one associated input stroke. Therefore, by the end of the comparison block I, any template associated with any candidate character can potentially be matched up to more than one candidate ASW. This serves to permit a single sub-stroke component of a given character to be drawn once, and then drawn again and again in the manner of "stroke overwriting" (see strokes 93 and 94 in FIG. 6G), and to enable the character recognition subsystem 8 to choose the best candidate ASW from a plurality of such ASW's found in the comparison block I to match up with a given template.

When an ASW under analysis matches a sub-stroke template word associated with a given candidate character, that ASW is referenced in the candidate character register as a "candidate ASW," or, "candidate segment," for the matching sub-stroke template word whose parameters reflect those of a stroke segment essential for partially forming the given candidate character. Once an ASW associated with the stroke being analyzed has been compared in the comparison block I with all currently qualified candidate characters, another ASW associated with the stroke currently being analyzed is processed by the comparison block I, until all ASW's associated with the current stroke have been processed, as shown at 122.

As shown at 120, the status of each candidate character, for which at least one matching ASW has been found for each of its associated sub-stroke template words, is set to "complete." Also, the status of characters which have not been disqualified, but for which all associated sub-stroke template words have not yet been matched to the previously input ASW's (i.e., those characters for which some, but not all, of the character's associated sub-stroke template words have been matched to earlier input ASW's associated with the current queue character), are set to "partial." A given character's status can also reflect that it has been disqualified from consideration with respect to the current queue character if no ASW is found from the stroke currently being analyzed, which sufficiently matches an of the given character's sub-stroke templates. Each character's status can be copied to the appropriate location in the candidate character register for access later.

In the next functional comparison block, referred to in FIG. 7 as comparison block II, complete candidate characters, that is, those candidate characters which have been completed by the most recently analyzed stroke, are further qualified or disqualified. Since the purpose of the comparison block II is primarily that of verifying interrelationships between all contributing stroke segments of complete candidate characters, it is necessary that the candidates have at least one matching candidate segment for each required sub-stroke template word needed for forming the character (i.e., they have a status of complete).

Initially, each character in the character set is sequentially fetched, as shown at 124. Then, each character in the character set is tested to detect if its status is "complete," as determined at 126. Any characters with a status of other than "complete" are then skipped, and the next character in the character set is tested, unless no characters remain to be tested, as determined at 128. Each complete candidate character is processed as follows.

First, for each one of the sub-stroke template words associated with each one of the current complete candidate characters, there are associated one or more candidate ASW's found in a previous pass through the first comparison block I and placed, or referenced, in the candidate character register, and there are associated with the identity of the sub-stroke template words with which they were found to match. Each candidate ASW is then qualified or disqualified, as shown at 130, based on rules pertaining to horizontal and vertical extent and segment position and orientation, all in relation to other stroke segments (ASW's) associated with the character under analysis Also, rules pertaining to connectedness to other stroke segments required for forming the character are evaluated.

For example, referring to FIG. 6G, it is reasonable to assume that the stroke segments 95 and 96 in the letter "R" are essential to the formation of the character, that they would be connected on the right of the character at point 98 in the figure, and that either of the strokes 93, 94, or 95 would contain the topmost point in the character. On the other hand, it is not reasonable to assume that strokes 93 and 95 are connected, that strokes 96 and 97 are connected, or that strokes 93 and 97 are connected, since the "R" could just as easily be written as in FIG. 6H.

Note that in order to perform such tests, it is necessary to require that at least one candidate ASW for all stroke segments necessary for forming a given character is present for testing and comparing ASW parameters, such as horizontal/vertical extent, as well as connectedness, with others of the character's associated stroke segments. Candidate ASW's which fail any of the tests indicated at 130 are disqualified from candidacy with respect to their associated sub-stroke template word. Furthermore, if all of the candidate ASW's associated with a certain sub-stroke template word (in the candidate character register), associated with a given character under analysis, fail the matching criteria, as determined at 130A, the character status associated with all of the given character's strokes immediately reverts to "partial," as shown at 132. Additionally, the character recognition subsystem 8 verifies that all strokes drawn so far still contribute at least one qualifying candidate ASW to the given character, as shown at 134. If it eventuates that any stroke that has been drawn so far in connection with the current queue character is no longer contributing at least one qualifying candidate ASW to at least one of the sub-stroke template words associated with the character currently being analyzed, that character is disqualified from possible identification with the current queue character, unless it has been determined to be a "backup" character as will be described below.

Additionally, if at least one candidate ASW remains associated with each sub-stroke template word corresponding to the character currently being analyzed, as determined at 130A (i.e., the character's status is still complete), remaining ASW's associated with that character are further qualified, or disqualified, as shown at 136. First, each ASW associated with each of the sub-stroke template words (of the character currently being analyzed) is checked to assure that the associated extrema conform to requirements of the associated sub-stroke template words. If all of the candidate ASW's associated with a certain sub-stroke template word corresponding to a given character under analysis fail the matching criteria, as determined at 136A, the character status associated with the given character's strokes reverts to partial, as shown at 132. Again, input strokes are checked to assure that they contribute at least one ASW, as shown at 134.

Next, as shown at 138, candidate characters continuing to have a status of "complete," after being processed by the comparison block II, are ranked according to stroke placement rules associated with each complete candidate character, and pertaining to the extent to which the input ASW's match non-essential, but desirable, characteristics of each candidate character. The placement rule score associated with each candidate character is then recorded along with the identity of the candidate character's associated strokes and ASW's. The score associated with the highest ranking of these candidate characters is then compared to the score associated with the highest ranking complete candidate character ("backup candidate" character, as will be described below) from the last time a stroke and its associated ASW's were input for analysis, and stroke placement rules were processed for resulting complete candidate characters, as shown at 140.

The highest ranking candidate character of those just processed by stroke placement rules, and the highest ranking complete candidate from the last time stroke placement rules were processed, is referred to as the "backup candidate" character. The backup candidate is stored along with its placement rule score for comparison with the highest ranking complete candidate the next time placement rules are processed. Additionally, the identities of ASW's associated with a given backup candidate character are stored along with the backup candidate character's identity and its placement rule score.

If the next analyzed stroke and its associated ASW's do not contribute any stroke segment to any partial or complete candidate character in the character set, implying that the last determined backup candidate character was the likely identity for the current queue character, the last backup candidate can then be identified with the current queue character along with only its associated contributing strokes. Therefore, other subsequently input strokes are processed as "leftover" strokes, in connection with the next queue character, according to the order of input of the strokes.

As determined at 142, if there are no "partial" status candidate characters (i.e., those still subject to being completely formed by not-yet-input strokes), or if the user has indicated that the last drawn character has been completed by touching the input pen 3 or 1014 to one of the regions designated "CONVERT", "NEW LINE", "NEW PARA", or "NEW PAGE", as determined at 144, or if the last current input stroke was far enough to the right of the rightmost edge of the current queue character boundary (as of the last input stroke) to be considered part of a new character by default, or if the user touched the input pen to the region designated "SPACE," as determined at 145, or if the strokes currently being analyzed have not yet been associated with an identifiable character, and if these strokes (associated with the current queue character) have a lateral range that is greater than a given threshold, then the character recognition subsystem 8 proceeds to identify the current queue character with the character identity associated with the current backup character, and its associated contributing strokes and associated ASW's, as shown at 148. Also, if one of the "CONVERT", "NEW LINE", "NEW PARA", or "NEW PAGE" regions was touched, the text conversion area 62 is cleared, as shown at 146. Additionally, the character recognition subsystem 8 is reset to accommodate recognition of a new queue character, as shown at 146A. The chosen backup candidate character identity associated with the current queue character is then represented in a standardized format, such as ASCII, and inserted into a "pre-text" buffer in the data memory 10, containing information pertaining to the character's lateral and vertical extent in the text conversion area, as well as the identity of input strokes of which it was formed, as shown at 148. Additionally, any spaces, line feeds, or form feeds actuated by the user (or discerned by the character recognition subsystem 8) are inserted into the pre-text buffer. Also, if a given queue character, after exceeding a given horizontal extent default, remains unidentified by the character recognition subsystem 8, it can be stored in the pre-text buffer with a status of "unrecognized," so that when displayed in the document viewing and processing area 63, the character is highlighted, or "blackened," for example. Similarly, a status of "erased" can be provided for characters which are erased by the user, while still in printed form in the text conversion area 62.

If the "CONVERT", "NEW LINE", "NEW PARA", or "NEW PAGE" command has been actuated, as determined at 150, any already converted text (in the pre-text buffer) represented in a standardized format, such as ASCII, is inserted into the document currently being edited as the associated typefont text characters on the document viewing and processing area 63, as shown at 152.

Strokes associated with a backup candidate character are disqualified from being associated with any subsequently input and identified characters. As mentioned above, any strokes that were associated with the current queue character, but were not associated with a chosen backup candidate character, are referred to as "leftover" strokes.

For example, a character is identified after analyzing a current queue character's fourth input stroke, but the queue character's identity is determined to be that of the backup candidate character, which was computed after, and including only, the first two input strokes associated with the queue character. In this case, after the second input stroke has been processed through the comparison blocks I and II and stroke placement scores are determined for complete candidate characters, and the highest ranking of these is chosen, the presence of remaining partial candidate characters (i.e., those characters which could have been partially formed from the first two input strokes) would have required that the character recognition subsystem 8 process enough subsequent input strokes, and their associated ASW's, to determine whether or not any one of the partial candidates is actually the intended input character. If after the next two input strokes, it is determined that the character formed from the first two input strokes was indeed the intended input character (e.g., partial candidates are subsequently disqualified), the subsequent strokes (the third and fourth input strokes) become "leftover" strokes and are not associated with the identified character. The leftover strokes must then be reprocessed for association with the next queue character as if they were being drawn in the order originally input, one at a time, before further new input strokes can be processed.

If, on the one hand, after identifying a current queue character, there are no leftover strokes, as determined at 154, the character recognition subsystem 8 waits for the next input stroke by returning to the pen sense and store routine, as shown at 156. If, on the other hand, after identifying a current queue character, it is determined that there are leftover strokes (i.e., not associated with the identified character), as shown at 158, the leftover strokes are re-ordered along with their associated ASW's to reflect their order of input, a new queue character is initialized, and since the first leftover stroke is assumed to be the first stroke of a new queue character, the first comparison block I is initialized, along with the appropriate counters and registers.

If, after stroke placement rules are processed, there remain partial candidate characters formed from queue character strokes drawn so far, as determined at 142, and none of the "CONVERT", "SPACE", "NEW LINE", "NEW PARA", or "NEW PAGE" commands has been actuated, as determined at 144, and the lateral extent defaults for new or unidentified characters have not been exceeded, as determined at 145, then if there are no leftover strokes waiting to be processed, as determined at 160, the character recognition subsystem 8 waits for the next input stroke by returning to the pen sense and store routine, as shown at 156. If leftover strokes still remain to be processed, as determined at 160, the character recognition subsystem 8 "picks-up" the next leftover stroke to be processed and associated ASW's, and in accordance with the stroke's horizontal and vertical extrema, updates the current queue character limits, as shown at 162. The character recognition subsystem 8 then proceeds to determine whether or not the leftover stroke is the first stroke for a new queue character, as shown at 164 (i.e., if the first stroke flag was set at 158). If it is, the comparison block I is initialized, as shown at 166. Next, as shown at 167, the leftover stroke is processed identically to any input stroke as described above, beginning at 114. If it is determined at 164 that the leftover stroke is not the first stroke of a new queue character, the initialization at 166 is skipped and that stroke is initially processed by the comparison block I (again, beginning at 114), and subsequent routines as described above, as shown at 167.

The process by which the character recognition subsystem 8 becomes customized to a particular user's printing style can also be described with reference to FIG. 7. The character recognition procedure depends upon sub-stroke template words, and these templates comprise a set of allowable ranges for input stroke parameters that are computed and stored from input strokes, in the form of analysis scan words. Since ASW's are formed independently of the sub-stroke template words themselves, the user can print the same character several times in his or her own printing style, whereupon the character recognition subsystem 8 in a learning mode can process the resulting plurality of strokes and associated analysis scan words to yield a range, average, or extrapolation of values for each ASW parameter associated with each component ASW used in forming the character.

Since sub-stroke template words comprise only allowable ranges for ASW parameters, a range of values for a given ASW parameter determined from a plurality of input versions of the same text character can be used along with other such parameter value ranges to form the necessary sub-stroke template words to be used in comparing input ASW's to the stroke segment parameters required to form the character. Referring to FIG. 7, this is shown as an alternate processing path to that for character recognition processing, subsequent to the formation of ASW's, as shown at 113, and is depicted with a dashed line in the figure. The first step, shown at 113A, is to use multiple ASW's, input and formed at steps 100 to 113, to create a range, average, or extrapolation of values for each ASW parameter associated with each component ASW used in forming the input character. As shown at 113B, these ranges, averages, or extrapolations are stored in the form of sub-stroke template words for use in normal character recognition.

Referring to the remainder of the figures, FIG. 8 illustrates the sequence of operations when the user touches the region 59 designated "CONVERT" with the input pen 3 or 1014, as shown at 200, during the course of printing text characters onto the text conversion area 62. First, the convert routine is initialized, as shown at 202. Then, input to the text conversion area 62 is disabled, as shown at 204.

Thereafter, any text which has been input, but not yet processed by the character recognition subsystem 8, is processed through character recognition, as shown at 206. An unidentified character, as determined at 208, is represented, for example, as a square with all display elements inside the square "on," as shown at 210. All other characters processed through character recognition (i.e., which are in the pre-text buffer), and which have not been erased, as determined at 212, are represented in a standardized format, such as ASCII, and the standardized format character representations are then transferred to the data memory 10 to be stored, as shown at 214, as well as displayed in the document being edited. Finally, the text conversion area 62 is cleared, the character recognition subsystem 8 is re-initialized, and the user message area 61 displays a message indicating that the device is "ready" for more text input, as shown at 216.

FIG. 9 illustrates the sequence of operations when a misread or unrecognized character is to be corrected. When the user touches the region 52 designated "FIX" with the input pen 3 or 1014, as shown at 300, the fix routine is initialized, as shown at 302. Then, the user message area 61 displays a message which instructs the user to touch any text character displayed in the document viewing and processing area 63 which is to be corrected, or re-input, as shown at 304.

When the selected character is touched with the input pen 3 or 1014, as determined at 306, the character's row and column position coordinates are encoded, and activated display elements associated with the selected character to be changed are then highlighted by, for example, flashing "on" and "off," as shown at 308. Next, as shown at 310, a region large enough to print a single character is cleared at the left end of the text conversion area 62. The user message area 61 then displays a message instructing the user to print a character on the cleared area to replace the character to be changed, and to then touch the region 59 designated "CONVERT" with the input pen 3 or 1014 when finished printing the replacement character, as shown at 312.

Thereafter, the data previously produced by the character recognition subsystem 8 is saved, as shown at 314. This preserves the results of character recognition of new characters performed prior to the initiation of the fix routine. The character recognition subsystem 8 is then initialized for analyzing the replacement character, as shown at 316.

When the replacement character has been printed and "CONVERT" touched with the input pen 3 or 1014, as determined at 318, the character recognition subsystem 8 determines the identity of the newly input character and transfers the identity in standardized format to the appropriate location on the document viewing and processing area 63, and to the data memory 10 to replace the earlier selected misread, unrecognized, or changed character in memory, as shown at 320. Finally, as shown at 322 and 324, the text conversion area 62 and the character recognition subsystem 8 are restored to their original state so as to be ready for new input.

FIG. 10 illustrates the sequence of operations when the device is to be switched from the text mode to the graphics mode. When the control subsystem 4 is in the text mode, and the user touches the region 44 designated "TEXT/GRAPH" with the input pen 3 or 1014, as shown at 400, the control subsystem 4 detects whether the device is in the text mode or the graphics mode, as determined at 402. If the device is already in the graphics mode, the control subsystem 4 switches to the text mode and indicates the mode change to the user by highlighting the word "TEXT" in the region 44 designated "TEXT/GRAPH", as shown at 404. Conversely, if the device is in the text mode, as determined at 402, the control subsystem 4 switches to the graphics mode and indicates the mode change to the user by highlighting "GRAPH" in "TEXT/GRAPH", or by displaying a message in the user message area 61 indicating that the device is now in the graphics mode, as shown at 406.

Interactive graphics, processing, data compression, and decompression techniques are known and therefore will not be described in detail here. Suitable known techniques for graphics processing that can be used are available commercially as mouse interactive software, such as MACDRAW, produced by Apple Computer, headquartered in Cupertino, California. Suitable known techniques for graphic data compression and decompression that can be used are described, for example, in "STANDARDIZATION OF GROUP 3 FACSIMILE APPARATUS FOR DOCUMENT TRANSMISSION," CCITT Recommendation T.4 (Geneva, 1980).

In the graphics mode, with the input pen 3 or 1014 in contact with, or in sufficient proximity to, the document viewing and processing area 63, as determined at 408, the user can draw graphics directly onto the display. The input pen coordinates are encoded, as shown at 410, and any drawn graphics are made visible on the document viewing and processing area 63. These graphics are inserted into the document being edited.

The user can insert graphics in the midst of an area of a document which contains typefont text (e.g., to insert diagrams), or in the midst of pre-existing graphics, while in the graphics mode. In the case of inserting graphics in the midst of text, as determined at 411, this is accomplished by first encoding the selected (touched) location on the displayed document where the input pen 3 or 1014 initially makes contact (i.e., the location where graphics are to be inserted), as shown at 412. Next, any typefont text below the selected location is automatically removed from the document viewing and processing area 63, as shown at 414, and into temporary storage in the data memory 10. Then, the document viewing and processing area 63 is scrolled upward sufficiently to accommodate ample display space for graphics input on the currently displayed page, as shown at 416.

If the selected area for graphics input already contains graphics, rather than text, as determined at 411, the control subsystem 4 proceeds directly to initialize itself for graphics mode operation, as shown at 418. Once the control subsystem 4 has been initialized to accept graphics input, and any graphics data compression/decompression capability has been initialized and enabled, the user message area 61 displays a message informing the user that when no more graphics are to be input, and it is desired that the device be returned to the text mode, the region 44 designated "TEXT/GRAPH" should again be touched with the input pen 3 or 1014, as shown at 420. Thereafter, the control subsystem 4 enables storage of graphics in the appropriate compressed or non-compressed form, as shown at 422.

When the user touches the region 44 designated "TEXT/GRAPH" again with the input pen 3 or 1014, as determined at 424, the control subsystem 4 indicates reversion to the text mode by highlighting the word "TEXT" in "TEXT/GRAPH", or by displaying in the user message area 61 that the device is now in the text mode. The control subsystem 4 then determines the range of rows on the document viewing and processing area 63 containing graphics, as shown at 426. The range of addresses associated with the just input graphics is then stored in the data memory 10 at the address associated with the graphics start location, as shown at 428. The encroachment of graphics into an area containing text, which lies above a selected "graphics start location," can be prevented by either vertically shifting any encroached-upon text responsive to input pen contact, or more simply, by disabling graphics input above the selected graphics start location. At this time, any display information following the selected graphics start location, that was removed from the document viewing and processing area 63, when the graphics mode was initiated, is then restored from temporary storage, as shown at 430.

FIG. 11 illustrates the sequence of operations when the file directory is to be displayed in order to either select a file for viewing and processing, or to delete a file. The user touches either the region 42 designated "DIR", as shown at 500, or the region 43A designated "DEL FILE", as shown at 502, with the input pen 3 or 1014. If "DEL FILE" is touched, a flag is set, as shown at 504. In either case, the DIR/DEL FILE routine is then initialized, as shown at 506.

The control subsystem 4 displays the file directory in the document viewing and processing area 63, as shown at 508. The user message area 61 also displays instructions to touch a selected file title, or to touch "NORMAL" with the input pen 3 or 1014 to escape, as shown at 510. At this time, the user can scan through pages of the file directory by operating the page turn facility provided in the region 50 designated "PAGE SCAN". The control subsystem 4 waits for the user to either touch a selected file title, as determined at 512, or to touch "NORMAL" to escape, as determined at 514, with the input pen 3 or 1014.

When a file title on the document viewing and processing area 63 is selected, as determined at 512, the touched row and column position coordinates are mapped to the selected file, as shown at 516. If, on the one hand, the "DIR" operation was originally selected, as determined at 518, the selected file is displayed on the document viewing and processing area 63 for viewing and editing, as shown at 520. If, on the other hand, the "DEL FILE" operation was selected, the selected file is deleted from the file directory in the data memory 10, as shown at 522. Also, the remaining files in the file directory are moved to fill the gap, as shown at 524. Finally, a revised file directory is displayed in the document viewing and processing area 63, as shown at 526.

FIG. 12 illustrates the sequence of operations when the page turning facility is invoked in connection with a file displayed in the document viewing and processing area 63. When the user first touches the input pen 3 or 1014 to the region 50 designated "PAGE SCAN", as shown at 600, the control subsystem 4 initializes the "PAGE SCAN" routine, as shown at 602. The control subsystem 4 stores the initially touched column position coordinates as the "starting coordinate," as shown at 604.

As the input pen 3 or 1014 is moved along the region 50 designated "PAGE SCAN" to the right or to the left, new column position coordinates (referred to as "current coordinates") are touched and stored, as shown at 606. The absolute value of the computed difference between the column "starting coordinate" and the column "current coordinate" positions is compared to a threshold value. If this value is surpassed, as determined at 608, the direction of input pen movement is detected. If the input pen 3 or 1014 is moving to the right, as determined at 610, the currently displayed page number is incremented, as shown at 612. If the input pen 3 or 1014 is moving to the left, as determined at 610, the currently displayed page number is decremented, as shown at 614.

Also, if the threshold is surpassed, as determined at 608, the current column position coordinate replaces the column "starving coordinate," as shown at 616, and the control subsystem 4 proceeds to look again for the next touched column coordinate position whose value surpasses that of the new "starting coordinate" by the required threshold value. During this process, if the threshold value is not exceeded, as determined at 608, and the input pen 3 or 1014 continues to be in contact with the region 50 designated "PAGE SCAN", the control subsystem 4 fetches the next column "current coordinate," as shown at 606, and the sequence is repeated.

FIG. 13 illustrates the sequence of operations when text or graphics are to be erased. After the user touches the region 40 designated "ERASE", or depresses the control button 40A on the input pen 3 or 1014, as shown at 700, the control subsystem 4 initializes the "ERASE" routine, as shown at 702. The control subsystem 4 then displays "ERASE" in the user message area 61, as shown at 704. At any point during the erase operation, if the region 49 designated "NORMAL" is touched with the input pen 3 or 1014 (or the control button 40A is released), as determined at 708, the erase session is terminated.

If the control subsystem 4 is in the text mode, as determined at 706, the device waits for the user to either terminate the erase function (by touching the region 49 designated "NORMAL" with the input pen 3 or 1014, or by releasing the control button 40A, as determined by 708), or to touch a location on either the document viewing and processing area 63 or the text conversion area 62 with the input pen, as determined at 710 and 712, respectively. If the control subsystem 4 is in the text mode, as determined at 706, and the user touches a text character (or characters) in the document viewing and processing area 63, as determined at 710, the touched row and column position coordinates are used to determine which character has been touched, as shown at 714. Any selected characters are then deleted, as shown at 716. Any following text is moved over (to the left and/or upward) in order to fill the gap created by the deletion.

If the user actuates the erase function and then touches the input pen 3 or 1014 to the text conversion area 62 while the control subsystem 4 is in the text mode, as determined at 712, the control subsystem displays the message "Move pen over any hand printed text to be erased—Touch 'NORMAL' to escape," as shown at 718. The control subsystem 4 then stores the touched coordinates which at any one time include only those coordinates that lie between the initial point of contact and the present one, as shown at 722. Additionally, as shown at 722, the selected range at any one time is highlighted to enable the user to interactively select a range of printed text to be deleted. The control subsystem 4 waits until the input pen 3 or 1014 is lifted, as determined at 720, and then detects any characters which have been touched by mapping touched column positions with each touched character's associated horizontal character boundaries, as shown at 724 and 726. The touched characters within the range are then deleted from the display and from the data memory 10. If one of the erased printed characters includes a queue character currently being evaluated, as determined at 728, the character recognition subsystem 8 is reset, and the queue character and all of its associated input strokes are deleted, as shown at 730. However, it is also contemplated to save the erased character in the pre-text buffer, and to associate with it a status indicating that it had been erased, so that it can be restored later if desired.

If the erase function is actuated while the control subsystem 4 is in the graphics mode, as determined at 706, the device sets up a "brush width" for the input pen 3 or 1014, as shown at 732. If the input pen 3 or 1014 is in contact with the document viewing and processing area 63, as determined at 734, the control subsystem 4 detects any stroke display elements that are within a brush width of the input pen's point of contact with the display, and these display elements are then turned "off" and deleted from the data memory 10, as shown at 736. Interactive graphics erasure procedures for use with graphic displays are known, such as MACPAINT, produced by Apple Computer, and therefore will not be described in detail here.

FIG. 14 illustrates the sequence of operations when a text string is to be "cut" and placed into a memory buffer, so that it can be inserted later into another part of the document. When the region 54 designated "CUT" is touched with the input pen 3 or 1014, as shown at 800, the control subsystem 4 initializes the "CUT" routine, as shown at 802. The control subsystem 4 then causes the user message area 61 to display a message instructing the user to touch the first character in a text string that is to be cut with the input pen 3 or 1014, then to lift the input pen and touch the last character in the to-be-cut string (or to touch "NORMAL" to escape), as shown at 804.

When the input pen 3 or 1014 contacts the document viewing and processing area 63, as determined at 806, and this is the initial contact, as determined at 808, the touched row and column coordinate positions are stored, as shown at 810. These coordinate positions are then used to determine which text character has been selected as the start of the to-be-cut text string, as shown at 812. The position of this character is then stored as the first character of the text to be cut, as shown at 814. The user then lifts the input pen 3 or 1014, as determined at 816.

At the next contact of the input pen 3 or 1014 to the document viewing and processing area 63, as determined at 806, the control subsystem 4 detects the text character selected as the end of the to-be-cut text string, as shown at 818. All of the selected to-be-cut text is then transferred to a buffer memory location in the data memory 10, as shown at 820.

Thereafter, as shown at 822, the user message area 61 displays a message instructing the user that in order to insert the just cut text, the region 55 designated "INSERT BUFFER" must be touched with the input pen 3 or 1014, and the desired location for the insertion must be selected, as described in more detail below.

If the user decides to terminate the cut operation at any time, the user touches the region 49 designated "NORMAL" with the input pen 3 or 1014, as determined at 824 or 826. If the cut operation is terminated, the control subsystem 4 clears the user message area 61, as shown at 828.

FIG. 15 illustrates the sequence of operations when cut text stored in a buffer memory location is to be moved elsewhere in an existing document. When the region 55 designated "INSERT BUFFER" is touched with the input pen 3 or 1014, as shown at 900, the control subsystem 4 initializes the "INSERT BUFFER" routine, as shown at 902. The control subsystem 4 causes the user message area 61 to display a message instructing the user to touch a location in displayed text with the input pen 3 or 1014 where it is desired to insert the buffer memory text (or to touch "NORMAL" to escape), as shown at 904. Next, the user touches the selected location in the document where the buffer memory text is to be inserted, as determined at 906. The associated row and column position coordinates are stored, as shown at 908, and mapped to an associated text character position, as shown at 910. Then, any text subsequent to that at the selected location is shifted to allow space for the insertion, as shown at 912. The cut text buffer is then inserted into the document at the selected location, as shown at 914. Thereafter, the control subsystem 4 clears the user message area 61, as shown at 916.

As with other display processing operations described above, the user can escape the operation prior to selecting a buffer insert point by touching "NORMAL" with the input pen 3 or 1014, as determined at 918. If the "INSERT BUFFER" operation is terminated, the control subsystem 4 clears the user message area 61, as shown at 920.

Referring to FIGS. 1 and 2, a region 45 designated "I/O" is preferably provided on the display 1. The user touches this region with the input pen 3 or 1014 to output text and/or graphics stored in the data memory 10 under control of the data I/O subsystem 9. It is also contemplated that a facility for text and graphics data input from external information processing devices can be provided.

The data I/O subsystem 9 can include an interface, such as an RS-232 port, and/or modem for information exchange with external text and graphics devices. Text and/or graphics input from external devices is routed by the data I/O subsystem 9 to the data memory 10 and can be output from the data memory to the display 1 by the control subsystem 4. Conversely, text and/or graphics data is output from the data memory 10 by the control subsystem 4 through the data I/O subsystem 9 to external devices. Information which is hand printed or hand drawn on the document viewing and processing area 63, or displayed there as typefont text, can be output to an external information processing device, such as a printer or plotter for providing a hard copy, or to other external devices, such as a computer or external memory.

It will be understood that the embodiments of the present invention described above are susceptible to various modifications, changes, and adaptations. Other non-emissive flat panel display types being developed, which can be operated in a reflective mode to facilitate a flat profile, and which operate at low power, such as colloidal suspension displays, can also be adapted for use in association with the invention. Separate input pen sense electronics can be provided for each individual area of the device on which there is pen input. Likewise, separate display regions can be provided with their own dedicated display control subsystems, comprising, for example, operating display memory, horizontal and vertical drive electronics, etc. For example, the input text conversion area 62 can possess its own dedicated input pen sense electronics, as well as its own display control, for more dedicated and thus efficient interaction to the character recognition subsystem 8 with which it interfaces almost exclusively. All is intended to be comprehended within the meaning and range of equivalents of the appended claims.

What is claimed is:

1. A portable interactive electronic device for performing at least one of the functions of writing and graphics, comprising:
   input pen means configured to be held in the hand of a user;
   non-mechanical, non-emissive display means comprising a plurality of display elements including display electrode means for operating electro-optic material located between the display electrode means, the display means being operable in two modes, including a first mode in which the display electrode means is activated to excite the electro-optic material therebetween for displaying textual and/or graphical information and a second mode in which the display electrode means is electrically coupled with the input pen means manipulated by the user proximate the display means along a path to form information in one of the forms of text characters and graphics;
   means for applying a display drive signal to the display electrode means in the first mode and for applying a relatively high-frequency signal to the display electrode means in the second mode;
   pen sense control means associated with the display means and responsive to electrical coupling of the display electrode means with the input pen means in the second mode for producing position signals corresponding to positions of the input pen means with respect to the display means as the user manipulates the input pen means along the path; and
   display control means connected to the pen sense control means and display means and responsive to the position signals for energizing selected display electrode means of the display elements to display at least one of the text characters and graphics corresponding to the path followed by the input pen means;
   whereby information in one of the forms of text characters and graphics is hand-entered by the user directly onto the display means.

2. The device of claim 1, further comprising data memory connected to the control means for storing data representative of the position signals produced by the pen sense control means, the stored data being accessible in connection with energizing the selected display elements to display information in one of the forms of text characters and graphics.

3. The device of claim 2, further comprising data compression and decompression means incorporated into the control means and respectively responsive to the position signals for encoding the graphics as compressed data for storage in the data memory and responsive to the compressed data stored in the data memory for decoding the compressed data to display the graphics.

4. A portable interactive electronic device for performing at least one of the functions of writing and graphics, comprising:

input pen means configured to be held in the hand of a user;

non-mechanical, non-emissive display means comprising a plurality of display elements including display electrode means for operating electro-optic material located between the display electrode means, the display means being operable in two modes, including a first mode in which the display electrode means is activated to excite the electro-optic material therebetween for displaying textual and/or graphical information and a second mode in which the display electrode means is electrically coupled with the input pen means manipulated by the user proximate the display means along a path to form information in one of the forms of text characters and graphics;

means for applying a display drive signal to the display means in the first mode and for applying a relatively high-frequency signal to the display means in the second mode;

pen sense control means associated with the display means and responsive to electrical coupling of the display electrode means with the input pen means in the second mode for producing position signals corresponding to positions of the input pen means with respect to the display means as the user manipulates the input pen means along the path; and display control means connected to the pen sense control means and display means and responsive to the position signals for energizing selected display electrode means of the display elements to display at least one of the text characters and graphics corresponding to the path followed by the input pen means;

whereby information in one of the forms of text characters and graphics is hand-entered by the user directly onto the display means;

wherein the display means comprises:

an upper substrate consisting of a translucent material, the upper substrate having an exterior surface and an interior surface, the input pen means being configured to the manipulated by the user proximate the upper substrate;

a lower substrate spaced from the upper substrate, the lower substrate having an exterior surface and an interior surface;

a plurality of first electrodes and a plurality of second electrodes disposed on one of the upper and lower substrates;

display electronics comprising gating transistors and capacitors associated with the transistors, the gating transistors and capacitors being connected to the first and second electrodes; and a backplane disposed on the other of the upper and lower substrates, so as to provide an active matrix addressed display; and electro-optic material within an interstitial region between the upper and lower substrates; and wherein the pen sense control means is connected to the backplane and the input pen means and responsive to electrical coupling of the backplane with the input pen means in the second mode for producing position signals correlated to positions of the input pen means with respect to the display means as the user manipulates the input pen means; and wherein the display control means is connected to the first and second electrodes and responsive to the position signals in the first mode for energizing the electro-optic material to display at least one of the text characters and graphics corresponding to the path followed by the input pen means.

5. The device of claim 2, further comprising:

a plurality of function select regions incorporated into the display means, the regions being selectively activated by the user touching a given region with the input pen means, the pen sense control means being responsive to the given region being touched for producing a position signal indicative of a selected function; and graphics processing means connected to the control means and responsive to the position signal indicative of the selected function for executing a predetermined routine.

6. The device of claim 2, further comprising:

a function select region incorporated into the display means, the region being selectively activated by the user touching the region with the input pen means, the pen sense control means being responsive to the region being touched for producing a position signal; and data input/output means connected to the control means and responsive to the position signal produced when the region is touched for initiating exchange of data with external information processing means.

7. The device of claim 2, further comprising:

a document viewing and processing area incorporated into the display means for displaying text characters in typefont form;

a text conversion area incorporated into the display means, the input pen means being manipulated by the user proximate the text conversion area along a path comprising at least one stroke to form a discrete hand printed text character; and character recognition means connected to the control means and responsive to the position signals for encoding the hand printed text character in a standardized format representative of a corresponding typefont text character;

the hand printed text character being displayed as the corresponding typefont text character in the document viewing and processing area.

8. The device of claim 7, further comprising data memory connected to the control means for storing data representative of the corresponding typefont text character.

9. The device of claim 8 wherein the data memory comprises at least one volatile electronic memory device.

10. The device of claim 2, further comprising:

a plurality of function select regions incorporated into the display means, the regions being selectively activated by the user touching a given region with the input pen means, the pen sense control means being responsive to the given region being touched for producing a position signal indicative of a selected function; and text processing means connected to the control means and responsive to the position signal indicative of the selected function for executing a predetermined routine.

11. The device of claim 1, further comprising:

control means connected to the pen sense control means and display control means, the control means comprising microprocessor means and resident software, including text and graphics editing and filing software; and data memory connected to the control system for storing data representative of text characters and graphics.

12. The device of claim 1, further comprising a portable power supply incorporated into the device.

13. The device of claim 12, further comprising data input/output means connected to the control means, the data input/output means comprising a modem for enabling exchange of data between the device and external information processing means.

14. A portable interactive electronic device for performing at least one of the functions of writing and graphics, comprising:

input pen means configured to be held in the hand of a user;

non-mechanical, non-emissive display means comprising a plurality of display elements including display electrode means for operating electro-optic material located between the display electrode means, the display means being operable in two modes, including a first mode in which the display electrode means is activated to excite the electro-optic material therebetween for displaying textual and/or graphical information and a second mode in which the display electrode means is electrically coupled with the input pen means manipulated by the user proximate the display means along a path to form information in one of the forms of text characters and graphics;

pen sense control means associated with the display means and responsive to electrical coupling of the display electrode means with the input pen means for producing position signals corresponding to positions of the input pen means with respect to the display means as the user manipulates the input pen means along the path; and display control means connected to the pen sense control means and display means and responsive to the position signals for energizing selected display electrode means of the display elements to display at least one of the text characters and graphics corresponding to the path followed by the input pen means;

whereby information in one of the forms of text characters and graphics is hand-entered by the user directly onto the display means;

wherein the display means comprises:

an upper substrate consisting of a translucent material, the upper substrate having an exterior surface and an interior surface, the input pen means being configured to be manipulated by the user proximate the upper substrate;

a lower substrate spaced from the upper substrate, the lower substrate having an exterior surface and an interior surface;

a plurality of first electrodes, each of the first electrodes having a plurality of notches;

a plurality of second electrodes, the second electrodes intersecting the first electrodes; and electro-optic material within an interstitial region between the upper and lower electrodes; and wherein the pen sense control means is connected to the second electrodes and the input pen means and responsive to electrical coupling of the second electrodes with the input pen means through the notches for producing position signals correlated to positions of the input pen means with respect to crosspoints corresponding to intersections of the first and second electrodes as the user manipulates the input pen means; and wherein the display control means is connected to the first and second electrodes and responsive to the position signals for energizing the electro-optic material in the vicinity of corresponding crosspoints.

15. The device of claim 14 wherein the pen signal is connected to the input pen means to be transmitted by the input pen means and received by the second electrodes for producing the position signals.

16. The device of claim 14 wherein the pen signal is connected to the second electrodes to be transmitted from the vicinity of corresponding crosspoints and received by the input pen means for producing the position signals.

17. The device of claim 14 wherein the electro-optic material is liquid crystal material.

18. The device of claim 14 wherein the first electrodes are disposed on the interior surface of the upper substrate and the second electrodes are disposed on the interior surface of the lower substrate, so as to provide a passive matrix addressed display.

19. The device of claim 14 wherein the first and second electrodes are disposed on one of the upper and lower substrates, further comprising display electronics comprising gating transistors and capacitors, associated with the transistors connected to the first and second electrodes, and a backplane disposed on the other of the upper and lower substrates, so as to provide an active matrix addressed display.

20. The device of claim 1 wherein the display electrode means includes an segmented backplane.

* * * * *